US012065081B2

United States Patent
Sobecki et al.

(10) Patent No.: US 12,065,081 B2
(45) Date of Patent: *Aug. 20, 2024

(54) VEHICULAR CABIN MONITORING SYSTEM WITH CAMERA AND NEAR IR LIGHT EMITTER AT INTERIOR REARVIEW MIRROR ASSEMBLY

(71) Applicants: Magna Mirrors of America, Inc., Holland, MI (US); Magna Electronics Inc., Auburn Hills, MI (US)

(72) Inventors: Justin E. Sobecki, Rockford, MI (US); Austen C. Peterson, Hudsonville, MI (US); Gregory A. Huizen, Hudsonville, MI (US); James A. Ruse, Allegan, MI (US); Yuesheng Lu, Farmington Hills, MI (US); Martin Solar, Erlenbach (DE)

(73) Assignee: Magna Mirrors of America, Inc., Holland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/464,477

(22) Filed: Sep. 11, 2023

(65) Prior Publication Data

US 2024/0025344 A1 Jan. 25, 2024

Related U.S. Application Data

(63) Continuation of application No. 17/905,119, filed as application No. PCT/US2022/072238 on May 11, (Continued)

(51) Int. Cl.
*B60R 1/30* (2022.01)
*B60R 1/04* (2006.01)
(Continued)

(52) U.S. Cl.
CPC ............... *B60R 1/30* (2022.01); *B60R 1/04* (2013.01); *B60R 1/12* (2013.01); *B60R 1/29* (2022.01);
(Continued)

(58) Field of Classification Search
CPC .... B60R 1/30; B60R 1/04; B60R 1/12; B60R 1/29; B60R 11/04; B60R 2001/1253;
(Continued)

(56) References Cited

U.S. PATENT DOCUMENTS

| 4,435,042 A | 3/1984 | Wood et al. |
| 4,436,371 A | 3/1984 | Wood et al. |

(Continued)

FOREIGN PATENT DOCUMENTS

| CN | 205523966 U | 8/2016 |
| CN | 209534893 U | 10/2019 |

(Continued)

OTHER PUBLICATIONS

International Search Report and Written Opinion dated Jul. 29, 2022 from corresponding PCT Application No. PCT/US2022/072238 filed May 11, 2022.

(Continued)

*Primary Examiner* — Sath V Perungavoor
*Assistant Examiner* — Tyler B Edwards
(74) *Attorney, Agent, or Firm* — HONIGMAN LLP

(57) ABSTRACT

A vehicular cabin monitoring system includes an interior rearview mirror assembly configured for attaching at an interior portion of an equipped vehicle and having a having a mirror head accommodating a driver monitoring camera and first and second near infrared light emitters. When the equipped vehicle is a left hand drive vehicle, a beam of light emitted by the first near infrared light emitters is directed toward a driver-side front seating location of the left hand (Continued)

drive vehicle when the first near infrared light emitter emits near infrared light for a driver monitoring function. When the equipped vehicle is a right hand drive vehicle, a beam of light emitted by the second light emitting element is directed toward a driver-side front seating location of the right hand drive vehicle when the second near infrared light emitter emits near infrared light for the driver monitoring function.

113 Claims, 47 Drawing Sheets

Related U.S. Application Data 2022, now Pat. No. 11,780,372, said application No. 17/905,119 is a continuation-in-part of application No. 17/905,109, filed as application No. PCT/US2022/070882 on Mar. 1, 2022, now Pat. No. 11,639,134.

(60) Provisional application No. 63/363,598, filed on Apr. 26, 2022, provisional application No. 63/267,316, filed on Jan. 31, 2022, provisional application No. 63/262,642, filed on Oct. 18, 2021, provisional application No. 63/260,359, filed on Aug. 18, 2021, provisional application No. 63/201,757, filed on May 12, 2021, provisional application No. 63/201,371, filed on Apr. 27, 2021, provisional application No. 63/200,451, filed on Mar. 8, 2021, provisional application No. 63/200,315, filed on Mar. 1, 2021.

(51) Int. Cl.
*B60R 1/12* (2006.01)
*B60R 1/29* (2022.01)
*B60R 11/04* (2006.01)
*G06V 20/59* (2022.01)
*G06V 40/20* (2022.01)
*B60R 11/00* (2006.01)

(52) U.S. Cl.
CPC ............ *B60R 11/04* (2013.01); *G06V 20/597* (2022.01); *G06V 40/20* (2022.01); *B60R 2001/1253* (2013.01); *B60R 2011/0022* (2013.01); *B60R 2011/0033* (2013.01)

(58) Field of Classification Search
CPC .... B60R 2011/0022; B60R 2011/0033; G06V 20/597; G06V 40/20
See application file for complete search history.

(56) References Cited

U.S. PATENT DOCUMENTS

| | | | |
|---|---|---|---|
| 4,712,879 A | 12/1987 | Lynam et al. |
| 4,826,289 A | 5/1989 | Vandenbrink et al. |
| 4,936,533 A | 6/1990 | Adams et al. |
| 4,948,242 A | 8/1990 | Desmond et al. |
| 5,066,112 A | 11/1991 | Lynam et al. |
| 5,073,012 A | 12/1991 | Lynam |
| 5,076,673 A | 12/1991 | Lynam et al. |
| 5,076,674 A | 12/1991 | Lynam |
| 5,100,095 A | 3/1992 | Haan et al. |
| 5,115,346 A | 5/1992 | Lynam |
| 5,140,455 A | 8/1992 | Varaprasad et al. |
| 5,142,407 A | 8/1992 | Varaprasad et al. |
| 5,151,816 A | 9/1992 | Varaprasad et al. |
| 5,253,109 A | 10/1993 | O'Farrell et al. |
| 5,327,288 A | 7/1994 | Wellington et al. |
| 5,406,414 A | 4/1995 | O'Farrell et al. |
| 5,525,264 A | 6/1996 | Cronin et al. |
| 5,550,677 A | 8/1996 | Schofield et al. |
| 5,567,360 A | 10/1996 | Varaprasad et al. |
| 5,570,127 A | 10/1996 | Schmidt |
| 5,594,222 A | 1/1997 | Caldwell |
| 5,610,756 A | 3/1997 | Lynam et al. |
| 5,668,663 A | 9/1997 | Varaprasad et al. |
| 5,670,935 A | 9/1997 | Schofield et al. |
| 5,715,093 A | 2/1998 | Schierbeek et al. |
| 5,724,187 A | 3/1998 | Varaprasad et al. |
| 5,751,489 A | 5/1998 | Caskey et al. |
| 5,760,962 A | 6/1998 | Schofield et al. |
| 5,796,094 A | 8/1998 | Schofield et al. |
| 5,820,097 A | 10/1998 | Spooner |
| 5,877,897 A | 3/1999 | Schofield et al. |
| 5,910,854 A | 6/1999 | Varaprasad et al. |
| 6,001,486 A | 12/1999 | Varaprasad et al. |
| 6,002,511 A | 12/1999 | Varaprasad et al. |
| 6,097,023 A | 8/2000 | Schofield et al. |
| 6,154,306 A | 11/2000 | Varaprasad et al. |
| 6,158,655 A | 12/2000 | DeVries, Jr. et al. |
| 6,178,034 B1 | 1/2001 | Allemand et al. |
| 6,201,642 B1 | 3/2001 | Bos |
| 6,222,447 B1 | 4/2001 | Schofield et al. |
| 6,310,611 B1 | 10/2001 | Caldwell |
| 6,318,870 B1 | 11/2001 | Spooner et al. |
| 6,320,176 B1 | 11/2001 | Schofield et al. |
| 6,320,282 B1 | 11/2001 | Caldwell |
| 6,329,925 B1 | 12/2001 | Skiver et al. |
| 6,369,804 B1 | 4/2002 | Sandbach |
| 6,396,397 B1 | 5/2002 | Bos et al. |
| 6,437,258 B1 | 8/2002 | Sandbach |
| 6,449,082 B1 | 9/2002 | Agrawal et al. |
| 6,452,479 B1 | 9/2002 | Sandbach |
| 6,480,103 B1 | 11/2002 | McCarthy et al. |
| 6,483,438 B2 | 11/2002 | DeLine et al. |
| 6,485,081 B1 | 11/2002 | Bingle et al. |
| 6,492,980 B2 | 12/2002 | Sandbach |
| 6,498,620 B2 | 12/2002 | Schofield et al. |
| 6,501,465 B2 | 12/2002 | Sandbach |
| 6,504,531 B1 | 1/2003 | Sandbach |
| 6,540,193 B1 | 4/2003 | DeLine |
| 6,559,435 B2 | 5/2003 | Schofield et al. |
| 6,590,719 B2 | 7/2003 | Bos |
| 6,593,565 B2 | 7/2003 | Heslin et al. |
| 6,598,980 B2 | 7/2003 | Marusawa et al. |
| 6,621,411 B2 | 9/2003 | McCarthy et al. |
| 6,627,918 B2 | 9/2003 | Getz et al. |
| 6,690,268 B2 | 2/2004 | Schofield et al. |
| 6,698,905 B1 | 3/2004 | Whitehead |
| 6,703,925 B2 | 3/2004 | Steffel |
| 6,717,610 B1 | 4/2004 | Bos et al. |
| 6,757,109 B2 | 6/2004 | Bos |
| 6,768,420 B2 | 7/2004 | McCarthy et al. |
| 6,783,167 B2 | 8/2004 | Bingle et al. |
| 6,806,452 B2 | 10/2004 | Bos et al. |
| 6,822,563 B2 | 11/2004 | Bos et al. |
| 6,824,281 B2 | 11/2004 | Schofield et al. |
| 6,831,261 B2 | 12/2004 | Schofield et al. |
| 6,877,709 B2 | 4/2005 | March et al. |
| 6,922,292 B2 | 7/2005 | Bos |
| 6,946,978 B2 | 9/2005 | Schofield |
| 7,004,606 B2 | 2/2006 | Schofield |
| 7,038,577 B2 | 5/2006 | Pawlicki et al. |
| 7,097,226 B2 | 8/2006 | Bingle et al. |
| 7,184,190 B2 | 2/2007 | McCabe et al. |
| 7,188,963 B2 | 3/2007 | Schofield et al. |
| 7,195,381 B2 | 3/2007 | Lynam et al. |
| 7,224,324 B2 | 5/2007 | Quist et al. |
| 7,249,860 B2 | 7/2007 | Kulas et al. |
| 7,253,723 B2 | 8/2007 | Lindahl et al. |
| 7,255,451 B2 | 8/2007 | McCabe et al. |
| 7,274,501 B2 | 9/2007 | McCabe et al. |
| 7,289,037 B2 | 10/2007 | Uken et al. |
| 7,338,177 B2 | 3/2008 | Lynam |
| 7,360,932 B2 | 4/2008 | Uken et al. |
| 7,420,756 B2 | 9/2008 | Lynam |
| 7,446,924 B2 | 11/2008 | Schofield et al. |
| 7,477,758 B2 | 1/2009 | Piirainen et al. |
| 7,480,149 B2 | 1/2009 | DeWard et al. |
| 7,626,749 B2 | 12/2009 | Baur et al. |

(56) References Cited

U.S. PATENT DOCUMENTS

| | | | |
|---|---|---|---|
| 7,636,188 B2 | 12/2009 | Baur et al. |
| 7,720,580 B2 | 5/2010 | Higgins-Luthman |
| 7,722,199 B2 | 5/2010 | DeWard et al. |
| 7,741,666 B2 | 6/2010 | Nozaki et al. |
| 7,855,755 B2 | 12/2010 | Weller et al. |
| 7,914,187 B2 | 3/2011 | Higgins-Luthman et al. |
| 8,049,640 B2 | 11/2011 | Uken et al. |
| 8,256,821 B2 | 9/2012 | Lawlor et al. |
| 8,258,932 B2 | 9/2012 | Wahlstrom |
| 8,277,059 B2 | 10/2012 | McCabe et al. |
| 8,446,470 B2 | 5/2013 | Lu et al. |
| 8,451,107 B2 | 5/2013 | Lu et al. |
| 8,508,831 B2 | 8/2013 | De Wind et al. |
| 8,529,108 B2 | 9/2013 | Uken et al. |
| 8,727,547 B2 | 5/2014 | McCabe et al. |
| 8,730,553 B2 | 5/2014 | De Wind et al. |
| 8,743,203 B2 | 6/2014 | Karner et al. |
| 8,876,342 B2 | 11/2014 | Wimbert et al. |
| 8,922,422 B2 | 12/2014 | Klar et al. |
| 9,090,213 B2 | 7/2015 | Lawlor et al. |
| 9,126,525 B2 | 9/2015 | Lynam et al. |
| 9,174,578 B2 | 11/2015 | Uken et al. |
| 9,346,403 B2 | 5/2016 | Uken et al. |
| 9,405,120 B2 | 8/2016 | Graf et al. |
| 9,487,159 B2 | 11/2016 | Achenbach |
| 9,493,122 B2 | 11/2016 | Krebs |
| 9,598,016 B2 | 3/2017 | Blank et al. |
| 9,609,757 B2 | 3/2017 | Steigerwald |
| 9,616,815 B2 | 4/2017 | Mohan |
| 9,827,913 B2 | 11/2017 | De Wind et al. |
| 9,878,669 B2 | 1/2018 | Kendall |
| 9,900,490 B2 | 2/2018 | Ihlenburg et al. |
| 10,017,114 B2 | 7/2018 | Bongwald |
| 10,029,614 B2 | 7/2018 | Larson |
| 10,046,706 B2 | 8/2018 | Larson et al. |
| 10,065,574 B2 | 9/2018 | Tiryaki |
| 10,166,924 B2 | 1/2019 | Baur |
| 10,166,926 B2 | 1/2019 | Krebs et al. |
| 10,261,648 B2 | 4/2019 | Uken et al. |
| 10,264,219 B2 | 4/2019 | Mleczko et al. |
| 10,315,573 B2 | 6/2019 | Bongwald |
| 10,421,404 B2 | 9/2019 | Larson et al. |
| 10,442,360 B2 | 10/2019 | LaCross et al. |
| 10,466,563 B2 | 11/2019 | Kendall et al. |
| 10,567,633 B2 | 2/2020 | Ihlenburg et al. |
| 10,567,705 B2 | 2/2020 | Ziegenspeck et al. |
| 10,703,204 B2 | 7/2020 | Hassan et al. |
| 10,922,563 B2 | 2/2021 | Nix et al. |
| 10,958,830 B2 | 3/2021 | Koravadi |
| 11,167,771 B2 | 11/2021 | Caron et al. |
| 11,201,994 B2 | 12/2021 | Ihlenburg et al. |
| 11,205,083 B2 | 12/2021 | Lynam |
| 11,214,199 B2 | 1/2022 | LaCross et al. |
| 11,240,427 B2 | 2/2022 | Koravadi |
| 11,242,008 B2 | 2/2022 | Blank et al. |
| 11,252,376 B2 | 2/2022 | Ihlenburg |
| 11,341,671 B2 | 5/2022 | Lu et al. |
| 11,348,374 B2 | 5/2022 | Kramer et al. |
| 11,433,906 B2 | 9/2022 | Lu |
| 11,465,561 B2 | 10/2022 | Peterson et al. |
| 11,488,399 B2 | 11/2022 | Wacquant |
| 11,493,918 B2 | 11/2022 | Singh |
| 11,518,401 B2 | 12/2022 | Kulkarni |
| 11,582,425 B2 | 2/2023 | Liu |
| 11,639,134 B1* | 5/2023 | Huizen ............ B60R 1/04 348/77 |
| 11,780,372 B2* | 10/2023 | Sobecki ............ B60R 1/04 348/148 |
| 11,890,990 B2* | 2/2024 | Huizen ............ B60R 1/089 |
| 2002/0005999 A1 | 1/2002 | Hutzel et al. |
| 2006/0050018 A1 | 3/2006 | Hutzel et al. |
| 2006/0171704 A1 | 8/2006 | Bingle et al. |
| 2007/0182528 A1* | 8/2007 | Breed ............ B60W 30/16 348/148 |
| 2009/0024436 A1 | 1/2009 | Ingman et al. |
| 2009/0040778 A1 | 2/2009 | Takayanagi et al. |
| 2010/0085653 A1 | 4/2010 | Uken et al. |
| 2010/0214791 A1 | 8/2010 | Schofield |
| 2011/0080481 A1 | 4/2011 | Bellingham |
| 2011/0084198 A1 | 4/2011 | McCabe et al. |
| 2014/0022390 A1 | 1/2014 | Blank et al. |
| 2014/0285666 A1 | 9/2014 | O'Connell et al. |
| 2014/0293169 A1 | 10/2014 | Uken et al. |
| 2014/0313563 A1 | 10/2014 | Uken et al. |
| 2014/0336876 A1 | 11/2014 | Gieseke et al. |
| 2015/0009010 A1 | 1/2015 | Biemer |
| 2015/0015710 A1 | 1/2015 | Tiryaki |
| 2015/0022664 A1 | 1/2015 | Pflug et al. |
| 2015/0092042 A1 | 4/2015 | Fursich |
| 2015/0097955 A1 | 4/2015 | De Wind et al. |
| 2015/0232030 A1 | 8/2015 | Bongwald |
| 2015/0294169 A1 | 10/2015 | Zhou et al. |
| 2015/0296135 A1 | 10/2015 | Wacquant et al. |
| 2015/0352953 A1 | 12/2015 | Koravadi |
| 2016/0137126 A1 | 5/2016 | Fursich et al. |
| 2016/0209647 A1 | 7/2016 | Fursich |
| 2017/0177935 A1 | 6/2017 | Weller et al. |
| 2017/0217367 A1 | 8/2017 | Pflug et al. |
| 2017/0237946 A1 | 8/2017 | Schofield et al. |
| 2017/0274906 A1 | 9/2017 | Hassan et al. |
| 2017/0355312 A1 | 12/2017 | Habibi et al. |
| 2018/0134217 A1 | 5/2018 | Peterson et al. |
| 2018/0222414 A1 | 8/2018 | Ihlenburg et al. |
| 2018/0231976 A1 | 8/2018 | Singh |
| 2019/0054899 A1 | 2/2019 | Hoyos et al. |
| 2019/0118717 A1 | 4/2019 | Blank et al. |
| 2019/0146297 A1 | 5/2019 | Lynam et al. |
| 2019/0168669 A1 | 6/2019 | Lintz et al. |
| 2019/0258131 A9 | 8/2019 | Lynam et al. |
| 2019/0364199 A1* | 11/2019 | Koravadi ............ H04N 23/651 |
| 2019/0381938 A1 | 12/2019 | Hopkins |
| 2020/0143560 A1 | 5/2020 | Lu et al. |
| 2020/0148120 A1 | 5/2020 | Englander et al. |
| 2020/0202151 A1 | 6/2020 | Wacquant |
| 2020/0320320 A1 | 10/2020 | Lynam |
| 2020/0327323 A1 | 10/2020 | Noble |
| 2020/0377022 A1 | 12/2020 | LaCross et al. |
| 2021/0056306 A1 | 2/2021 | Hu et al. |
| 2021/0122404 A1 | 4/2021 | Lisseman et al. |
| 2021/0155167 A1 | 5/2021 | Lynam et al. |
| 2021/0162926 A1 | 6/2021 | Lu |
| 2021/0245662 A1 | 8/2021 | Blank et al. |
| 2021/0291739 A1 | 9/2021 | Kasarla et al. |
| 2021/0306538 A1 | 9/2021 | Solar |
| 2021/0323473 A1 | 10/2021 | Peterson et al. |
| 2021/0368082 A1 | 11/2021 | Solar |
| 2022/0111857 A1 | 4/2022 | Kulkarni |
| 2022/0242438 A1 | 8/2022 | Sobecki et al. |
| 2022/0254132 A1 | 8/2022 | Rother |
| 2022/0377219 A1 | 11/2022 | Conger et al. |
| 2023/0131471 A1 | 4/2023 | Sobecki et al. |
| 2023/0137004 A1 | 5/2023 | Huizen et al. |

FOREIGN PATENT DOCUMENTS

| | | |
|---|---|---|
| DE | 10325646 A1 | 1/2004 |
| DE | 102005000650 A1 | 7/2006 |
| FR | 3071788 A1 | 4/2019 |
| WO | 2022150826 A1 | 7/2022 |
| WO | 2023034956 A1 | 3/2023 |

OTHER PUBLICATIONS

Seeing Machines' FOVIO Driver Monitoring (FDM) processor [description of which is available at https://china.xilinx.com/publications/presentations/c_D3_03-Driver-Monitoring-Systems.pdf], Jan. 14, 2021.

* cited by examiner

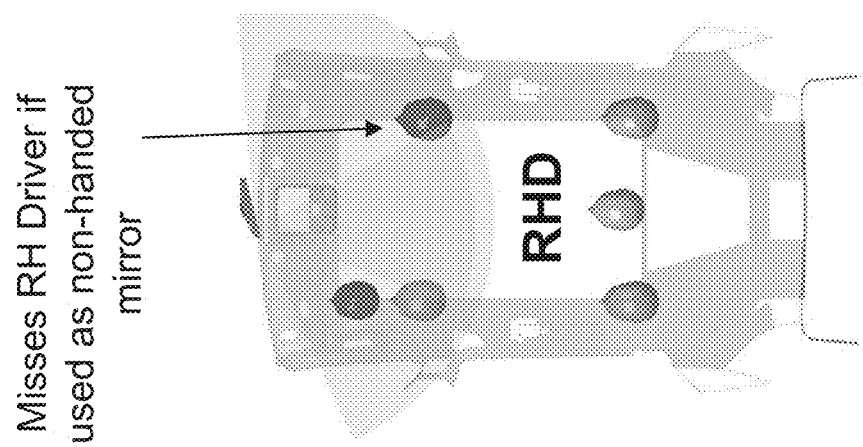
Misses RH Driver if used as non-handed mirror
FIG. 7  FIG. 8
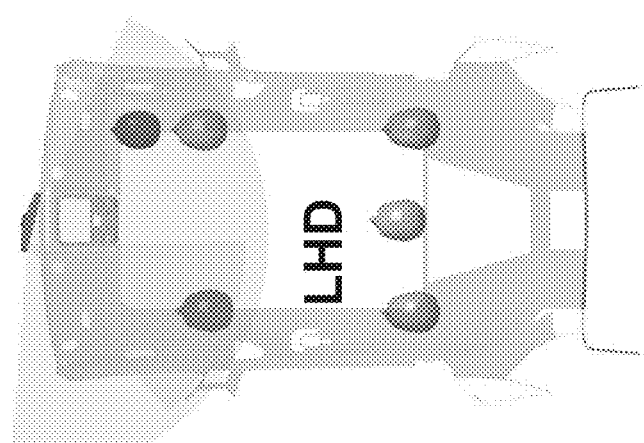
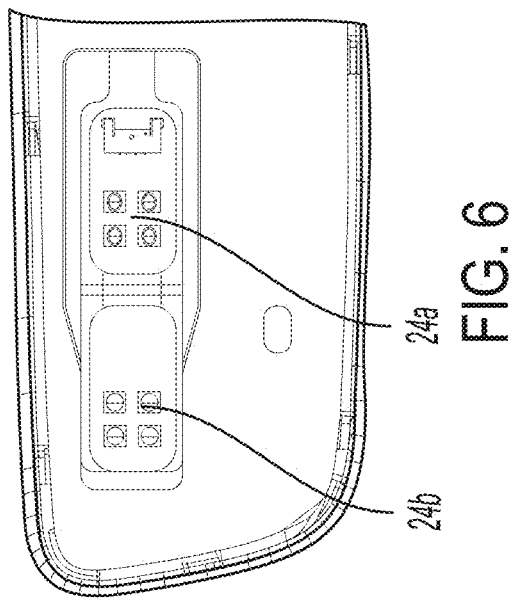
FIG. 6

- 3x nFOV LEDs
  - 10° bias to LH Driver
- 2x wFOV LEDs
  - No bias
- 3x nFOV LEDs
  - 20° bias to RH Driver
* RH & LH driver nFOV LEDs are software enabled depending on vehicle type

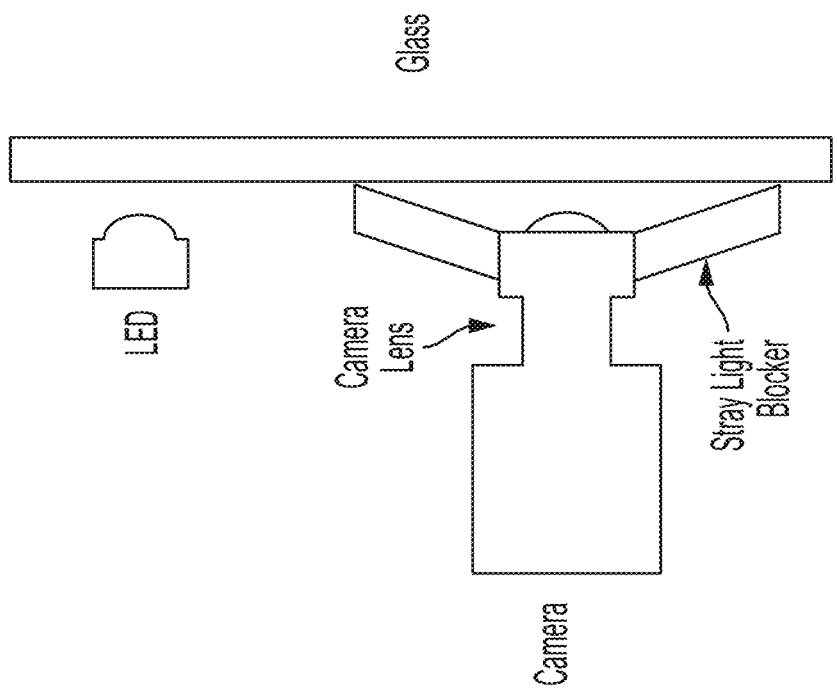

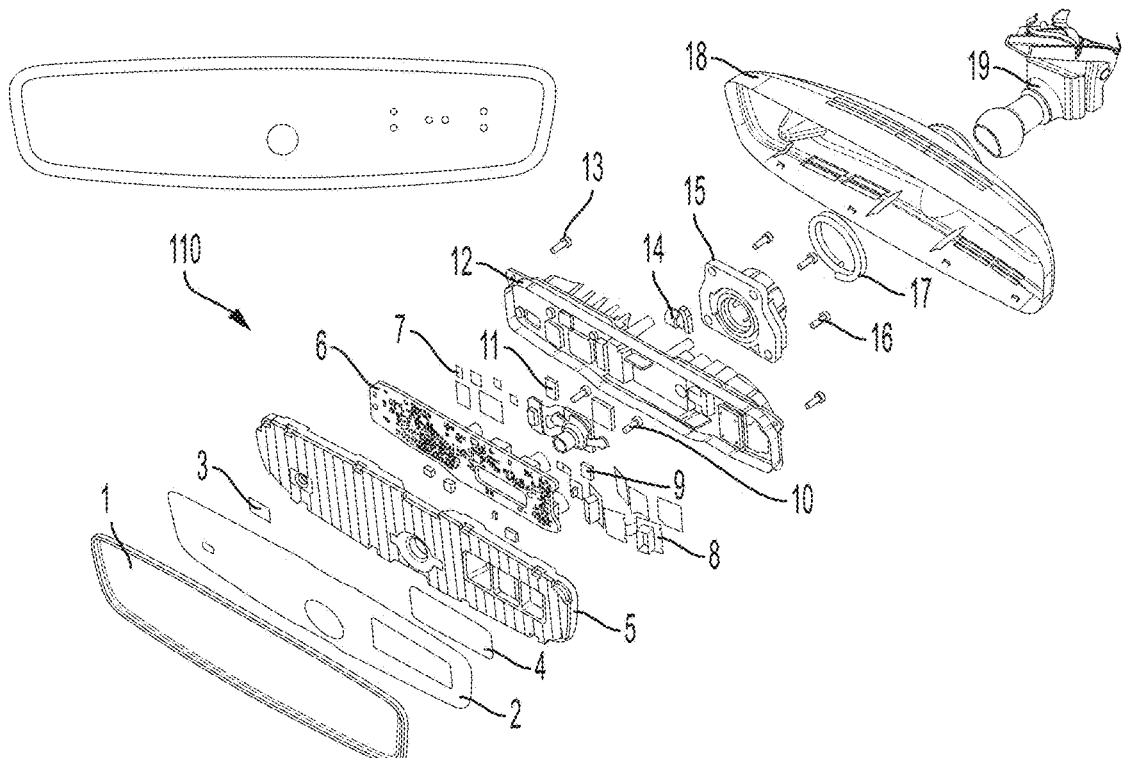

| Item | Description | Material |
|---|---|---|
| 1 | EC Cell & Push In Tabs | Glass & Copper/Beryllium |
| 2 | Adhesive (Foam Tape) | Polyethylene Foam with Adhesive |
| 3 | IR Blocking Filter | PC + Dye / Film |
| 4 | IR Longpass Filter | PC + IR Dye |
| 5 | Attachment Plate | PC + ABS + SS Fiber |
| 6 | ECU | Various |
| 7 | Thermal Interface Material (TIM) [Top & Bottom ECU, IR LED and Camera PCBs] | Thermal Paste |
| 8 | IR Illumination Rigid Flex PCB (w/ reflectors) | Various |
| 9 | IR Illumination PCB Connection Retention Foam | Silicone Foam with Acrylic Adhesive |
| 10 | Camera Module & Camera Screws (x2) | PCB, Sensor, Lens, Rigid Flex, Connector & Steel |
| 11 | Camera Connection Retention Foam | Silicone Foam with Acrylic Adhesive |
| 12 | Heat Sink / Chassis | Anodized Aluminum |
| 13 | Heat Sink Screws (x4) | Steel |
| 14 | Mirror Wire Harness | Various |
| 15 | Socket | POM |
| 16 | Socket Screws (x4) | Steel |
| 17 | Wrap Spring | Music Wire Steel |
| 18 | Housing | PC + ASA |
| 19 | Stay + Spring Clip & Spring Clip Screw | Aluminum + Steel |

FIG. 29

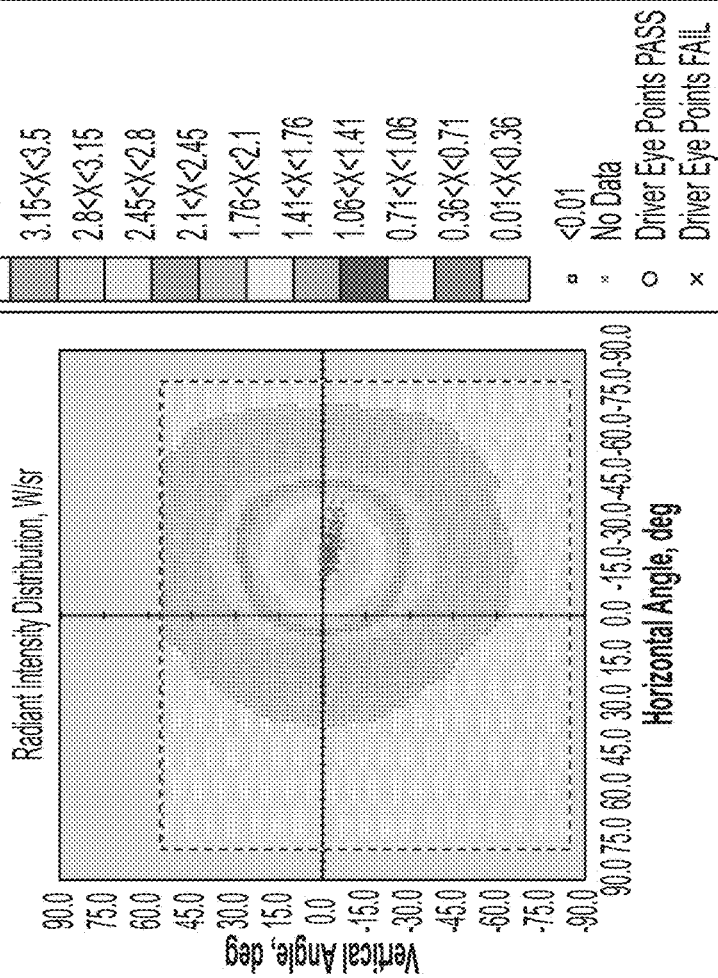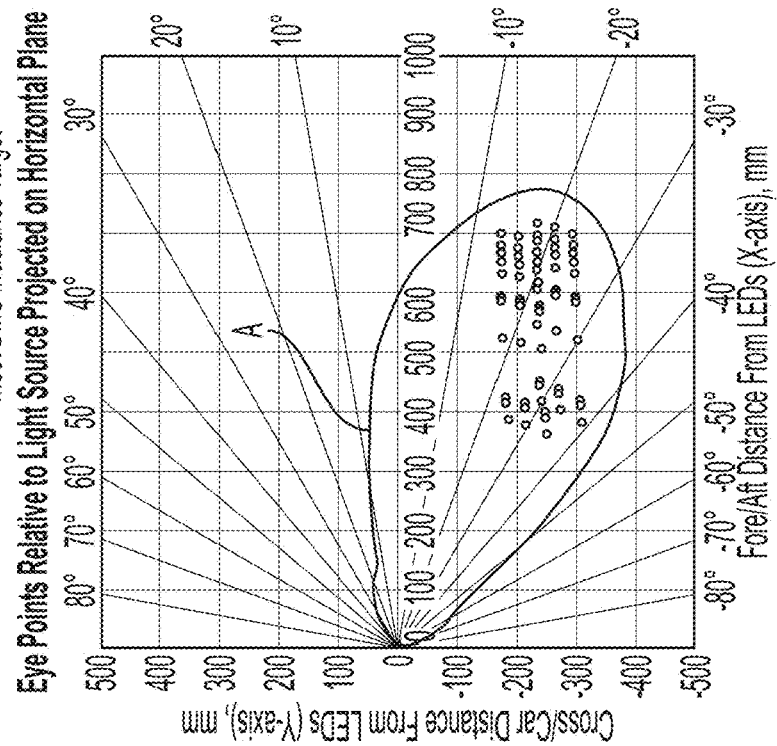
FIG. 33D

| INPUTS - OUTPUTS | | LH | WIDE | RH | | |
|---|---|---|---|---|---|---|
| | Select Source TYPEs (from drop down) | 50° IR-LED 4728AS w/ Metal SMR | 130-180° P/el IR-LED 47278AS | 50° IR-LED 4728AS w/ Metal SMR | 130-180° P/el IR-LED 47278AS | |
| Source Orientation Relative to ISM | Rotation Around Vertical Axis (-aims towards LH driver) | -20.0 | 0.0 | 10.0 | 10.0 | Deg |
| | Rotation Around Horizontal Axis (+ aims Down) | 0.0 | 0.0 | 0.0 | 0.0 | Deg |
| | Around Axis Normal to PCB | 0.0 | 0.0 | 0.0 | 0.0 | Deg |
| Source Position Relative to ISM Pivot | Fore/Aft Offsets, X-Direction | 32.4 | 38.1 | 32.6 | 38.1 | mm |
| | Cross Car Offsets, Y-Direction | 50.0 | 69.3 | 88.6 | 69.3 | mm |
| | Vertical Offsets, Z-Direction | 5.4 | 5.4 | 5.4 | 5.4 | mm |
| Source INPUTS | Source Optical Power | 1.71 | 1.7 | 1.71 | 1.7 | W |
| | Window Transmission | 42 | 42 | 42 | 42 | % |
| | Number of Sources | 2 | 0 | 0 | 0 | No |
| | Total Optical Power (@Sources) | 3.42 | | W | | Fresnel Loss Applied |

FIG. 33E

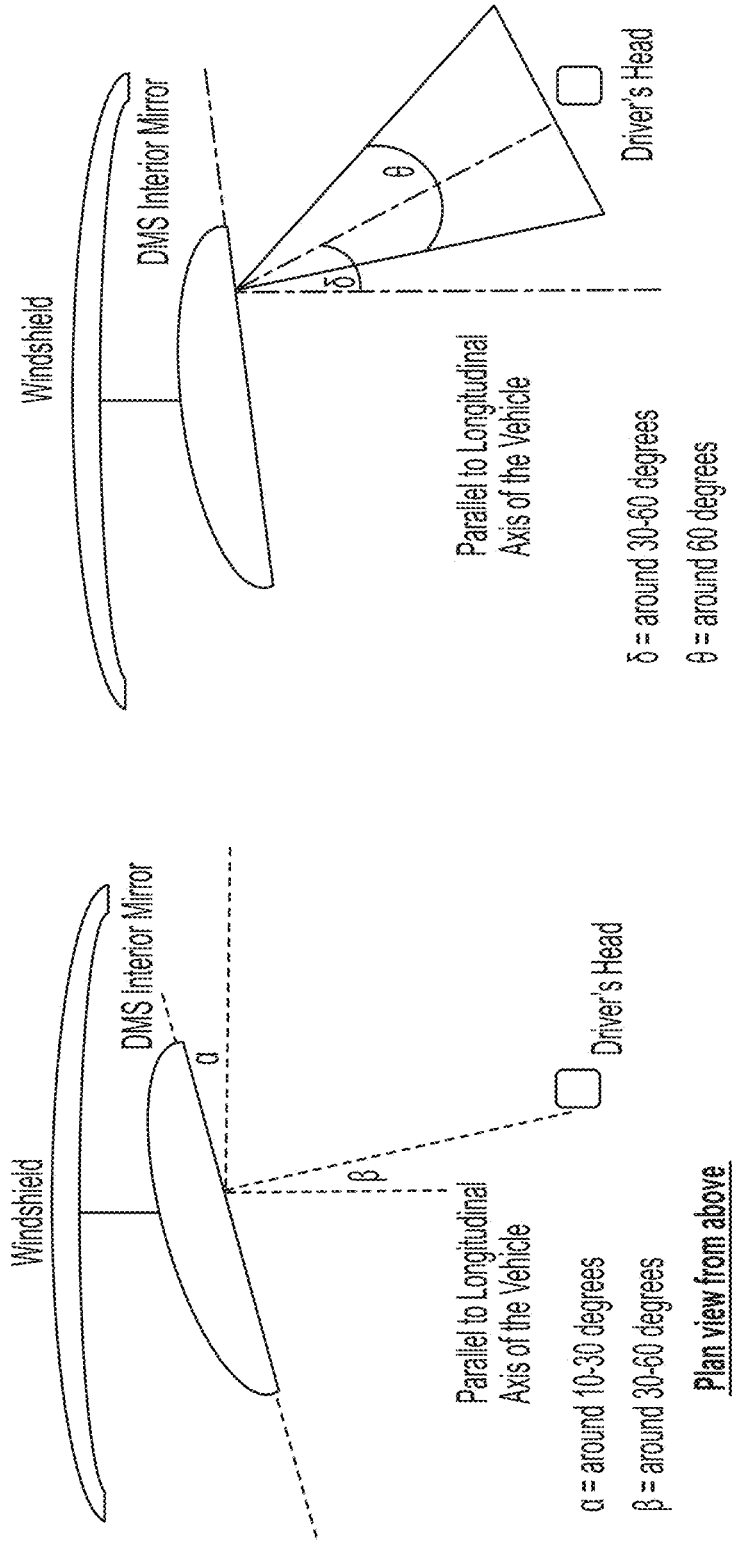

| INPUTS - OUTPUTS | | LH | WIDE | RH | | |
|---|---|---|---|---|---|---|
| | Select Source TYPEs (from drop down) | 50° IR-LED 4728AS w/ Metal SMR | 130-180° P/el IR-LED 47278AS | 50° IR-LED 4728AS w/ Metal SMR | 130-180° P/el IR-LED 47278AS | |
| Source Orientation Relative to ISM | Rotation Around Vertical Axis (-aims towards LH driver) | -20.0 | 0.0 | 10.0 | 10.0 | Deg |
| | Rotation Around Horizontal Axis (+aims Down) | 0.0 | 0.0 | 0.0 | 0.0 | Deg |
| | Around Axis Normal to PCB | 0.0 | 0.0 | 0.0 | 0.0 | Deg |
| Source Position Relative to ISM Pivot | Fore/Aft Offsets, X-Direction | 32.4 | 38.1 | 32.6 | 38.1 | mm |
| | Cross Car Offsets, Y-Direction | 50.0 | 69.3 | 88.6 | 69.3 | mm |
| | Vertical Offsets, Z-Direction | 5.4 | 5.4 | 5.4 | 5.4 | mm |
| Source INPUTS | Source Optical Power | 2 | 2 | 2 | 2 | W |
| | Window Transmission | 42 | 42 | 42 | 42 | % |
| | Number of Sources | 0 | 0 | 2 | 0 | No |
| | Total Optical Power (@Sources) | 4.00 | | W | | Fresnel Loss Applied |

FIG. 35D

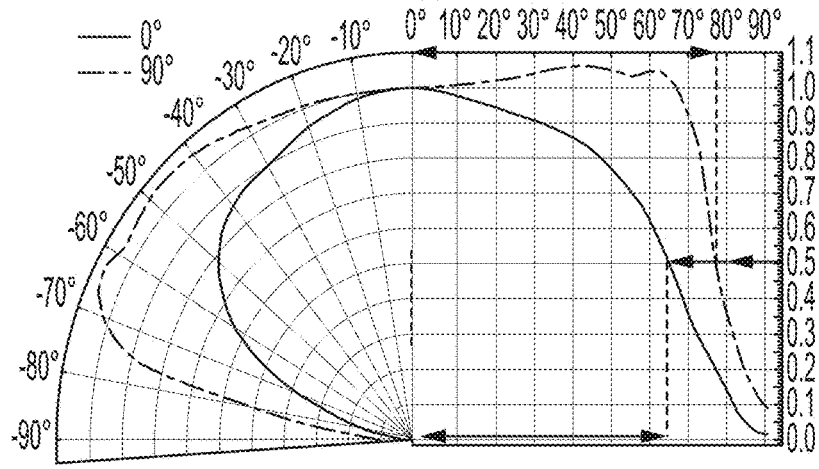
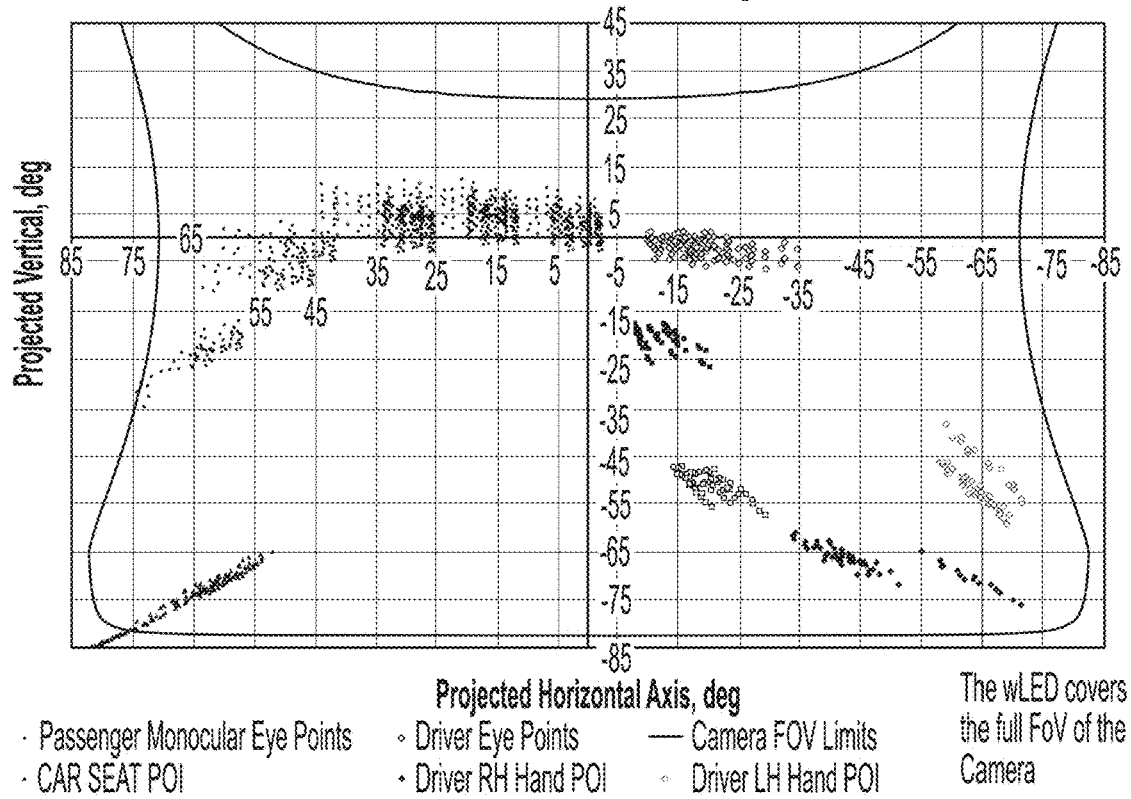
FIG. 36

| 10 Layer | | | 940nm | Transmission 0 Deg Visible Avg. | Reflected Color 0 Deg RGB Color | L | a | b |
|---|---|---|---|---|---|---|---|---|
| Substrate side (2mm SodaLime) | Mat. | t. (nm) | | | | | | |
| represents tin side of glass | SODASN | | Full Cell | 65% | 25% | | 82.4 | 2.4 | -2.6 |
| | NB2O5 | 37.62 | Coated Back Glass Sub | 82% | 34% | | 90.2 | 6.3 | -4.3 |
| | SIO2 | 77.41 | Stack Only | 94% | | | | | |
| | NB2O5 | 40.67 | Full Cell light In and Out | 42% | 6% | | | | |
| | SIO2 | 83.25 | | | | | | | |
| | NB2O5 | 53.29 | Go to the back glass only tab for back glass production targets | | | | | | |
| | SIO2 | 96.76 | | | | | | | |
| | NB2O5 | 64.55 | | | | | | | |
| | SIO2 | 135.11 | | | | | | | |
| | NB2O5 | 82.21 | | | | | | | |
| | SIO2 | 68.21 | | | | | | | |
| | ITO | 120 | | | | | | | |
| SPM side | | | | | | | | | |
| Total for stack w/o ITO | | 739.08 nm | | | | | | | |

FIG. 40

VEHICULAR CABIN MONITORING SYSTEM WITH CAMERA AND NEAR IR LIGHT EMITTER AT INTERIOR REARVIEW MIRROR ASSEMBLY

CROSS REFERENCE TO RELATED APPLICATIONS

The present application is a continuation of U.S. patent application Ser. No. 17/905,119, filed Aug. 26, 2022, which is a 371 U.S. National Stage filing of PCT Application No. PCT/US2022/072238, filed May 11, 2022, which claims the filing benefits of U.S. provisional application Ser. No. 63/363,598, filed Apr. 26, 2022, U.S. provisional application Ser. No. 63/267,316, filed Jan. 31, 2022, U.S. provisional application Ser. No. 63/262,642, filed Oct. 18, 2021, U.S. provisional application Ser. No. 63/260,359, filed Aug. 18, 2021, and U.S. provisional application Ser. No. 63/201,757, filed May 12, 2021, which are hereby incorporated herein by reference in their entireties. U.S. patent application Ser. No. 17/905,119 also is a continuation-in-part of U.S. patent application Ser. No. 17/905,109, filed Aug. 26, 2022, now U.S. Pat. No. 11,639,134, which is a 371 U.S. National Stage filing of PCT Application No. PCT/US2022/070882, filed Mar. 1, 2022, which claims the filing benefits of U.S. provisional application Ser. No. 63/267,316, filed Jan. 31, 2022, U.S. provisional application Ser. No. 63/262,642, filed Oct. 18, 2021, U.S. provisional application Ser. No. 63/260,359, filed Aug. 18, 2021, U.S. provisional application Ser. No. 63/201,757, filed May 12, 2021, U.S. provisional application Ser. No. 63/201,371, filed Apr. 27, 2021, U.S. provisional application Ser. No. 63/200,451, filed Mar. 8, 2021, and U.S. provisional application Ser. No. 63/200,315, filed Mar. 1, 2021.

FIELD OF THE INVENTION

The present invention relates generally to the field of interior rearview mirror assemblies for vehicles.

BACKGROUND OF THE INVENTION

It is known to provide a mirror assembly that is adjustably mounted to an interior portion of a vehicle, such as via a double ball pivot or joint mounting configuration where the mirror casing and reflective element are adjusted relative to the interior portion of a vehicle by pivotal movement about the double ball pivot configuration. The mirror casing and reflective element are pivotable about either or both of the ball pivot joints by a user that is adjusting a rearward field of view of the reflective element.

SUMMARY OF THE INVENTION

An interior rearview mirror assembly has a driver monitoring camera and a near infrared light emitter disposed at the mirror head so as to move in tandem with the mirror head when the mirror head is adjusted relative to an interior portion of the vehicle to adjust the driver's rearward view. The camera views the interior cabin of the vehicle through the mirror reflective element and the near infrared light emitter emits near infrared light through the mirror reflective element to illuminate the driver region and/or passenger region of the interior cabin of the vehicle. The near infrared light emitter comprises at least a first light emitting element and a second light emitting element. The first light emitting element is oriented at the mirror head so that a principal axis of a beam of light emitted by the first light emitting element would be directed toward a driver's region of a left hand drive vehicle if the mirror assembly were installed in the left hand drive vehicle and adjusted to provide the driver of the left hand drive vehicle a rearward view, while the second light emitting element is oriented at the mirror head so that a principal axis of a beam of light emitted by the second light emitting element would be directed toward a driver's region of a right hand drive vehicle if the mirror assembly were installed in the right hand drive vehicle and adjusted to provide the driver of the right hand drive vehicle a rearward view. The control circuitry is operable to enable the first light emitting element or the second light emitting element responsive to indication (such as via a signal from a remote device at the mirror assembly plant or at the vehicle or at the vehicle assembly plant or the like) that the vehicular interior rearview mirror assembly is installed or will be installed in a left hand drive vehicle or a right hand drive vehicle. The light emitter is thus software enabled to adapt a common mirror assembly for application to a left hand drive vehicle or to a right hand drive vehicle.

Thus, when the vehicular interior rearview mirror assembly is installed or will be installed in a left hand drive vehicle, the first near infrared light emitter, when electrically powered to emit light, emits light for a driver monitoring function, and when the vehicular interior rearview mirror assembly is installed or will be installed in a right hand drive vehicle, the second near infrared light emitter, when electrically powered to emit light, emits light for the driver monitoring function. When the respective first or second near infrared light emitter is electrically powered for the driver monitoring function, the other near infrared light emitter is not electrically powered for the driver monitoring function.

These and other objects, advantages, purposes and features of the present invention will become apparent upon review of the following specification in conjunction with the drawings.

BRIEF DESCRIPTION OF THE DRAWINGS

FIG. 6 is a plan view of the portion of the mirror head that accommodates the near infrared light emitters, with the near infrared light emitters comprising narrow beam emitters and wider beam emitters;

FIG. 7 is a schematic of the interior cabin of a left hand drive vehicle, showing the narrow beam emitters illuminating the driver's head;

FIG. 8 is a schematic of the interior cabin of a right hand drive vehicle, showing the narrow beam emitters not illuminating the driver's head;

FIG. 23 is a sectional view of the mirror head, showing the camera and light emitters disposed behind the mirror reflective element;

FIG. 29 is an exploded perspective view of a One-Box Electrochromic Interior DMS Rearview Mirror Assembly;

FIGS. 33D and 33E show plots in a horizontal plane and a vertical plane of different driver eye points as illuminated by the LHD nFOV LEDs in a LHD vehicle;

FIGS. 34A and 34B are plan views from above of the One-Box Interior DMS Mirror Assembly as mounted in a RHD vehicle;

FIGS. 35C and 35D show plots in a horizontal plane and a vertical plane of different driver eye points as illuminated by the RHD nFOV LEDs in a RHD vehicle;

FIG. 36 shows the illumination in the cabin of the vehicle when the wFOV LEDs are powered;

DESCRIPTION OF THE PREFERRED EMBODIMENTS

Figure 1:
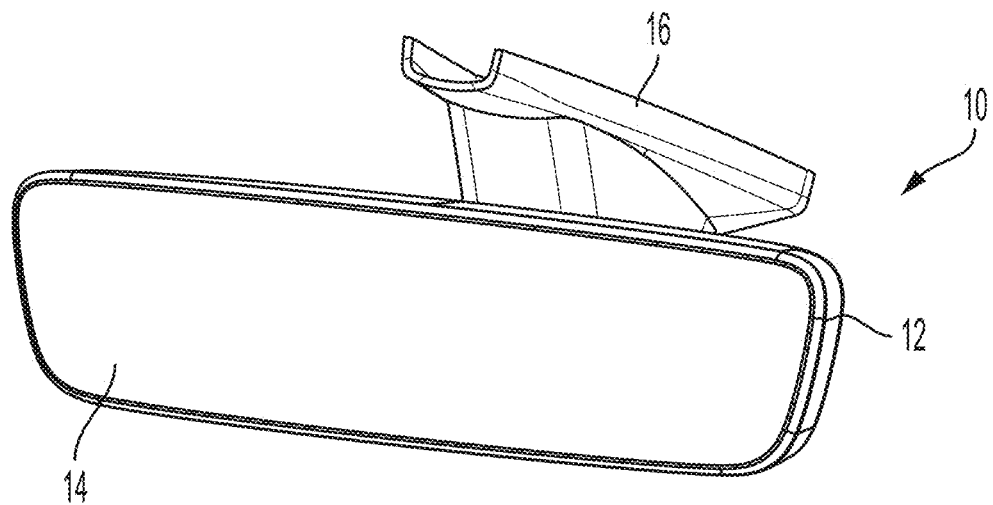
FIG. 1 is a perspective view of an interior rearview mirror assembly having a driver monitoring camera and a near infrared light emitter.
Figure 2:
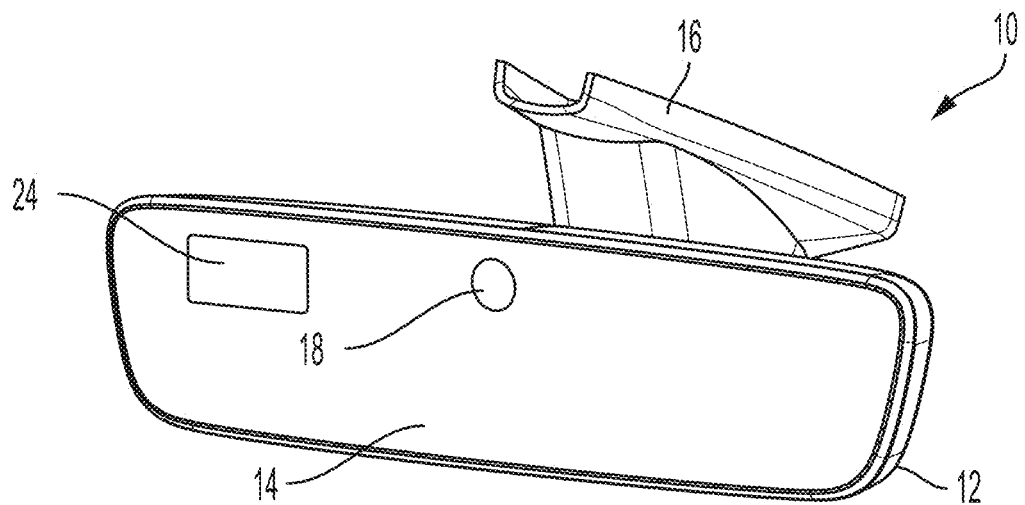
FIG. 2 is another perspective view of the interior rearview mirror assembly, showing the DMS camera and light emitters behind the reflective element.
Figure 3:
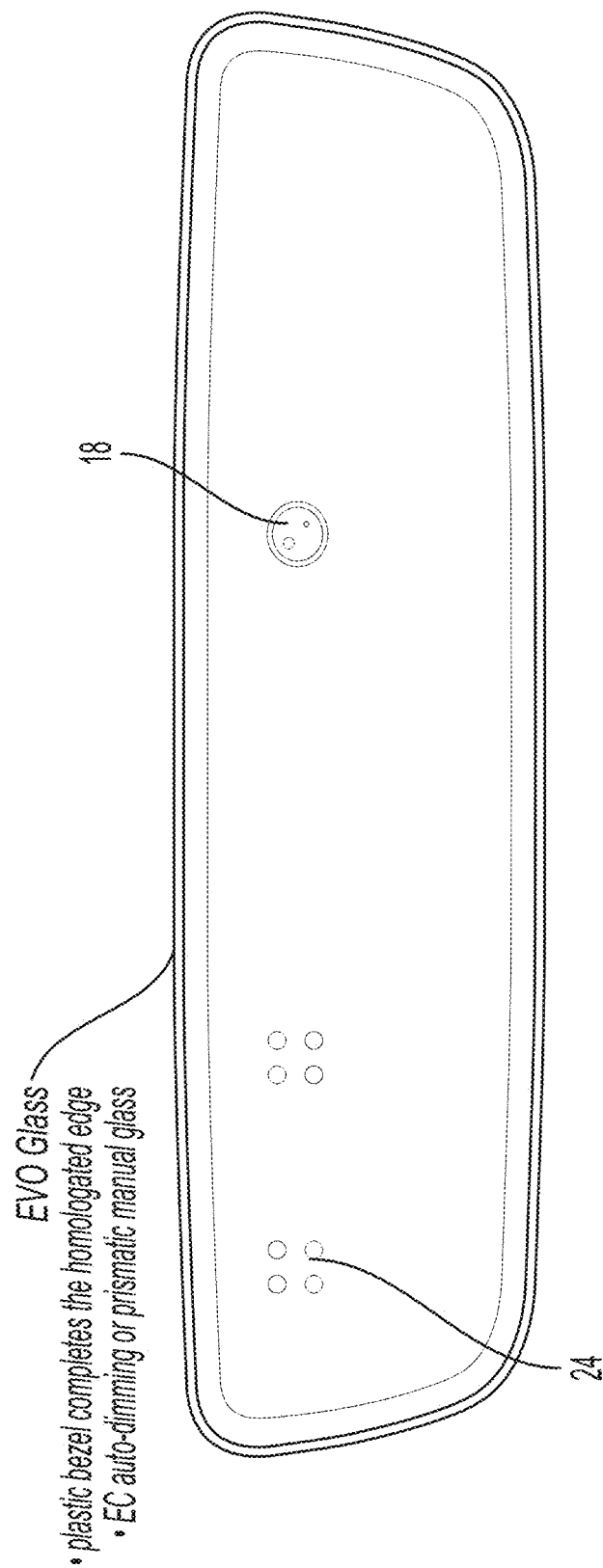
FIG. 3 is a plan view of a mirror head of the interior rearview mirror assembly.

Referring now to the drawings and the illustrative embodiments depicted therein, an interior rearview mirror assembly 10 for a vehicle includes a casing 12 and a reflective element 14 positioned at a front portion of the casing 12 (FIG. 1). In the illustrated embodiment, mirror assembly 10 is configured to be adjustably mounted to an interior portion of a vehicle (such as to an interior or in-cabin surface of a vehicle windshield or a headliner of a vehicle or the like) via a mounting structure or mounting configuration or assembly 16. The mirror reflective element may comprise a variable reflectance mirror reflective element that varies its reflectance responsive to electrical current applied to conductive coatings or layers of the reflective element.

The mirror assembly includes or is associated with a driver monitoring system (DMS), with the mirror assembly comprising a driver/occupant monitoring camera 18 disposed at a back plate 20 (and viewing through an aperture of the back plate) behind the reflective element 14 and viewing through the reflective element toward at least a head region of the driver of the vehicle. The DMS includes a near infrared light emitter 24 disposed at the back plate 20 and emitting light through another aperture of the back plate and through the reflective element.

With the DMS camera disposed in the mirror head, the camera moves with the mirror head (including the mirror casing and mirror reflective element that pivot at a pivot joint that pivotally connects the mirror head to the mounting structure of the interior rearview mirror assembly that in turn mounts at a windshield or at a headliner of the equipped vehicle), such that, when the driver aligns the mirror to view rearward, the camera is aligned with the line of sight of the driver. The location of the DMS camera and IR LED(s) at the mirror head provide an unobstructed view to the driver. The DMS preferably is self-contained in the interior rearview mirror assembly and thus may be readily implemented in a variety of vehicles, including existing vehicles and different models of the same vehicle brand (for example, in a BMW 3-series model and in a BMW X3 model and in a BMW 5-series model and in a BMW X5 model and in an BMW 7-series model, etc.). The driver monitoring camera may also provide captured image data for an occupancy monitoring system (OMS) or another separate camera may be disposed at the mirror assembly for the OMS function.

The mirror assembly includes a printed circuit board (PCB) 24 having a control or control unit comprising electronic circuitry (disposed at the circuit board or substrate in the mirror casing), which includes driver circuitry for controlling dimming of the mirror reflective element. The circuit board (or a separate DMS circuit board) includes a processor that processes image data captured by the camera 18 for monitoring the driver and determining, for example, driver attentiveness and/or driver drowsiness. The driver monitoring system includes the driver monitoring camera and may also include an occupant monitoring camera (or the driver monitoring camera may have a sufficiently wide field of view so as to view the occupant or passenger seat of the vehicle as well as the driver region), and may provide occupant detection and/or monitoring functions as part of an occupant monitoring system (OMS).

Figure 5:
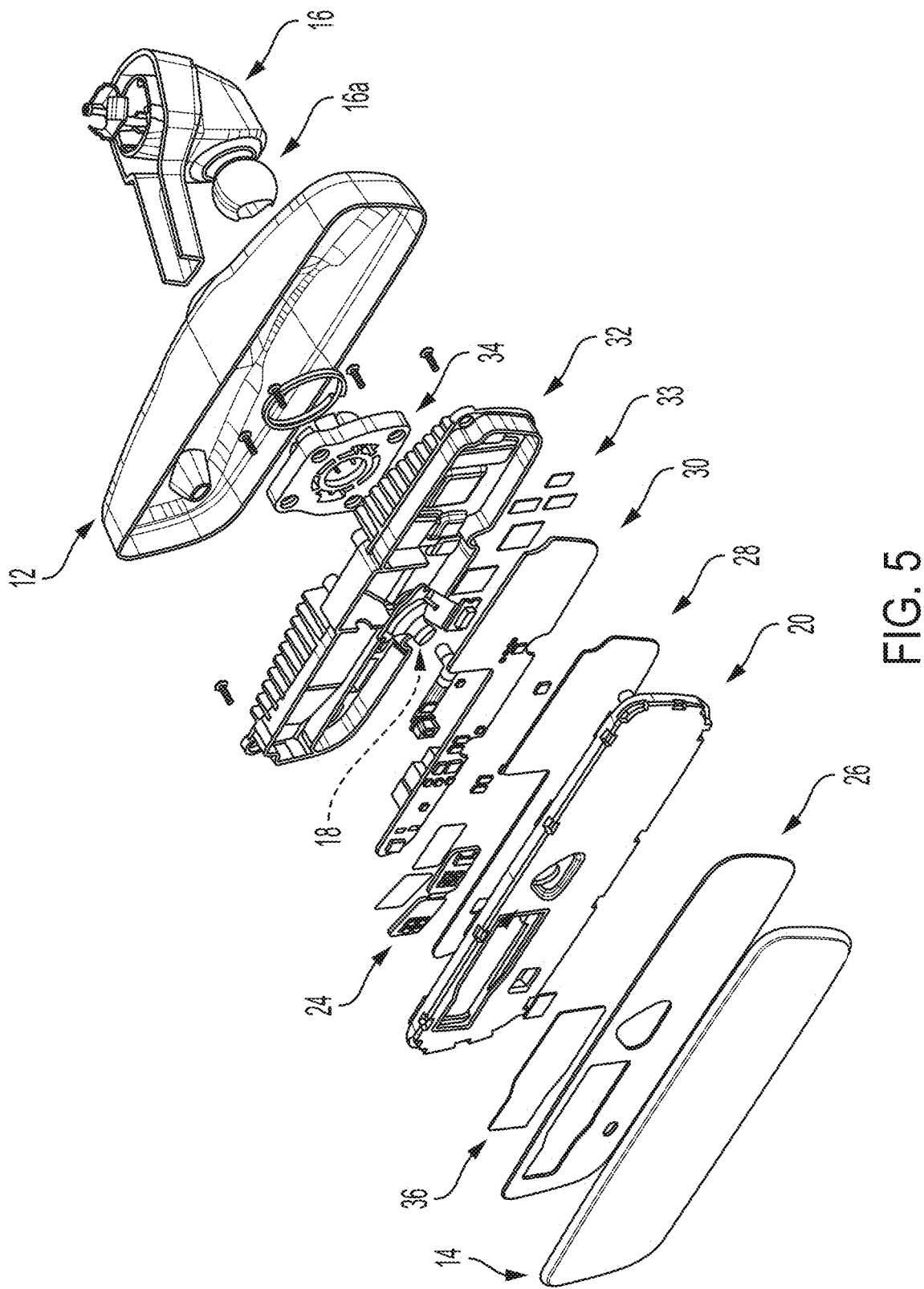
FIG. 5 is an exploded perspective view of the interior rearview mirror assembly of FIG. 4.

The mirror assembly may also include one or more infrared (IR) or near infrared light emitters 24 (such as IR or near-IR light emitting diodes (LEDs) or vertical-cavity surface-emitting lasers (VCSEL) or the like) disposed at the back plate 20 behind the reflective element 14 and emitting near infrared light through the aperture of the back plate and through the reflective element toward the head region of the driver of the vehicle. As shown in FIG. 5, the IR emitter device 24 comprises an IR emitter or LED printed circuit board, with a first set of near infrared light emitting diodes 24a (e.g., a set of wider beam LEDs) at one part of the LED PCB and a second set of near infrared light emitting diodes 24b (e.g., a set of narrower beam LEDs) at another part of the LED PCB. The LED PCB has one part angled relative to the other part to emit light in a desired direction depending on the orientation of the mirror head. Thus, the first set of near infrared light emitting diodes may be angled toward the left side of the vehicle so as to be directed toward a driver of a left hand drive vehicle (if the mirror assembly is installed in a left hand drive vehicle and the first set of near infrared light emitting diodes are enabled for the driver monitoring function), while the second set of near infrared light emitting diodes may be angled toward the right side of the vehicle so as to be directed toward a driver of a right hand drive vehicle (if the mirror assembly is installed in a right hand drive vehicle and the second set of near infrared light emitting diodes are enabled for the driver monitoring function).

Conventional driver monitoring systems (DMS) in likes of BMW, Ford, GM, Tesla, and Subaru vehicles (for example, for GM SuperCruise™ or for Ford's BlueCruise™ as described in https://www.consumerreports.org/car-safety/driver-monitoring-systems-ford-gm-earn-points-in-cr-tests-a6530426322) are "Two-Box" DMS in that (i) the camera used to monitor the driver's head/eyes and the near-IR emitting light sources that illuminate the driver's head/eyes are accommodated in a first box or module (that is usually located at the steering column of an equipped vehicle or in an overhead region of the equipped vehicle) and (ii) the electronics/software used to analyze captured image data to determine the driver's gaze direction or head position or eye movement or alertness or drowsiness is accommodated in a separate second box or module that is located remote from and at a distance from the first box and that connects to the first box typically via a wired connection (the second box typically comprises an ECU that can be part of a head unit of the equipped vehicle and that besides DMS, optionally can provide other features).

Referring now to FIG. 29, a "One-Box" DMS electrochromic interior rearview mirror assembly 110 has both the camera 10 used to monitor the driver's head/eyes and the near-IR emitting light sources 8 that illuminate the driver's head/eyes accommodated by an interior rearview mirror assembly (and preferably, are both accommodated within the mirror head of the interior rearview mirror assembly). Thus, the one-box DMS electrochromic interior rearview mirror assembly allows an original equipment manufacturer (OEM) of vehicles (such as for example VW or Toyota or Honda or GM or Ford) to equip vehicles with the likes of a DMS interior rearview electrochromic mirror assembly that includes the camera/illumination sources/driver monitoring software/associated driver monitoring electronic circuitry such as data processing chip(s), memory, electronic components, printed circuit board(s) that includes automatic dimming circuitry, data processing chip(s), memory, electronic components, light sensors for detecting glare and ambient lighting, and that includes power supplies, electrical connector(s), heat sink(s), mechanical parts, etc. The One-Box Interior DMS Rearview Mirror Assembly thus can be purchased by an OEM from an interior rearview mirror assembly manufacturer and can be installed by that OEM into a being-assembled vehicle (typically mounting to a mirror mounting button or similar element that is adhered to the in-cabin side of the windshield of the vehicle). To operate in the equipped vehicle, the One-Box Interior DMS Rearview Mirror Assembly connects to a vehicle wiring harness of the vehicle and is supplied via this vehicle wiring harness with ignition voltage (nominal 12V DC but can vary from 9V (6V for automatic stop/start) to 16V or so depending on the vehicle type and the operating condition of the vehicle). The one-box Interior DMS rearview mirror assembly via this wiring harness is supplied with vehicle data, such data including vehicle and other data supplied via a CAN bus or link (that can carry to the mirror vehicle information and that can carry from the mirror distraction alerts, etc.) or supplied via a Local Area Network (LIN) bus or line. The wire harness can comprise a reverse inhibit signal/line that communicates to the interior electrochromic mirror assembly that the driver has selected reverse gear/reverse propulsion, an Ethernet link, a video in/out line, electrical power, a ground line, and/or a GMSL/FPD link (video in/out). Video out may be provided, such as for video conferencing and/or "selfies" applications. Optionally, for privacy protection, the images of occupants may be blurred if displayed (during the likes of in-vehicle video conferencing) on an in-cabin display or if wirelessly transmitted to viewers remote from the equipped vehicle. The system may blur the complete image, leaving only the driver/co-driver or all passenger faces clear.

Optionally, black bars may be overlaid over the persons' faces. Image stabilization may be provided to compensate potential movements of the image, and/or dynamic cropping of the images may be performed.

The vehicle wire harness also receives outputs/data from the one-box interior rearview mirror assembly DMS, such outputs used for various features, systems and functions of the equipped vehicle. The outputs/data from the one-box interior DMS rearview mirror assembly include data related to head position of a driver of the equipped vehicle, eye gaze direction of the driver of the equipped vehicle, hand position of the driver of the equipped vehicle, drowsiness of the driver of the equipped vehicle, attentiveness of the driver of the equipped vehicle etc., along with other outputs/data relating to some (and preferably all) of the following:

Emotional state
Cognitive distraction
  Disengagement
  Visual distraction
Level of drowsiness
  Microsleeping
  Sleeping
Visual State
  Gesture
    Head nodding/shaking
  Activity
    Abnormal head posture
    Hand position classification
    Held object classification
    Speaking
    Laughing
    Coughing
    Sneezing
    Yawning
    Smoking
  Phone handling
    Video conferencing
  Viewing target classification
    Child seat detection
    Seat belt status
    Occupant size
    Occupant age
    Gender
    Presence detection
    Convenience recognition
    Security recognition
    Occupant change
    Spoofing
    Facial Expression
Body Pose Tracking
  Eye tracking
  Head tracking
  Eyelid dynamics
  Brightness control
  Face searching
  Mouth Shape
Camera pose estimation
  Frozen image detection
  Face occlusion
  Lens blockage
  Low image quality
  IR light blockage
  Camera misalignment The interior DMS rearview mirror assembly provides a stand-alone One-Box DMS solution that has the camera/illumination near-IR sources/DMS software and its associated data processing chip(s)/automatic dimming circuitry/circuitry used to control an exterior electrochromic mirror reflective element that is part of an exterior sideview mirror of the equipped vehicle/data processing circuitry/communication circuitry/memory/power supplies/associated electronics and hardware/heat sinks, etc. packaged into, integrated into and accommodated by a vehicular interior rearview mirror assembly, and preferably covertly integrated within the mirror head of the vehicular interior rearview mirror assembly behind (and rendered covert to a driver's view by) a transflective mirror reflective element of the vehicular interior rearview mirror assembly.

The interior rearview mirror thus has embedded cameras, IR illuminators and the processor for processing captured image data for the driver monitoring application. The inward facing camera 18 and IR illuminators 24 are fixed within the mirror head, and thus both components are coupled with the mirror body. Hence, the camera's field of view is subject to change from driver to driver as the mirror head is adjusted to set the driver's preferred rearward view.

Figure 4:
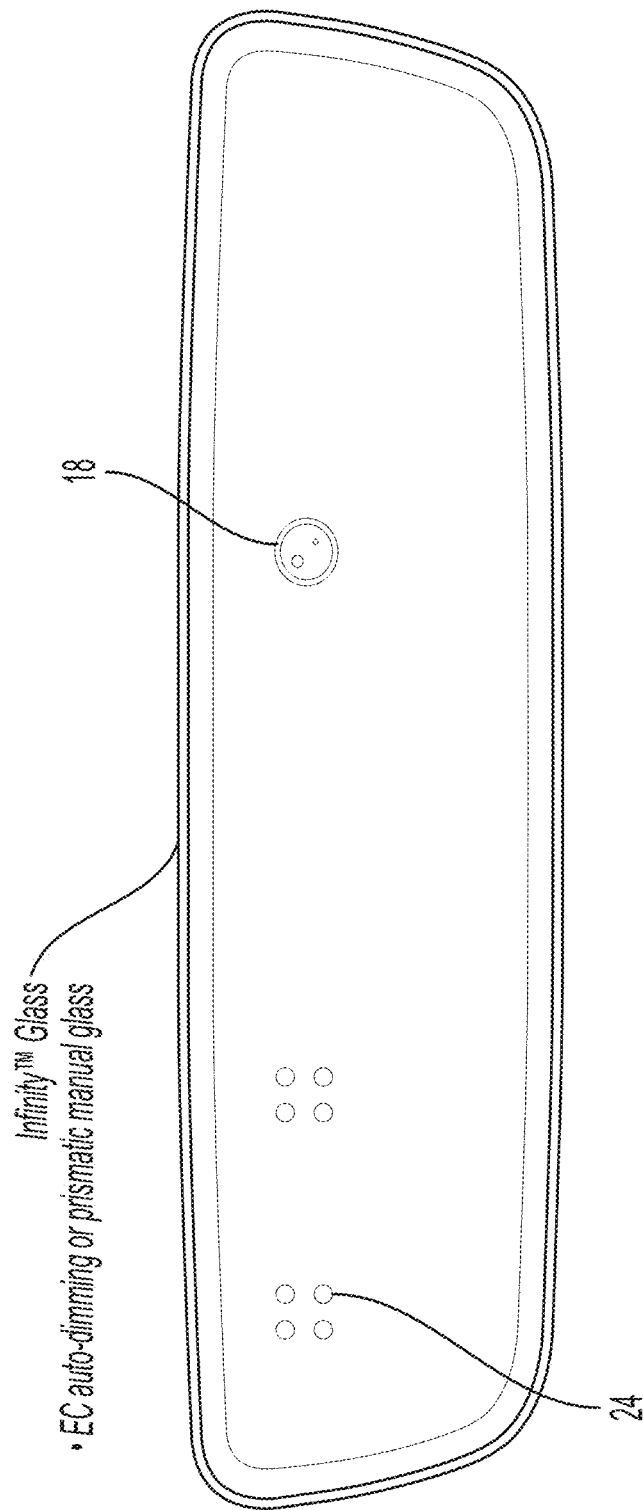
FIG. 4 is a plan view of another mirror head of the interior rearview mirror assembly.

In the illustrated embodiment of FIGS. 3-8, the camera and light emitters are disposed behind the mirror reflective element, which may comprise an electro-optic (such as electrochromic or EC) mirror reflective element or a prismatic mirror reflective element. The mirror casing may include a plastic bezel portion that circumscribes the perimeter edge of the mirror reflective element (FIG. 3) and that provides an outer curved surface that transitions from the outer surface of the mirror casing to the planar front surface of the mirror reflective element (optionally with no part of the plastic bezel portion overlapping or overlaying onto the planar front surface of the mirror reflective element), such that the plastic bezel completes the homologated edge. Optionally, the mirror reflective element may provide an exposed outer curved surface that transitions from the outer surface of the mirror casing to the planar front surface of the mirror reflective element (FIG. 4).

As shown in FIG. 5, the mirror back plate 20 is adhered at the rear of the mirror reflective element 14 (such as via an adhesive foam tape 26). A heat spreader 28 (e.g., a thin aluminum plate) may be disposed at the rear of the back plate, and the printed circuit board 30 may attach at the rear of the heat spreader. A heat sink/chassis and EMI form in place (FIP) gasket 32 is disposed at the rear of the printed circuit board and is configured to attach at the pivot element 34 (shown as a socket element) that pivotally attaches at the ball member 16a of the mirror mount 16. Thermal interface material 33 may be disposed between the circuit board 30 and the chassis 32 to enhance heat dissipation from the circuit board to the chassis and heat sink.

Optionally, the mirror back plate or attachment plate may be molded out of a metal filled injection moldable material (e.g., Stainless Steel (SS) fiber, such as a polycarbonate (PC) Acrylonitrile butadiene styrene (ABS) and SS fiber material) to provide electromagnetic interference (EMI) mitigation (EMC shield). Optionally, the heatsink may be formed via additive manufacturing (3D printing or the like) to provide an additive manufactured heatsink with capillary effect to help transfer heat more uniformly and away from high power components.

The near infrared light emitter 24 includes a circuit board or element 25 that is attached at the chassis 32 via a thermal adhesive, and is disposed at the aperture of the back plate, with an IR longpass filter 36 disposed between the reflective element and the near IR light emitter. The near IR light emitter 24 is disposed at a left side of the mirror head (as viewed by a driver of the vehicle with the mirror head installed at the vehicle) and is configured to illuminate the driver's head region of a left hand drive vehicle.

In the illustrated embodiment, the light emitter 24 has two sets of LEDs disposed on the circuit board. One set of LEDs 24*a* emits a wider beam of near infrared light when energized (e.g., four wider beam LEDs) and another set of LEDs 24*b* emits a narrower beam of near infrared light when energized (e.g., four narrower beam LEDs). The narrower beam LEDs may be powered or energized for the driver monitoring function, while the wider beam LEDs may be powered or energized for the occupant monitoring function (and may be episodically energized for illuminating particular frames of captured image data, such as by utilizing aspects of the systems described in International PCT Application No. PCT/US2022/070882, filed Mar. 1, 2022, which published on Sep. 9, 2022 as International Publication No. WO2022187805, which claims the filing benefits of U.S. provisional application Ser. No. 63/267,316, filed Jan. 31, 2022, U.S. provisional application Ser. No. 63/262,642, filed Oct. 18, 2021, U.S. provisional application Ser. No. 63/260,359, filed Aug. 18, 2021, U.S. provisional application Ser. No. 63/201,757, filed May 12, 2021, U.S. provisional application Ser. No. 63/201,371, filed Apr. 27, 2021, U.S. provisional application Ser. No. 63/200,451, filed Mar. 8, 2021, and U.S. provisional application Ser. No. 63/200,315, filed Mar. 1, 2021, which are all hereby incorporated herein by reference in their entireties).

The narrow beam LEDs 24*b* are angled or canted or biased (e.g., by ten degrees or thereabouts) toward the left and thus toward the driver of a left hand drive vehicle, while the wider beam LEDs 24*a* are not biased toward either side. When the mirror assembly is installed in a left hand drive vehicle (FIG. 7), the narrow beam LEDs illuminate the driver's head region while the wider beam LEDs illuminate the passenger area as well as the driver area. However, when the mirror assembly is installed in a right hand drive vehicle (FIG. 8), the narrow beam LEDs do not illuminate the driver's head region while the wider beam LEDs illuminate the passenger area as well as the driver area.

Figure 9:
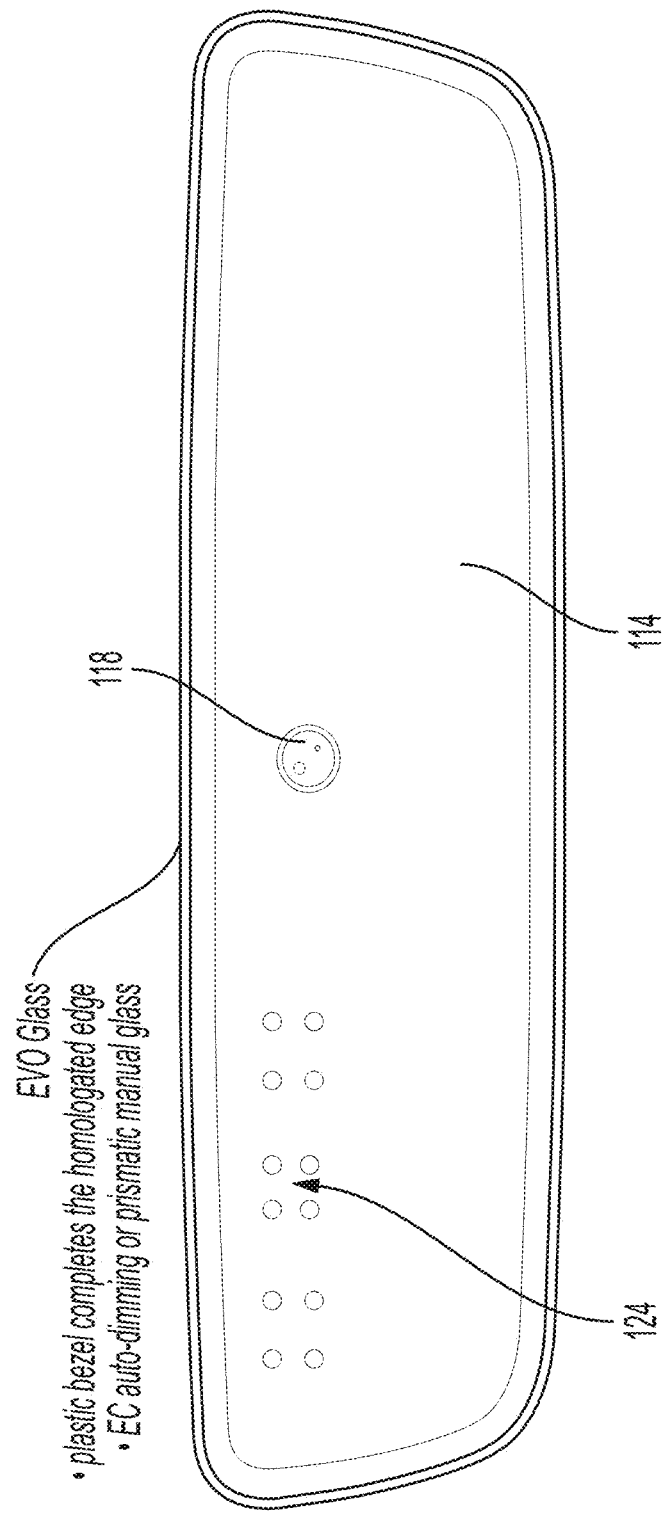
FIGS. 9 and 10 are plan views of other mirror heads of the interior rearview mirror assembly.
Figure 10:
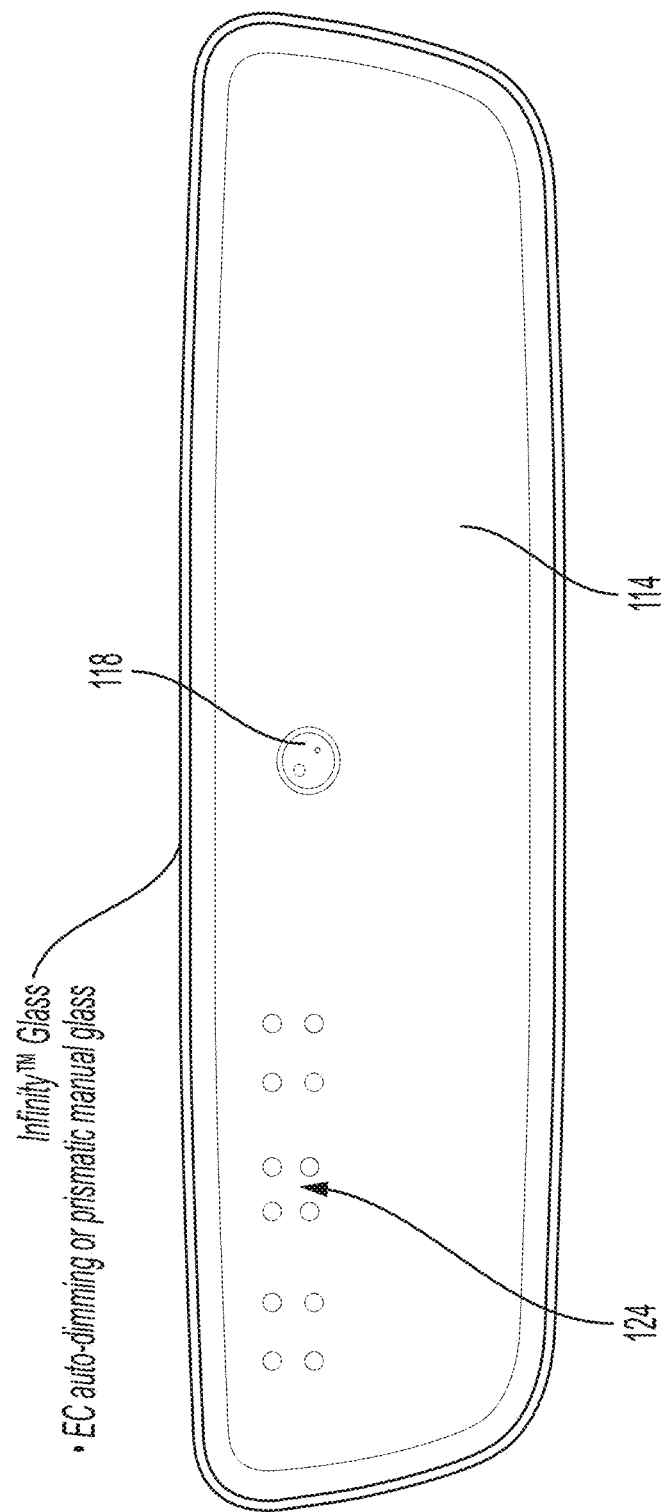
Figure 11:
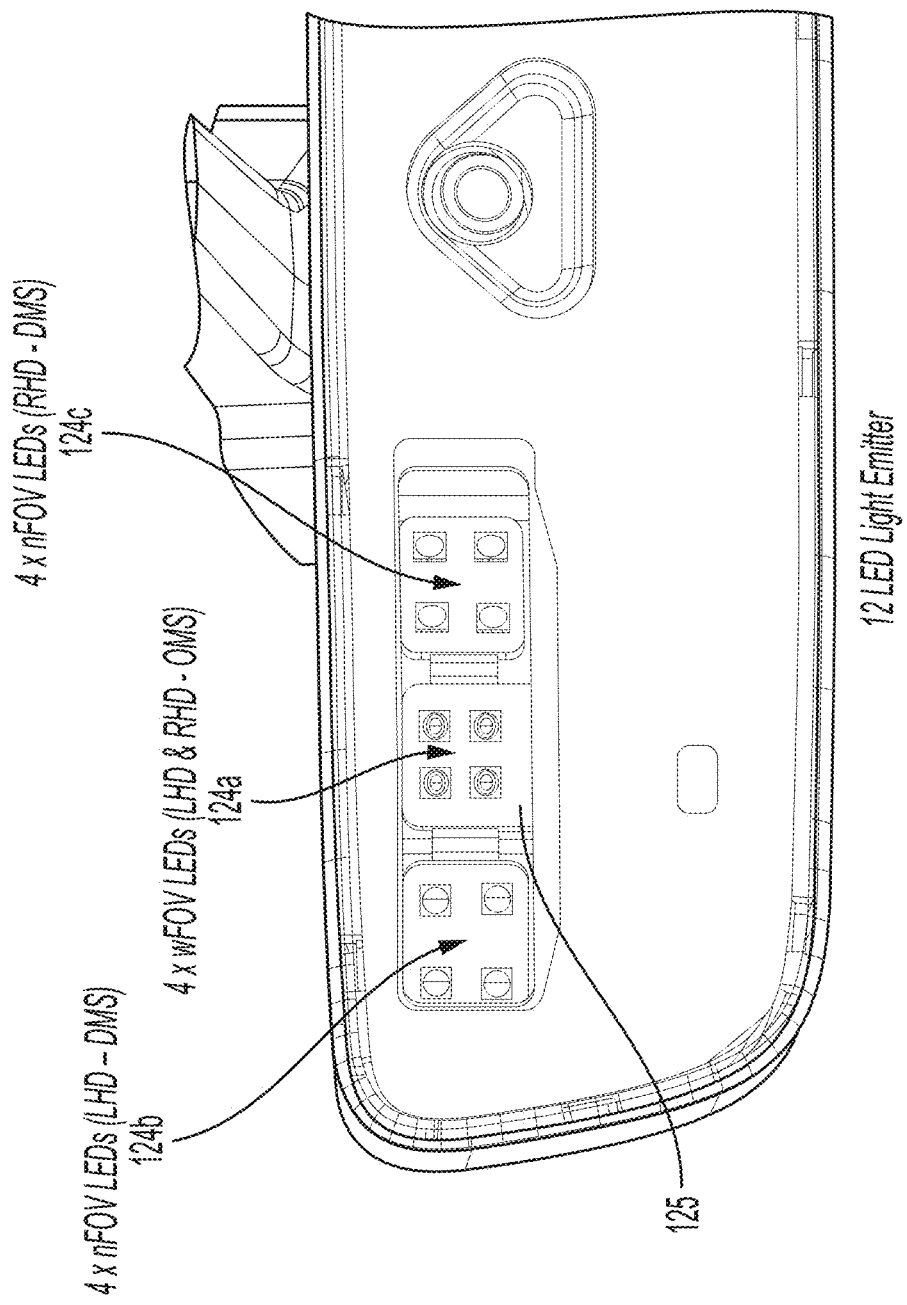
FIG. 11 is a plan view of the portion of the mirror head that accommodates the near infrared light emitters, with two narrow beam emitters, one for illuminating a driver's head of a left hand drive vehicle and the other for illuminating a driver's head of a right hand drive vehicle.

Referring now to FIGS. 9-11, the mirror assembly includes a near infrared light emitter that is configured and operable to selectively emit light toward the driver head region when the mirror assembly is disposed in a left hand drive vehicle (with the driver sitting in a left side driver seat) or when the mirror assembly is disposed in a right hand drive vehicle (with the driver sitting in a right side driver seat). The system provides for DMS/OMS illumination that is software configurable based on vehicle data for the country code. For example, the DMS light emitters may comprise two or three separate banks/groups/sets of emitters or LEDs. One group is aimed or angled toward the left hand side of the vehicle and one group is aimed or angled toward the right hand side of the vehicle. Optionally, there is a third group that is aimed somewhere in between (in the illustrated examples discussed below, the third group is directed perpendicular to the mirror surface). These groups or sets can be made up of various combinations of wide and narrow LEDs or VCSELs. Knowing the country the vehicle is in and thus if it is a Left-Hand-Drive (LHD) vehicle or a Right-Hand-Drive (RHD) vehicle allows the software on the DMS/OMS ECU (remote or inside the mirror) to configure which LEDs are activated for specific DMS or OMS features and/or frames (such as by utilizing aspects of the driver/occupant monitoring systems described in International PCT Application No. PCT/US2022/070882, filed Mar. 1, 2022, which published on Sep. 9, 2022 as International Publication No. WO2022187805, which is hereby incorporated herein by reference in its entirety). Because the controller and system are software configurable, the mirror design can be common for LHD/RHD vehicles and can be used globally.

Thus, the DMS light emitters are provided in a mirror assembly with two sets of narrow beam LEDs, one set that is for illuminating a driver of a left hand drive vehicle when the mirror assembly is installed in the left hand drive vehicle, and another set that is for illuminating a driver of a right hand drive vehicle when the mirror assembly is installed in the right hand drive vehicle. For example, and with reference to FIGS. 9-11, the mirror assembly 110 includes the camera 118 and near IR light emitters 124 disposed behind the mirror reflective element 114 and at the left side of center of the mirror head. The near IR light emitters include three sets of LEDs (e.g., each set having four LEDs), including a wider beam set of LEDs 124*a* disposed between a first narrow beam set of LEDs 124*b* and a second narrow beam set of LEDs 124*c*. The wider beam set of LEDs 124*a* is centrally located at the light emitter PCB 125 and has no bias in either direction (i.e., its principal beam axis is generally normal to the planar surface of the mirror reflective element and with the beam providing greater than 100 degrees of illumination across the interior cabin, such as greater than 120 degrees of illumination across the interior cabin, such as greater than 150 degrees of illumination across the interior cabin), while the first narrow beam set of LEDs 124*b* is disposed at the left side of the wider set and is biased (e.g., canted or angled at about 0 to 20 degrees, preferably 5 to 15 degrees, such as, for example, 10 degrees) toward the left side, and the second narrow beam set of LEDs 124*c* is disposed at the right side of the wider set and is biased (e.g., canted or angled at about 10 to 30 degrees, preferably 15 to 25 degrees, such as, for example, 20 degrees or 22 degrees) toward the right side (and with each narrow beam set providing less than 100 degrees of illumination across the interior cabin, such as less than 80 degrees of illumination across the interior cabin, such as less than 60 degrees of illumination across the interior cabin). The light emitter circuit board 125 may comprise three parts, with the center part being parallel to the planar surface of the reflective element and with the side parts being angled or canted relative to the center part and relative to the planar surface of the reflective element to provide the desired or selected angling of the principal beam axis of the narrow beam set of LEDs. For applications where the light emitters are disposed at the right side of center of the mirror head, the angles of the narrow beam emitting light emitters would be reversed, so that the first narrow beam set of LEDs disposed at the left side of the wider set is biased (e.g., canted or angled at about 10 to 30 degrees, preferably 15 to 25 degrees, such as, for example, 20 degrees or 22 degrees) toward the left side, and the second narrow beam set of LEDs disposed at the right side of the wider set is biased (e.g., canted or angled at about 0 to 20 degrees, preferably 5 to 15 degrees, such as, for example, 10 degrees) toward the right side (and with each narrow beam set providing less than 100 degrees of illumination across the interior cabin, such as less than 80 degrees of illumination across the interior cabin, such as less than 60 degrees of illumination across the interior cabin).

Figures 12, 13:
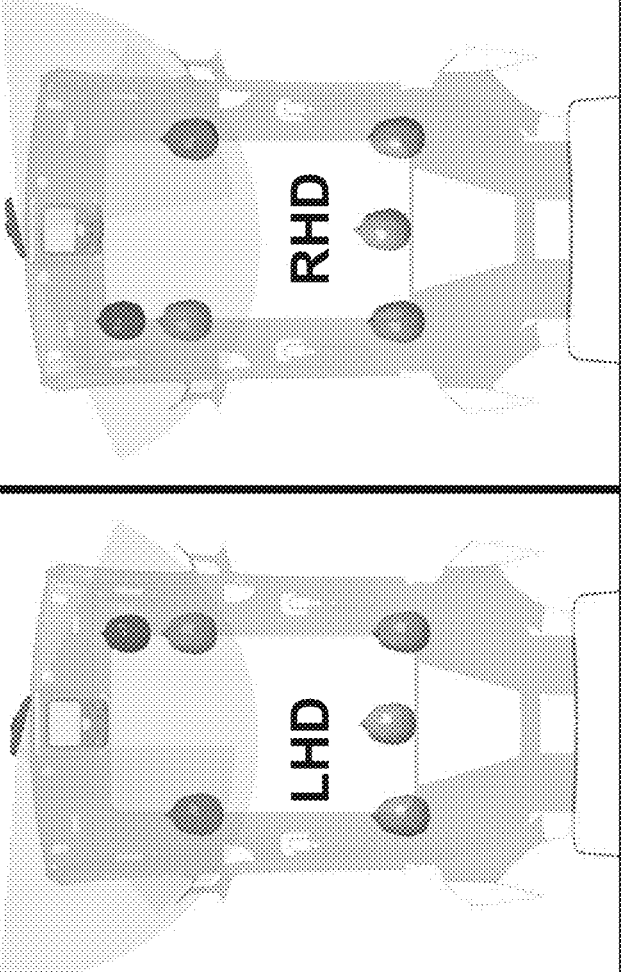
FIG. 12 is a schematic of the interior cabin of a left hand drive vehicle, showing the left hand drive narrow beam emitters illuminating the driver's head.
FIG. 13 is a schematic of the interior cabin of a right hand drive vehicle, showing the right hand drive narrow beam emitters illuminating the driver's head.

Thus, when the mirror assembly is disposed in a left hand drive vehicle (FIG. 12), the system is set so that the driver monitoring LEDs (that are energized when the system is capturing image data for the driver monitoring function) comprise the first narrow beam set of LEDs 124*b*, such that the driver's head is illuminated by the near infrared illumination emitted by the LEDs 124*b* during image capture for the driver monitoring function. Similarly, when the mirror assembly is disposed in a right hand drive vehicle (FIG. 13), the system is set so that the driver monitoring LEDs comprise the second narrow beam set of LEDs 124b, such that the driver's head is illuminated by the near infrared illumination emitted by the LEDs 124b during image capture for the driver monitoring function. The wider beam set of LEDs is the same for either the left hand drive application or right hand drive application and provides wider illumination during image capture for the occupant monitoring function.

The light emitter is software enabled so that either the first or second narrow beam set of LEDs is enabled (for the driver monitoring function) depending on the type (left hand drive or right hand drive) of vehicle in which the mirror assembly is installed. Thus, when the mirror assembly is installed in a left hand drive vehicle, the first narrow beam set of LEDs is enabled (for the driver monitoring function) so that, when operating for the driver monitoring function, the first narrow beam set of LEDs is energized (and the second narrow beam set of LEDs is not enabled or energized). Alternatively, if the mirror assembly is installed in a right hand drive vehicle, the second narrow beam set of LEDs is enabled (for the driver monitoring function) so that, when operating for the driver monitoring function, the second narrow beam set of LEDs is energized (and the first narrow beam set of LEDs is not enabled or energized).

Figure 14:
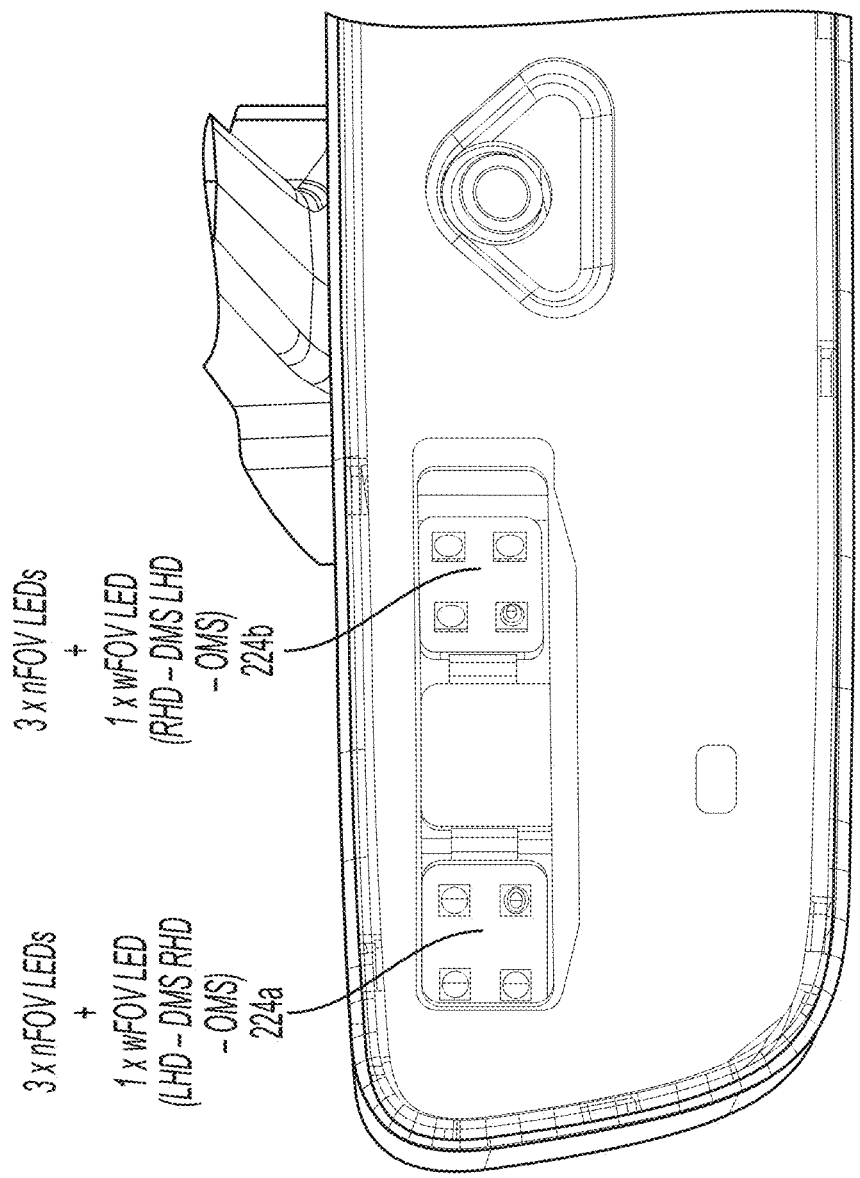
FIGS. 14 and 15 are plan views of other mirror heads of the interior rearview mirror assembly, showing narrow beam emitters and wide beam emitters for left hand drive and right hand drive vehicles.

Although shown as having three sets of LEDs, each set having four individual LEDs, other LED (or other light emitter) arrangements and configurations are contemplated. For example, and with reference to FIG. 14, the light emitter 224 may comprise two sets of LEDs, a left set 224a having three narrow beam LEDs and a wider beam LED, and a right set also having three narrow beam LEDs and a wider beam LED. The light emitter is software enabled so either the left side narrow beam LED or the right side narrow beam LED is enabled (for the driver monitoring function) depending whether the mirror assembly is installed in a left hand drive vehicle or a right hand drive vehicle. The wider beam LEDs are used for the OMS function, and the left side wider beam LED may be used for the OMS for a right hand drive vehicle, and the right side wider beam LED may be used for the OMS for a left hand drive vehicle.

Figure 15:
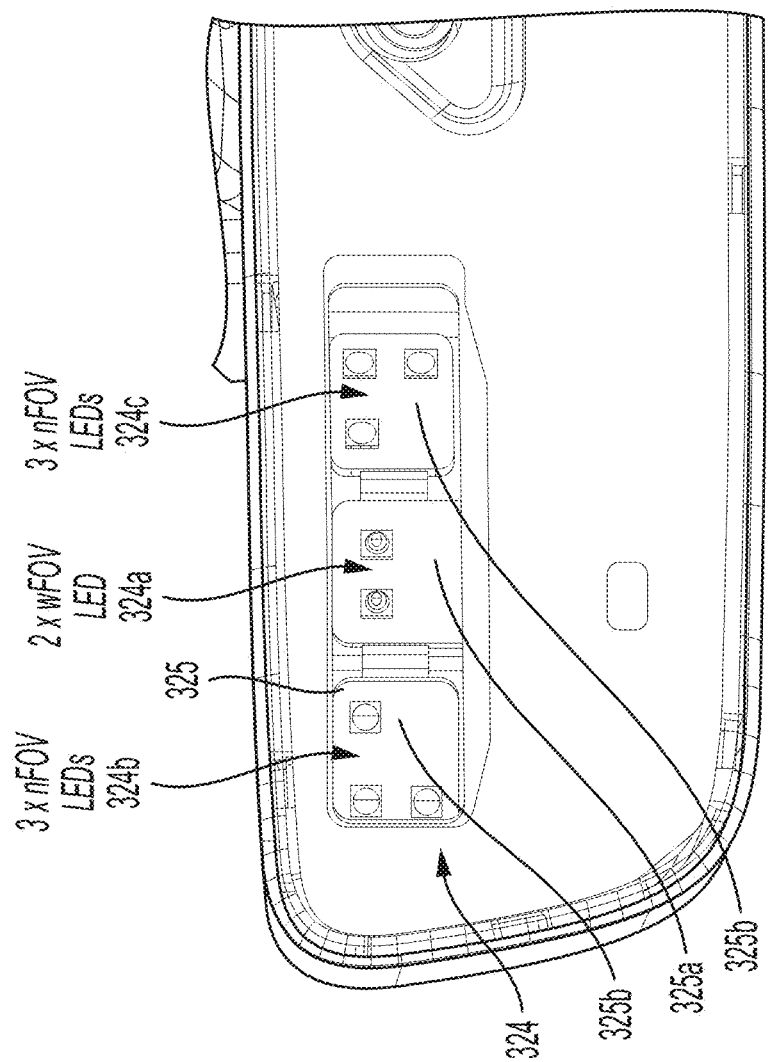
Figure 16:
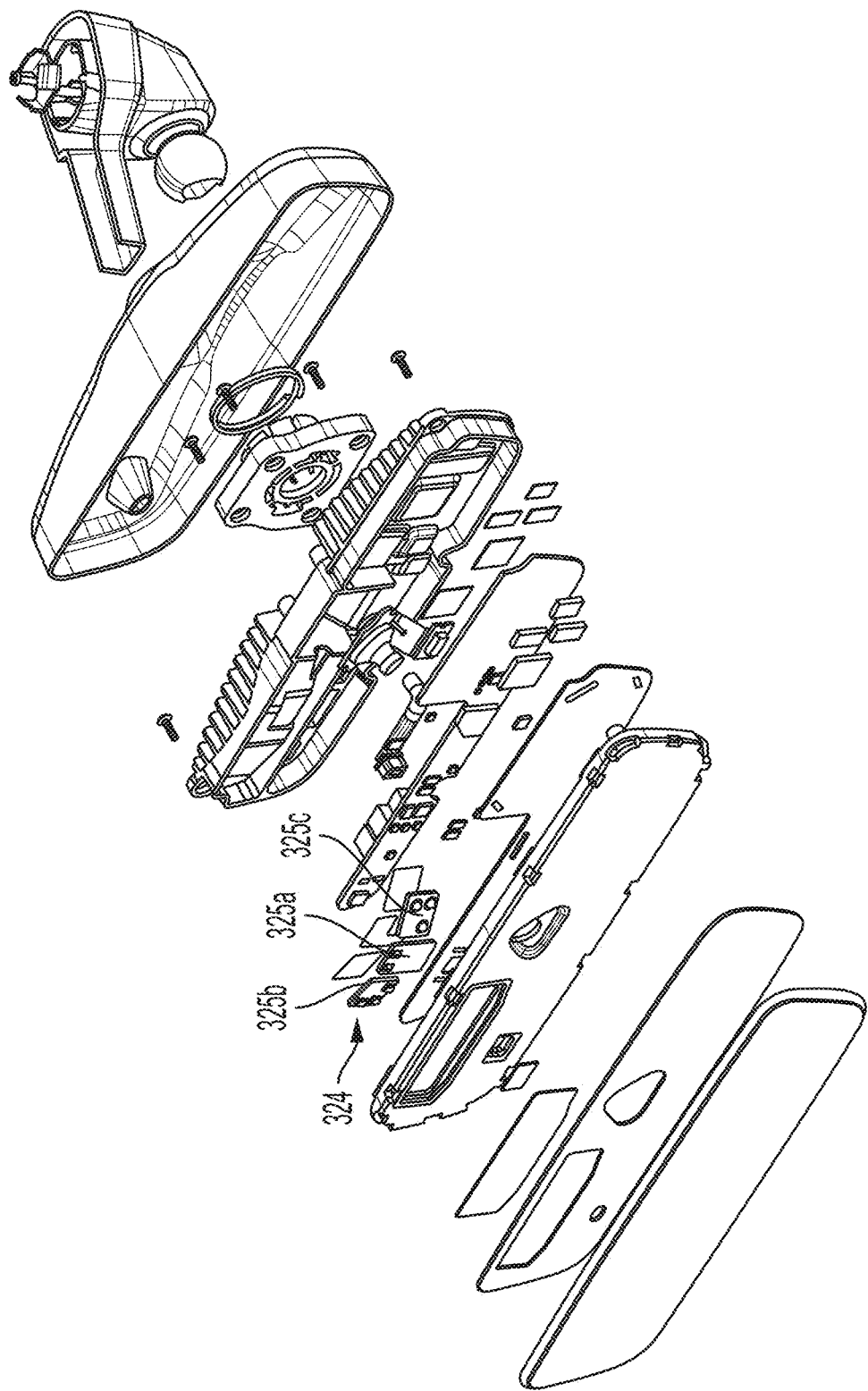
FIG. 16 is an exploded perspective view of the interior rearview mirror assembly of FIG. 15.
Figure 17:
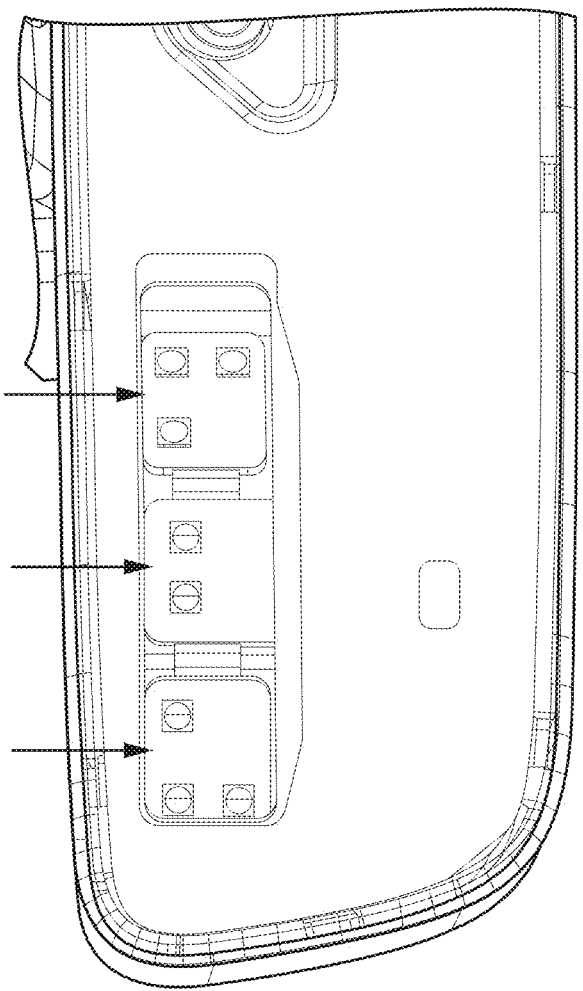
FIG. 17 is a plan view of the portion of the mirror head that accommodates the near infrared light emitters, with two narrow beam emitters, one for illuminating a driver's head of a left hand drive vehicle and the other for illuminating a driver's head of a right hand drive vehicle.
Figures 18, 19:
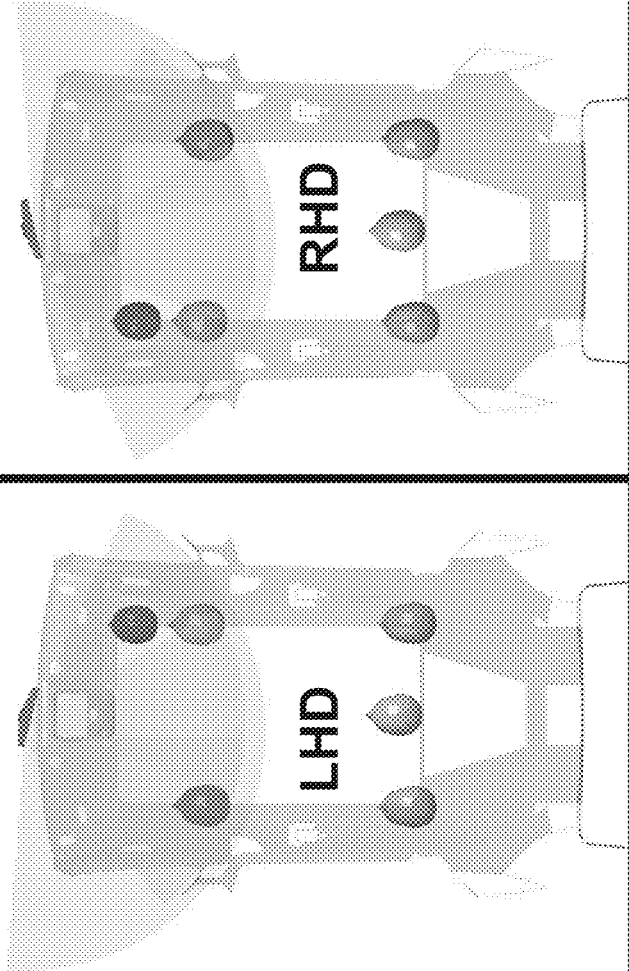
FIG. 18 is a schematic of the interior cabin of a left hand drive vehicle, showing the left hand drive narrow beam emitters illuminating the driver's head.
FIG. 19 is a schematic of the interior cabin of a right hand drive vehicle, showing the right hand drive narrow beam emitters illuminating the driver's head.

Optionally, and with reference to FIGS. 15-17, the light emitter 324 may be similar to light emitter 124, discussed above, but with the center wider beam set of LEDs 324a (the wFOV LEDs) only having two LEDs, and each of the two narrower beam sets of LEDs having three narrower beam LEDs. The left side set 324b (of narrow beam or nFOV LEDs) is angled or canted or biased (such as, for example, 10 degrees) toward the left side of the vehicle (toward a driver region of a left hand drive vehicle), while the right side set 324c (of narrow beam or nFOV LEDs) is two narrower beam sets of LEDs having three narrower beam LEDs is angled or canted or biased (such as, for example, 20 degrees) toward the right side of the vehicle (toward a driver region of a right hand drive vehicle). The light emitter circuit board 325 may comprise three parts, with the center part 325a being parallel to the planar surface of the reflective element and with the side parts 325b, 325c being angled or canted relative to the center part and relative to the planar surface of the reflective element to provide the desired or selected angling of the principal beam axis of the narrow beam LEDs. The light emitter is software enabled such that the right hand and left hand driver LEDs are enabled (for the driver monitoring function) depending on the type of vehicle at which the mirror assembly is installed (see FIGS. 17-19).

Figure 20:
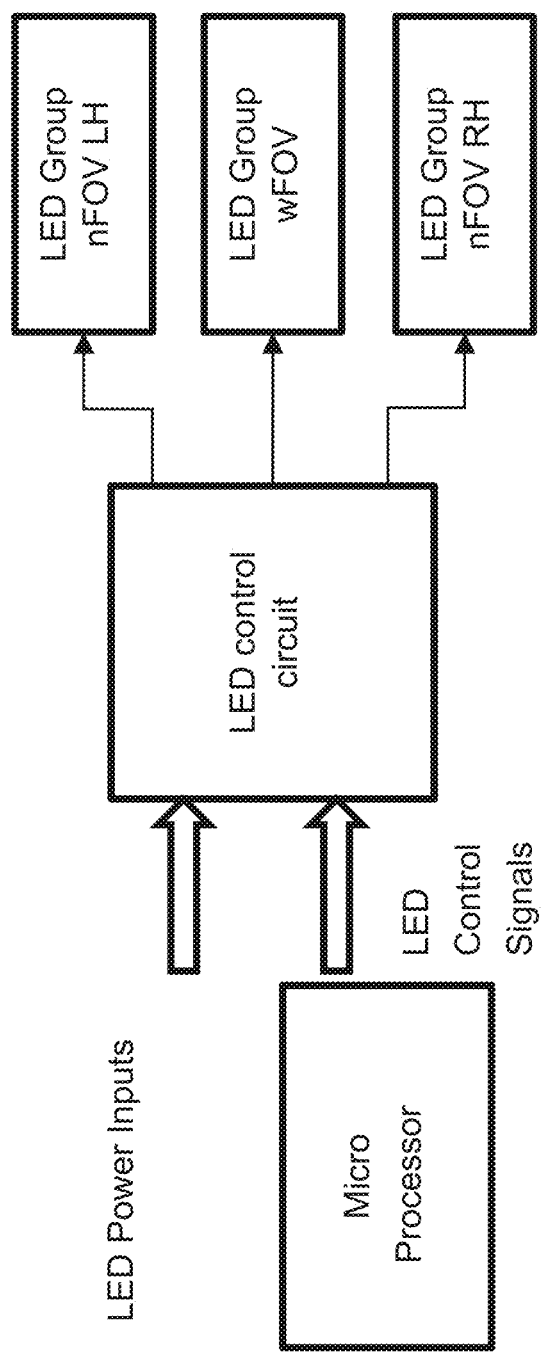
FIG. 20 is a block diagram of the controller for controlling the DMS light emitters.
Figures 21, 22:
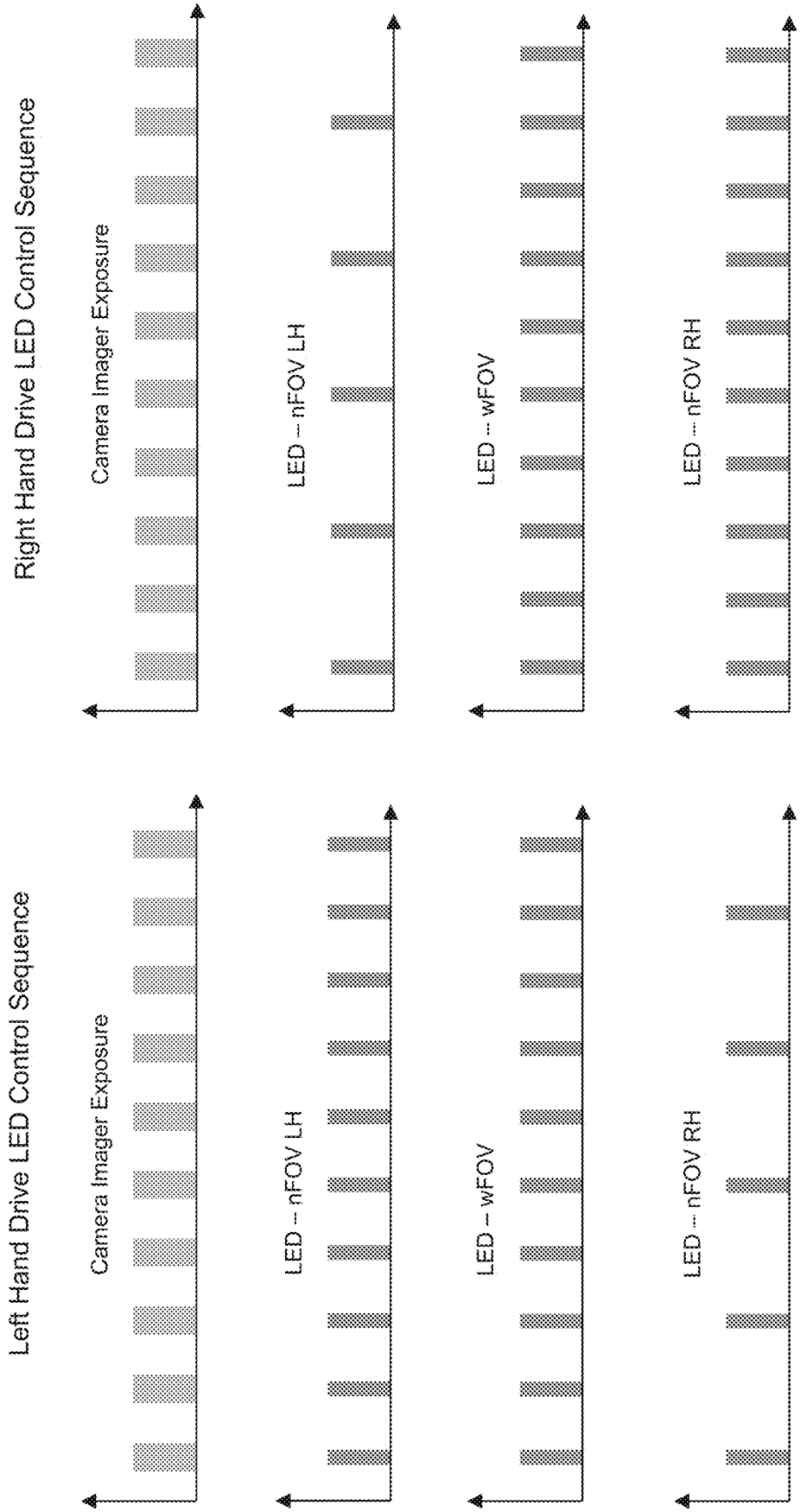
FIG. 21 shows graphs of the LED control sequence when the mirror assembly is installed in a left hand drive vehicle.
FIG. 22 shows graphs of the LED control sequence when the mirror assembly is installed in a right hand drive vehicle.

Thus, the driver monitoring system may control the LED control circuit to enable and energize or electrically power the appropriate set of LEDs depending on the type of vehicle and depending on whether the system is capturing image data for the driver monitoring function or the occupant monitoring function. As shown in FIG. 20, the different LED groups are electrically powered by an LED control circuit, which is provided LED control signals from the microprocessor. The LED control circuit may be disposed at the circuit board of the light emitter, and the microprocessor may be at the ECU of the mirror head or at a remote ECU in the vehicle. The microprocessor controls the light emitter in accordance with the image capturing by the DMS/OMS camera so the appropriate area of the vehicle cabin is illuminated by the light emitter depending on the particular function (driver monitoring or occupant monitoring) for which the system is currently capturing image data. The control sequences for actuating the different sets of LEDs of the light emitter may be similar to what is shown in FIG. 21 (for a left hand drive vehicle) or FIG. 22 (for a right hand drive vehicle). The selection or enabling of one of the narrow beam sets of LEDs may occur only once, such as when the mirror is installed at the LHD or RHD vehicle or before installation and when the mirror assembly is assembled or shipped to the assembly plant or at any other time prior to normal operation of the DMS/OMS. After the initial setting, the DMS will operate to energize the appropriate or selected or enabled narrow beam set for the DMS function and will not operate or energize the non-selected or not enabled narrow beam set for the DMS function.

Thus, when the mirror assembly is installed in a vehicle (typically at a vehicle assembly line) or installed as a replacement service part, and when the vehicle is powered, a signal or flag input is provided (e.g., via CAN bus signal or the like) to the electronic circuitry of the mirror assembly indicating that the vehicle is either a left hand drive vehicle or a right hand drive vehicle. Optionally, that signal may be provided at initial startup of the vehicle (after the mirror assembly is installed and the vehicle is assembled) or at each ignition cycle. Optionally, the signal may be provided when the mirror assembly is assembled (such as at the mirror assembly plant or mirror manufacturer) and designated for use in the left hand drive vehicle or right hand drive vehicle.

The electro-optic (such as electrochromic (EC)) mirror reflective element sub-assembly transmits near infrared light and reflects visible light. Thus, the mirror reflective element (i.e., a transflective mirror reflector of the mirror reflective element) effectively allows the IR emitters to emit light through the reflective element and allows the camera to 'view' through the mirror reflective element, while allowing the mirror reflective element to reflect at least some visible light incident thereat to serve its intended rear viewing purpose. The IR emitters may be activated responsive at least in part to an ambient light level within the vehicle cabin and at the driver's head region, with the light level being determined by a light sensor or by processing of image data captured by the driver monitoring camera. Although shown and described as being disposed behind the mirror reflective element and emitting light through and receiving light through the mirror reflective element, the light emitters and camera may be disposed at a lower region of the mirror head (with the mounting base attached at the interior portion of the left hand drive vehicle or the right hand drive vehicle) and below the mirror reflective element and movable in tandem with the mirror head.

Having the inward viewing driver monitoring camera in a pivotable rearview mirror head poses unique challenges pertaining to the camera's perspective. In order to account for changes in the camera's view when the mirror head is adjusted, the mirror's driver monitoring processor calculates the camera's location and angle within the vehicle based on the image data captured by the camera and processed by the processor. For example, the system may process image data captured by the driver monitoring camera to determine where particular features are located in the field of view of the camera (such as relative to a particular area of the field of view, such as a central region), and thus the driver monitoring system determines the position of the driver's head by the determined position or positions of particular fixed vehicle features, such as the rear windows, pillars, center console or the like, in the captured image data. The system may adjust processing of the image data captured by the camera to accommodate changes in location of the known or particular vehicle features. For example, if a nominal setting of the mirror has a particular feature a predetermined distance laterally and/or vertically from a center of the image data, if it is determined that the particular feature is shifted or offset to one side or the other from the predetermined distance location, the processor shifts or adjusts processing of captured image data to accommodate the lateral and/or vertical shift of the particular feature. Optionally, the field-of-view of the camera may be biased by offsetting/shifting the lens stack of the camera relative to the imager rather than physically aiming the whole Imager PCB and lens stack. Such shifting of the lens relative to the imager may utilize aspects of the systems described in U.S. Pat. Nos. 10,946,798 and/or 10,525,883, and/or U.S. patent application Ser. No. 17/650,255, filed Feb. 8, 2022, which published on Aug. 11, 2022 as U.S. Patent Publication No. US-2022-0254132, and/or U.S. provisional application Ser. No. 63/201,894, filed May 18, 2021, which are all hereby incorporated herein by reference in their entireties.

The driver monitoring system may provide the ability for the algorithms/camera to determine if the driver has the mirror aimed properly (for providing an acceptable rearward view to the particular driver). Such determination may be made by determining (via processing of image data captured by the camera) the presence and position of (i) the driver's face in a given frame, (ii) adequate light in a given frame relative the driver's head mass, or (iii) the rear window and/or other fixed vehicle features (e.g., D pillars or head rests or the like) in the field of view of the camera. If the system determines that the mirror is aimed improperly, the algorithms may trigger the vehicle to alert the driver of improper use of the interior rearview mirror (such as via an audible alert, or such as via a visual alert, such as an indicator light or display on a display screen, or such as via a haptic alert). Optionally, the mirror may include an actuator that may adjust the mirror head toward a nominal or optimal orientation for the particular driver responsive to determining that the mirror head is aimed improperly for that driver.

Optionally, and to reduce stray light or glare at the camera, the mirror head may include a stray light limiting or blocking mechanism. In a DMS/OMS mirror head, the camera lens and the light emitters are closely placed. The camera has wide angle field of view such as, for example, a horizontal field of view 140 degrees and a diagonal field of view of close to 180 degrees. Stray light emitted by the light emitters may leak into the camera lens directly or through reflections from the cover glass or prism glass or EC mirror glass surfaces and create glare/ghost in the captured images. The stray light blocking mechanism is disposed between the camera lens and the glass surface in front of the lens. As shown in FIG. 23, the stray light blocker may circumscribe the lens engage the rear of the mirror reflective element and block light from entering the lens. The stray light blocker may be in the form of a hard shell cone attached to the lens cap or barrel, or a soft shell (e.g., a flexible or deformable rubber disc-shaped or cone-shaped element) as a part of lens cap/barrel formed by second-shot injection molding or other appropriate means.

Optionally, the DMS camera may be used to detect ambient light and/or glare light (emanating from headlamps of a trailing vehicle) for use in providing auto-dimming of the EC mirror reflective element. The DMS camera may be disposed in the mirror head and viewing rearward through the mirror reflective element (optionally, the DMS camera may be disposed in the mirror head at a location above or below or sideward of the mirror reflective element). The processing of image data captured by the DMS camera may be adjusted to accommodate the angle of the mirror head so that the ECU or system, via image processing of image data captured by the DMS camera, determines headlamps of a trailing vehicle (behind the equipped vehicle and traveling in the same direction as the equipped vehicle and traveling in the same traffic lane or in an adjacent traffic lane) to determine glare light at the mirror reflective element. The processing of image data captured by the DMS camera is adjusted to accommodate the degree of dimming of the mirror reflective element. For example, the system knows how much the mirror reflective element is dimmed (responsive to the determined glare light intensity and location) and can accommodate for the mirror dimming level when processing captured image data to determine presence and intensity of light sources/headlamps rearward of the vehicle. The intelligent/automatic mirror dimming functions may utilize aspects of the systems described in U.S. Publication Nos. US-2019-0258131 and/or US-2019-0047475, and/or International PCT Application No. PCT/US2022/070062, filed Jan. 6, 2022 and published Jul. 14, 2022 as International Publication No. WO 2022/150826, which are all hereby incorporated herein by reference in their entireties.

Figure 24:
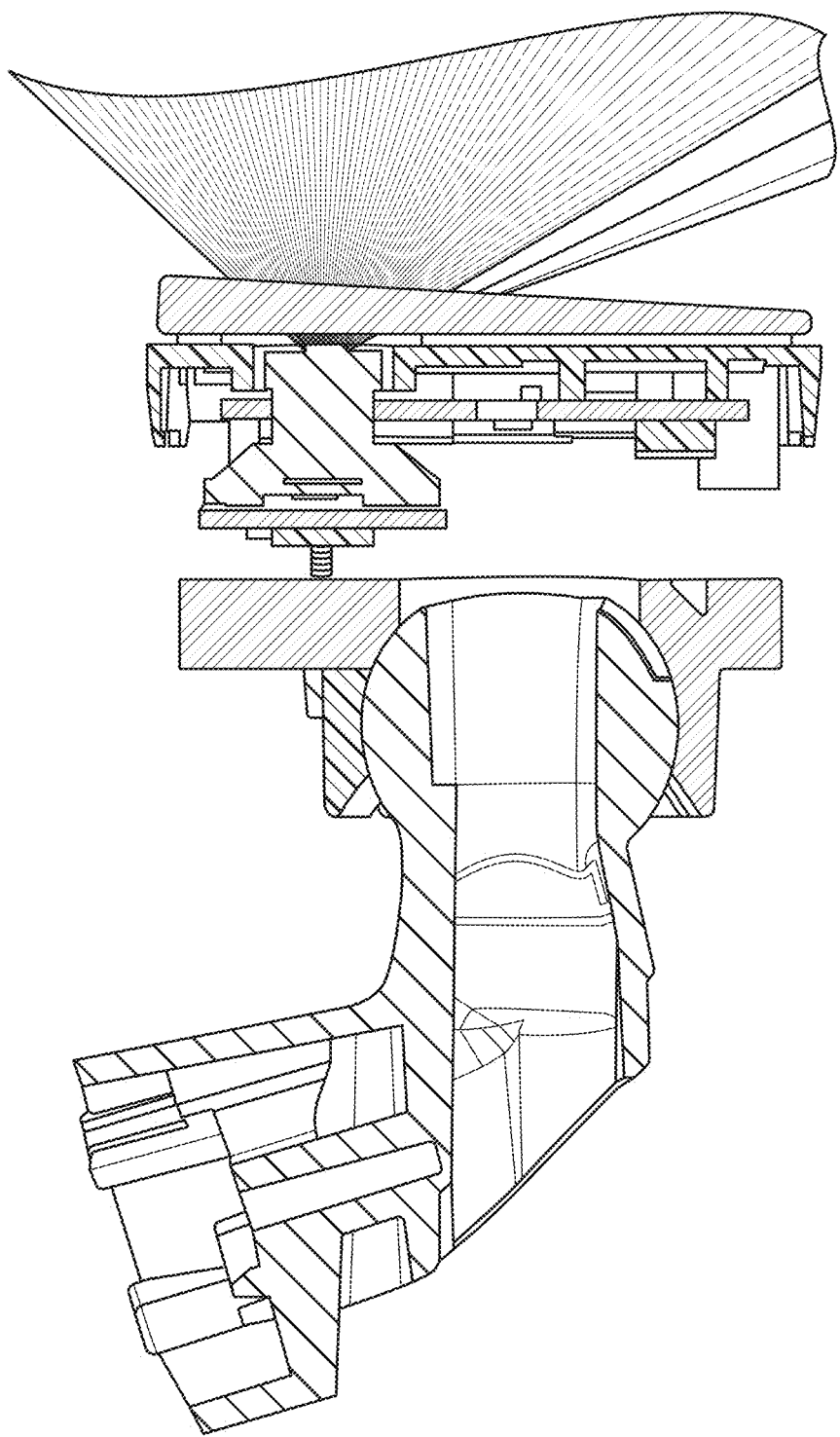
FIG. 24 is a sectional view of a mirror head having a prismatic reflective element.

Optionally, and particularly for prismatic mirror applications (see FIG. 24), there may be an issue with 'ghost' images getting into the camera lens caused by the non-parallel surfaces of the prism glass. Another issue may be with the IR light from the IR LEDs/VCSELS bouncing between the prism glass surfaces and getting to the camera lens. The system may provide optimization of the camera primary aim axis to an angle specific to the second surface or first surface. For example, the camera lens axis may be perpendicular to the second (rear) surface of the mirror glass substrate and then the resulting prism angle from the first (front) surface of the mirror glass substrate, or it may be angled such that the primary axis is perpendicular to the first surface, or it may be in between or further off the perpendicular axis. This optimization is possible by shifting the imager relative to the lens stack, which provides an optical bias aim of the camera's field of view. Optionally, an area in front of the camera lens or IR illumination area may be devoid of the mirror reflector (such as a window established through the mirror reflector by laser ablating the mirror reflector) to reduce the reflections between the surfaces.

Optionally, a coating, such as an anti-reflective coating, may be disposed at the first surface to reduce the reflections and promote more light exiting the prism glass or higher transmission by utilizing phase changes. Such anti-reflection coatings reduce the light loss and make use of phase changes and the dependence of the reflectivity on the index of refraction of the glass mirror substrate. The anti-reflection coatings create a double interface via a thin film that provides two reflected waves. If the waves are out of phase the at least partially cancel. For example, the coating may have a quarter wavelength thickness and the coating may have an index of refraction of less than that of the glass mirror substrate, such that the two reflections will be 180 degrees out of phase and will cancel each other out.

Figure 25:
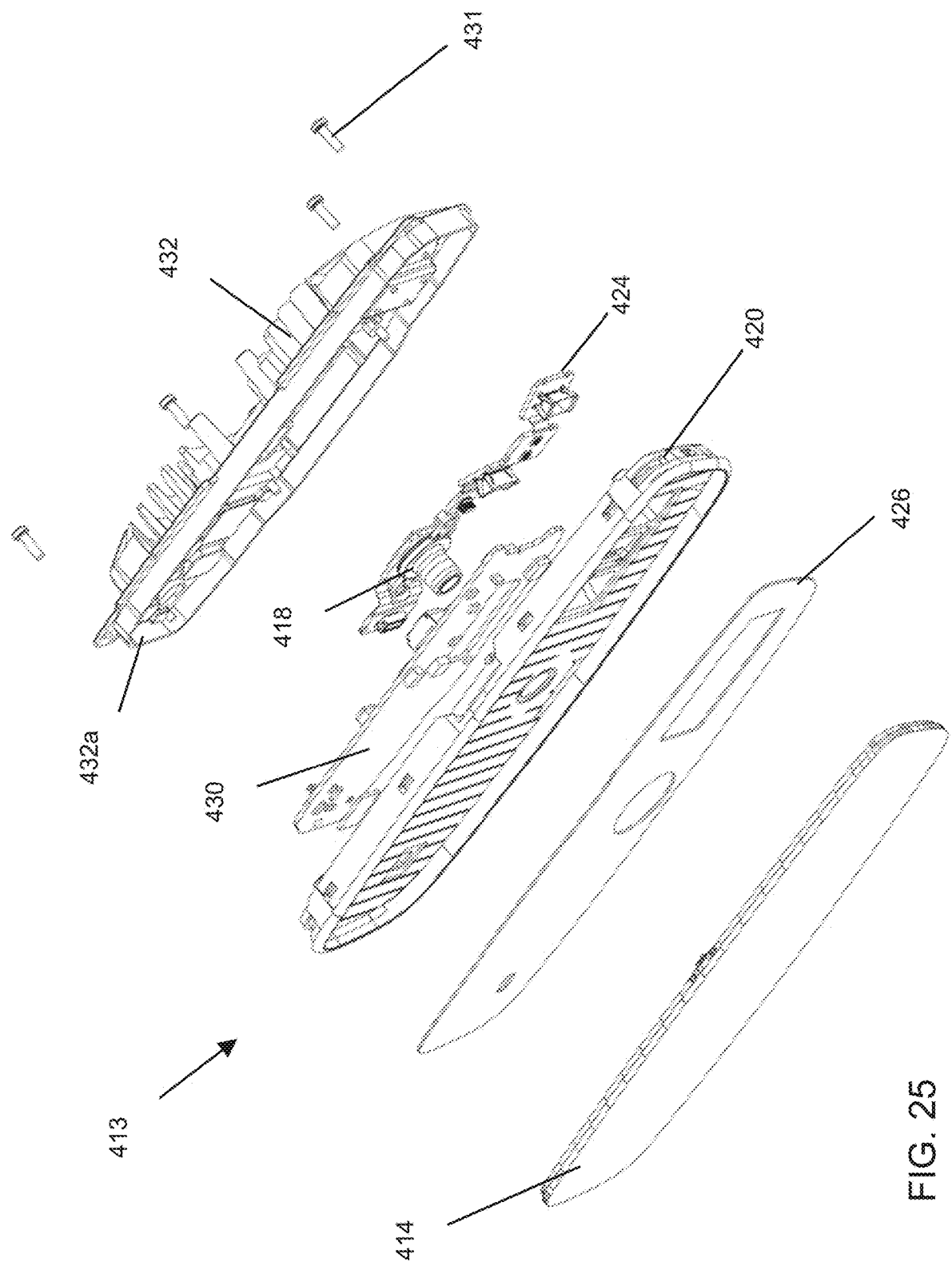
FIG. 25 is an exploded perspective view of a mirror reflective element sub-assembly for an interior rearview mirror assembly.
Figure 26:
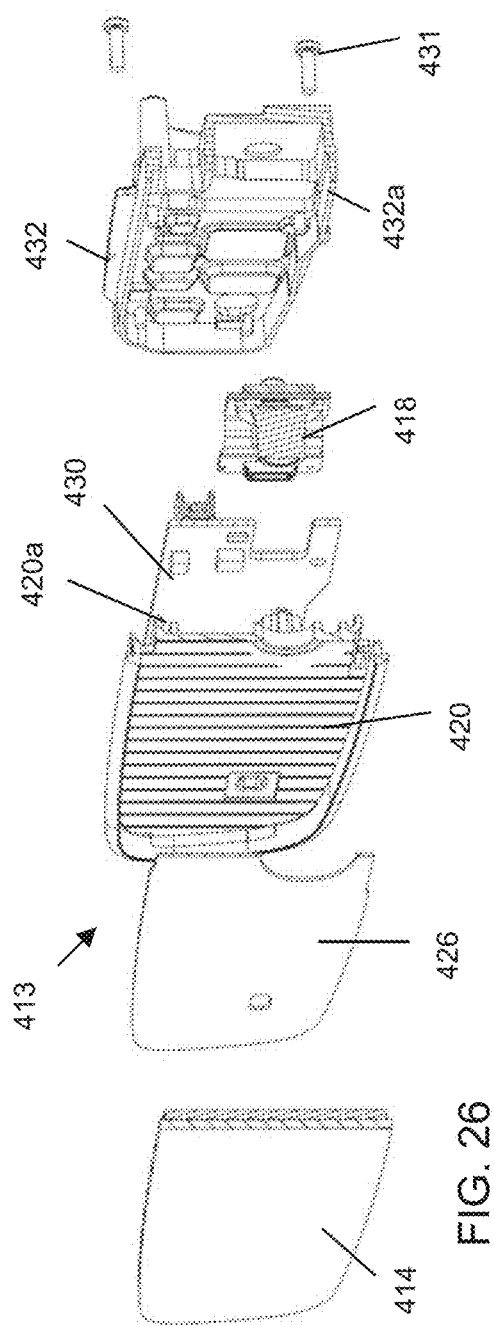
FIG. 26 is an exploded perspective partial sectional view of the mirror reflective element sub-assembly of FIG. 25.
Figure 27:
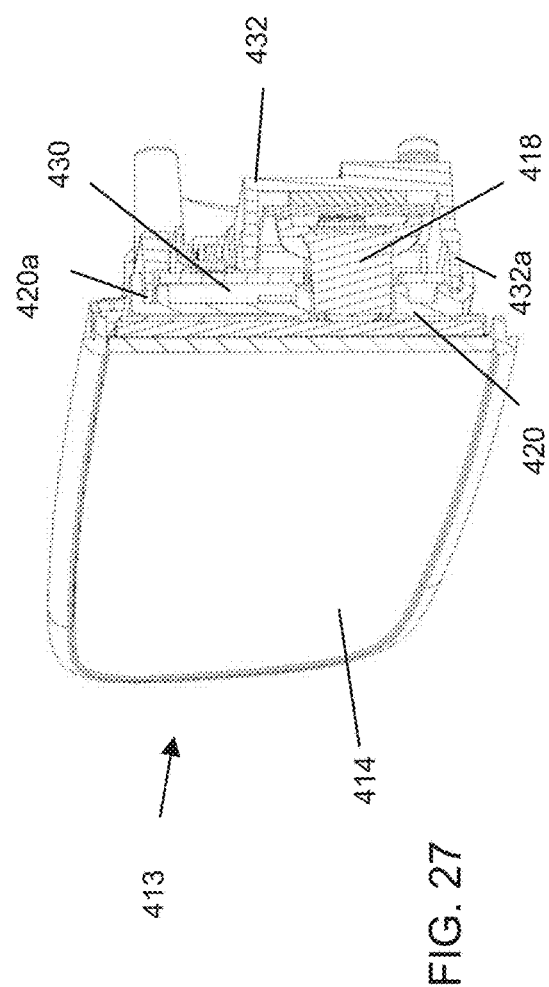
FIG. 27 is a perspective partial sectional view of the mirror reflective element sub-assembly of FIG. 26.

Optionally, in order to mitigate electromagnetic interference (EMI) of the electronics within the interior rearview mirror assembly and to limit component count, the mirror glass attachment plate (which provides stability and structure for the mirror glass) may also function as one half or portion of a Faraday cage around the electronics in the mirror head. For example, and such as shown in FIGS. 25-27, a mirror reflective element sub-assembly 413 (configured to attach at a mirror mount and/or mirror casing of an interior rearview mirror assembly) includes a mirror attachment plate 420 is adhered at the rear of the mirror reflective element 414 (such as via an adhesive foam tape 426). The printed circuit board 430 may attach at the rear of the mirror attachment plate 420. A heat sink/chassis and EMI form in place (FIP) gasket or heatsink 432 is disposed at the rear of the printed circuit board and is configured to attach at the pivot element (such as a socket element such as shown in FIG. 5) that pivotally attaches at the ball member of the mirror mount. Thermal interface material or elements may be disposed between the circuit board 430 and the chassis 432 to enhance heat dissipation from the circuit board to the chassis and heat sink. The camera 418 and light emitters 424 are disposed behind the mirror attachment plate 420 and are generally aligned with apertures established through the mirror attachment plate 420 and the adhesive tape 426.

The attachment plate 420 comprises an EMI mirror attachment plate (which may comprise a polycarbonate (PC) Acrylonitrile butadiene styrene (ABS) and stainless steel (SS) fiber material) that interfaces with the aluminum heatsink 432 (which acts as the other half or portion of the Faraday cage). In the illustrated embodiment, the mirror attachment plate interfaces with the heatsink in a tongue and groove fashion where a peripheral lip 432a of the heatsink 432 is received in a peripheral groove or channel or receiving portion 420a of the attachment plate 420 to join and secure or retain the heatsink 432 at the attachment plate 420 (optionally, a lip of the attachment plate could be received in a groove or channel or receiving portion of the heatsink). The PC ABS+SS fiber material mirror attachment plate construction may reduce overall mass and cost. Optionally, the attachment plate may comprise other suitable materials, such as, for example, aluminum or the like.

The Faraday cage is electrically grounded by one or more spring fingers or flexible metallic or electrically conductive element at the ECU that contact the heatsink when the heatsink is attached at the mirror attachment plate (or the heatsink may have flexible electrically conductive elements that contact the ECU when the heatsink is attached at the mirror attachment plate). The heatsink grounds the EMI attachment plate through a set of metal fasteners 431 (e.g., threaded fasteners, such as screws or the like), which attach and retain the heatsink at the EMI attachment plate. Thus, the mirror attachment plate and the heatsink element function as a Faraday cage that surrounds the camera 418 and light emitter(s) 424 and printed circuit board(s) 430 of the mirror head to reduce or mitigate EMI of the electronics within the mirror head of the interior rearview mirror assembly. The PC/ASA+SS Fiber attachment plate is electrically decoupled from the electronics to limit or avoid the material acting as an EMI material whether grounded or not.

Optionally, the ECU of the vehicle or other system of the vehicle or the DMS/OMS system may utilize signals from DMS/OMS camera or system to determine if a driver or a passenger is reaching for the infotainment system controls of the vehicle (e.g., reaching toward a center touch screen display of the vehicle). Using this information, and responsive to the vehicle's state (e.g., whether the vehicle is moving or in drive or reverse gear or propulsion, or is in park or off, etc.) the system can determine if the inputs to the infotainment system should be allowed. This allows the system to determine when the passenger is accessing the touch screen or infotainment system so that the system can allow the passenger to safely use all the functions of the infotainment system while the vehicle is being driven by the driver, whereas the driver may have limited inputs to prevent distraction (i.e., the system may deactivate some or all of the infotainment inputs when it determines that the driver is accessing the inputs while the vehicle is reversing or moving forward at a speed greater than a threshold speed).

Optionally, using information gathered by the OMS disposed in the interior rearview mirror assembly, such as information pertaining to whether or not one or more occupants are present in the vehicle, a parametric/directional speaker system can be activated to (i) give the driver a private hands-free calling feature and/or (ii) provide a personalized audio experience. For example, if the system determines that there are is an occupant present in the vehicle, the system may provide a calling feature that allows for the driver to take part in a phone conversation that the occupant or occupants cannot hear (i.e., the audio system is adapted so that the speaker for the phone call is directed to the driver only and optionally other speakers of the vehicle are directed to the occupant and emit sound waves that cancel out the sound from the driver's speaker, such as by utilizing aspects of the systems described in U.S. Pat. No. 9,800,983, which is hereby incorporated herein by reference in its entirety). Optionally, the system may provide a personalized audio experience (by tailoring the outputs of the vehicle speakers to provide sound to the individual occupant and not others), such as responsive to a user input provided by the occupant (e.g., via the vehicle touch screen selection or via the occupant's smart phone that is BLUETOOTH® connected or otherwise connected to the vehicle system).

Optionally, the DMS camera or system may be operated or used in conjunction with a garage door opening system of the vehicle. For example, using the DMS camera disposed behind the mirror reflective element and viewing through the mirror reflective element (or using a DMS camera disposed elsewhere in the vehicle cabin), image data captured by the camera may be processed (such as via an algorithm of the system) to determine if the driver/passenger is holding up a one, two or three fingers with their hand or hands. With this information, the system can trigger the garage door opener module (which may also be packaged inside the mirror head or mirror assembly) to transmit a signal to a garage door opener to open or close the garage door. Depending on the proximity of the garage door opener module/vehicle to the garage door opener (antenna/receiver distance), the gesture may or may not be successful in opening the garage door. By utilizing the camera and driver/passenger gestures to actuate the garage door opener system or module, the system saves packaging space by not requiring the human interface buttons in the mirror—which are commonly used to interface with the garage door opening system or module of the vehicle. The system may utilize aspects of the garage door opener systems described in U.S. Pat. Nos. 11,046,251;

10,864,865; 10,189,411; 7,023,322 and/or 6,362,771, which are hereby incorporated herein by reference in their entireties.

Optionally, the camera (and associated illumination source) may be disposed outside of the mirror assembly, such as at an instrument cluster, overhead console, or A-pillar of the vehicle. A camera monitoring system (CMS) video display screen is typically located at a lower region of the A-pillar or at the dashboard outer section for optimized viewing by the driver of the vehicle. The selected position for the driver monitoring camera including its illumination source and camera mirror display is a trade-off between visibility of the driver, thermal considerations, packaging concept, and interior design. Typically, the available space is very restricted. Wire harness routing for power supply and video signals must be considered as well.

Figure 28:
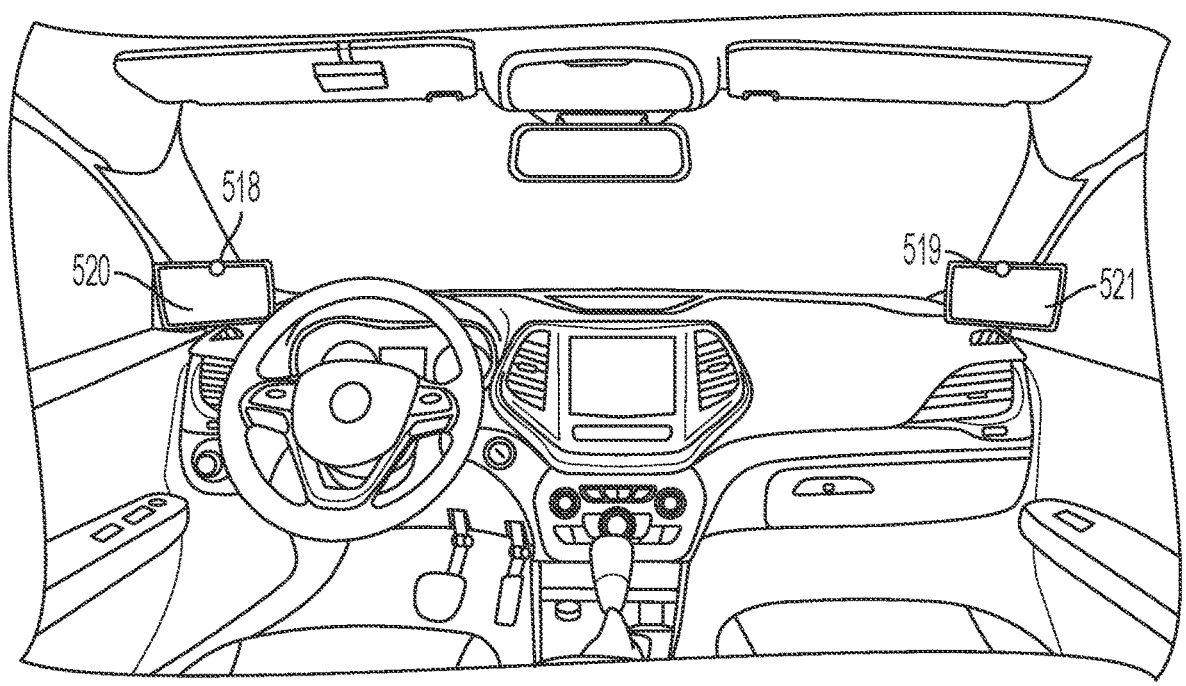
FIG. 28 is a perspective view of a cabin of a vehicle, showing DMS/OMS cameras disposed at CMS video display screens.

Optionally, the camera (and associated illumination source) may be disposed at the CMS video display screen. For example, and with reference to FIG. 28, a camera 518 for a driver monitoring system (DMS) may be disposed at a driver-side CMS display screen 520 (that displays video images derived from image data captured by the respective driver-side rearward viewing CMS camera). Similarly, a camera 519 for an occupant monitoring system (OMS) may be disposed at a passenger-side CMS display screen 521 (that displays video images derived from image data captured by the respective passenger-side rearward viewing CMS camera). The cameras (and associated illumination sources) may be located at an upper region of the respective display screen or just above an upper border of the respective display screen.

The driver monitoring camera and the illumination source thus may be integrated at the housing or bezel of the driver side mounted camera mirror display. The location and integration of the camera at the video display screen may be similar to integration such as video-conferencing-cameras on smartphones, tablets or laptops. By locating the DMS/OMS cameras at the respective CMS display screens, the system provides seamless integration of the camera and illumination source and optimal facing relative to the driver's eye-box and head location, since good relative position, visibility and aim between driver and camera/display is required for both products (display and camera). The system also provides an overall reduction of the vehicle wire harness, since the same routing can be used for both products, particularly if all of the processing is performed at a central domain controller or central ECU. Because the display emits visible light, the display provides additional illumination of the driver body and face for better visibility of the visible light spectrum of the driver monitoring camera (which typically uses a combination of visible and infrared light sensitive pixels).

Optionally, the driver monitoring system may control one or more systems responsive to monitoring of the driver and/or occupant of the vehicle. For example, the system may process image data captured by the DMS camera to determine whether or not the driver is looking at an infotainment center or screen in the vehicle. Responsive to determining that the driver is viewing the infotainment center or screen, the system may lock out driver access and use of the infotainment system, while allowing a passenger to access the infotainment center or screen and use the infotainment system. The system may, for example, determine that the driver is looking at the screen, and determine whether the driver's hand is moving toward the screen or if a passenger's hand is moving toward the screen. If the system determines that the driver is looking at the screen and trying to use the infotainment center or screen, the system locks it out. However, if the system determines that the occupant (non-driver) is trying to use the infotainment center or screen, the system does not lock it out and allows the passenger to use the infotainment system.

Thus, a One-Box DMS Interior Rearview Mirror Assembly comprises a plurality of near-IR light emitting sources. The near-IR light sources may comprise a plurality of near-IR light emitting diodes (LEDs) or near-IR emitting vertical-cavity surface-emitting lasers (VCSEL), such as a bank or cluster or set of light sources such as LEDs or VCSEL lasers. The near-IR light sources include a first wide field of view (wFOV) light source, a second narrow field of view (nFOV) light source to one side of the wFOV light source, and a third nFOV light source to the other side of the wFOV light source. The terms "nFOV" and "wFOV" as used herein refer to the field of illumination, or field of view or directivity or full width at half maximum (FWHM) or beam angle at 50% intensity of the respective nFOV light sources and wFOV light source.

A bank or cluster or set of two (or more) narrow field of view (nFOV) near-IR emitting LEDs (which may be horizontally or vertically arranged, or that can be arranged in a matrix of rows and columns or otherwise arranged) is disposed within (or at least partially surrounded by) a near-IR light reflector (e.g., a 14.1 mm×6.92 mm×6.5 mm reflector, such as available from CoreLED Systems, LLC, of Livonia, MI) on a first rigid PCB that board-to-board connects via a flexible multiwire planar ribbon cable (comprising a plurality of individual conducting wires, such as, for example, four wires, lying flat and parallel to one another) connection to a second rigid PCB. A bank or cluster or set of two (or more) wide field of view (wFOV) near-IR emitting LEDs (which may be horizontally or vertically arranged, or that can be arranged in a matrix of rows and columns or otherwise arranged) is disposed on the second rigid PCB. The second rigid PCB connects via a flexible multiwire planar ribbon cable (comprising a plurality of individual conducting wires lying flat and parallel to one another) connection to a third rigid PCB. A bank or cluster or set of two (or more) narrow field of view (nFOV) near-IR emitting LEDs (which may be horizontally or vertically arranged, or that can be arranged in a matrix of rows and columns or otherwise arranged) is disposed within a reflector on the third rigid PCB. The third rigid PCB comprises a flexible multiwire planar ribbon cable that terminates in an electrical connector that connects with a corresponding electrical connector of the PCB of ECU 6. Although shown in some Figures as a set of three near-IR light emitting light sources (an LHD nFOV light source, a wFOV light source, and a RHD nFOV light source) on individual rigid PCBs interconnected via flexible ribbon connection, other disposition of the respective illumination sources in the mirror head is contemplated. For example, all the light sources could be on one PCB, or two banks of light sources may be on one PCB and one bank of light sources may be on another PCB, etc. The reflectors may comprise stamped polished about 0.01 inch thick 260½ hard temper brass that may be post tin plated (e.g., at 5 microns Sn over Cu flash), or other suitable near-IR light reflecting material (such as aluminum) that may be surface mounted/soldered at the respective LED PCBs to guide or direct or concentrate or collimate the near-IR light emitted by the respective LEDs toward the appropriate driver or passenger region or cabin region in the vehicle.

Figure 38:
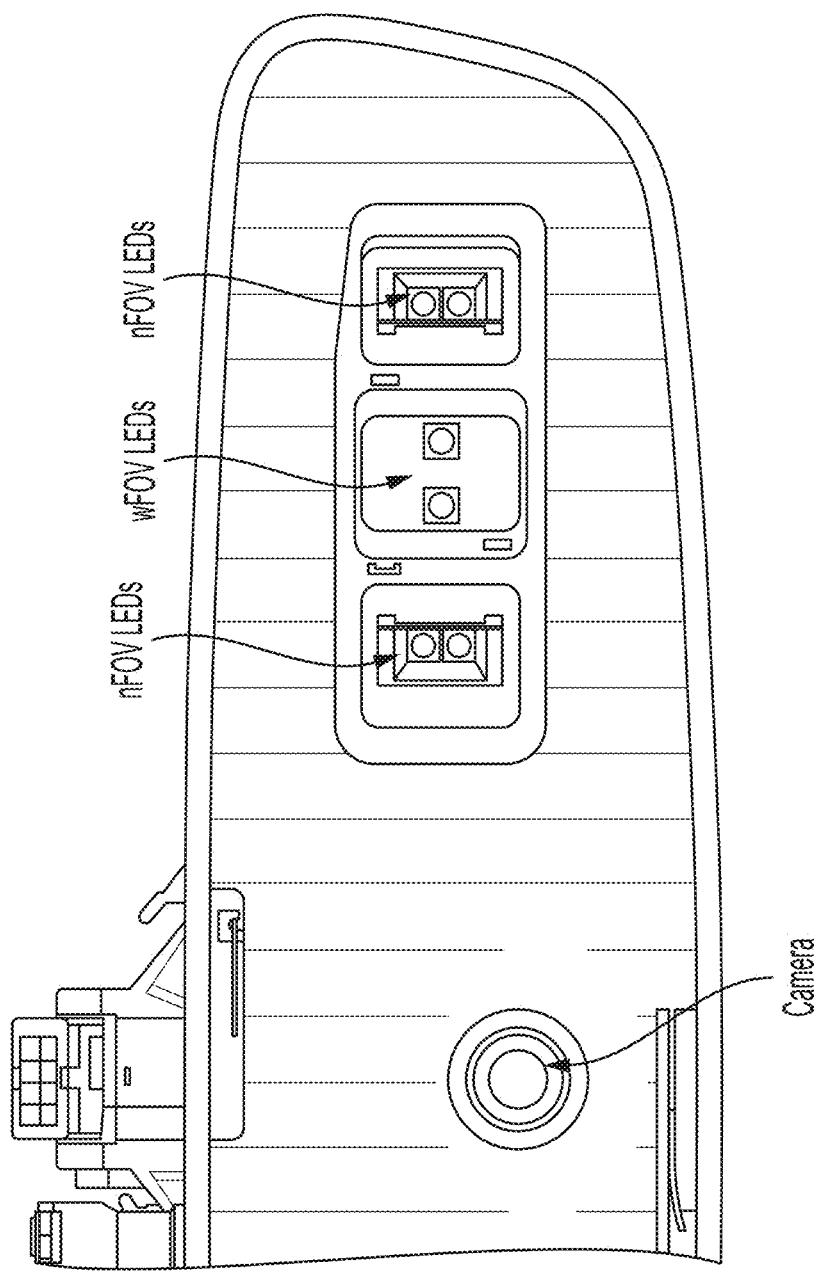
FIG. 38 shows the arrangement of the first, second and third near-IR illumination sources at the right side of the mirror head (to the right of the camera) as viewed by a driver of the equipped vehicle.

As shown in FIG. 38, the wFOV LEDs are horizontally arranged one beside the other and spaced apart, and the nFOV LEDs are vertically arranged one above the other and spaced closer together (and circumscribed or surrounded by the respective reflector). In the illustrated embodiment of FIG. 38, the LHD and RHD sets of nFOV LEDs each comprise two LEDs that are stacked vertically with each set having a respective reflector. As can be seen in FIG. 38, the horizontally arranged wFOV LEDs are spaced further apart than the vertically arranged nFOV LEDs. The LEDs of each set are stacked vertically to reduce the overall distance to the red glow filter/mirror reflective element so that the aperture (the hole through the attachment plate and the hole through the tape that attaches the mirror reflective element to the attachment plate) is as small as possible. The arrangement of the wFOV LEDs and the nFOV LEDs can reduce cost and packaging space.

The illuminator electrical driver drives the LEDs and functions to prevent a surge (e.g., 2.3A surge) on the power supply from the vehicle by storing energy in a capacitor (see the exemplary schematic of the illuminator driver of FIG. 63C). The illuminator electrical driver boosts the voltage (24V+) of a storage capacitor during the "off time" of the LEDs, and releases that stored energy into the LEDs during the "on time." This allows for a lower average current draw from the vehicle.

The One-Box DMS Interior Rearview Mirror Assembly includes filters at the LEDs to attenuate or block visible light. For example, the LED filters may comprise a Luminate™ 7276F visible opaque compound that is black and that blocks or filters light from 200-860 nm, and allows transmittance of light greater than 990 nm. The filters comprise a ready-to-mold thermoplastic that has an appearance of black polycarbonate pellets. The target transmittance values are 5% at 875 nm, 50% at 910 nm, 80% at 986 nm, and 85% at 1000 nm. The filters are molded into a rectangular plate or, as desired, into another shape. The plate thickness that transmits the near-IR at 940 nm is at least 0.5 mm thick in its thickness dimension, more preferable is at least 1 mm thick and most preferable is at least 1.25 mm thick, but is preferably less than 6 mm thick, more preferable is less than 4 mm thick and most preferable is less than 2.5 mm thick. For example, the filter may be 63.02 mm wide× 23.6 mm tall×1.3 mm thick. The LED filters enhance covertness of the system by limiting visible light to avoid any visible light that may be emitted by the near-IR emitting LEDs from being visible through the mirror reflective element (and thus reduces or avoids LED red glow being visible at the mirror reflective element when the LEDs are powered). The LED filters also block or limit incursion of ambient cabin light into the mirror head at the locations where the LEDs view through the EC Cell to see into the vehicle cabin.

The One-Box DMS Interior Rearview Mirror Assembly also includes an IR blocking filter in front of the EC glare sensor. The IR blocking filter at the EC glare sensor blocks a percentage of IR light from reaching the EC glare sensor. The EC glare sensor IR blocking filter may be 17.28 mm wide×11.85 mm tall×1.02 mm thick.

During operation of the One-Box DMS Interior Rearview Mirror Assembly, the circuitry ECU controls the LEDs and camera. For example, the camera may capture image data at a frame capture rate of 60 frames per second (fps), and the LHD n-FOV LEDs, the w-FOV LEDs and the RHD n-FOV LEDs are pulse width modulated so that some frames of the captured image data are captured when some or all of the LEDs are powered. During DMS operation (and, for example, every other frame of image data), the LHD n-FOV LEDs and the w-FOV LEDs are pulsed on, and during OMS operation (and, for example, every tenth frame of image data), all of the LHD n-FOV LEDs, the w-FOV LEDs and the RHD n-FOV LEDs are pulsed on (such as by utilizing aspects of the DMS mirrors described in International PCT Application No. PCT/US2022/070882, filed Mar. 1, 2022, which published on Sep. 9, 2022 as International Publication No. WO 2022187805, which is hereby incorporated herein by reference in its entirety).

Cameras for likes of security applications typically concomitantly use near-IR floodlighting at around 850 nm IR. However, sensitivity of such conventional cameras decreases at longer wavelengths in the near-IR spectral region. Thus such conventional security cameras are not as sensitive to 940 nm light as they are to 850 nm light; such conventional security cameras can have 50% less range using 940 nm near-IR illuminators compared to when 850 nm near-IR illuminators are used. Moreover, although 850 nm IR is largely not visible to the human eye as "light", a slight red glow at the LED light source can be perceived. For the in-cabin DMS and ODS, used of 940 nm near-IR illumination is preferred, and especially when the in-mirror camera has a Quantum Efficiency at 940 nm of at least 15%. Compared to illumination at 850 nm, any "red glow" perceivable by the human eye using 940 nm illumination is less, and thus covertness of the near-IR emitting light sources within the mirror head emitting through the mirror transflector is enhanced. Furthermore, water absorbs 940 nm near-IR light, and thus solar radiation exhibits a dip at 940 nm in its irradiation spectrum due to moisture in the atmosphere. Therefore, ambient solar lighting present in the cabin (and especially when driving on a sunny day in a convertible car with the top down) has a dip or valley at 940 nm which reduces any propensity of ambient solar lighting present in the cabin of the vehicle to interfere with DMS/ODS functionality.

The combination of nFOV and wFOV light sources allows the system to meet the illumination requirements for LHD and RHD vehicles by utilizing the different groups. For a LHD vehicle, the LHD nFOV and wFOV LEDs are the primary sources for Driver Monitoring, while the LHD nFOV, the wFOV, and the RHD nFOV LEDs are all used for Occupancy Monitoring to detect front and rear seat passengers, children in child seats, etc.

Irradiance (the radiant flux received by a surface per unit area) at the driver's head (and especially at the driver's eyes for drowsiness detection) is important, and especially during nighttime driving when the interior cabin is dark and where the DMS camera in the mirror head principally relies on near-IR illumination emitted by the near-IR light sources in the mirror head. A near-IR irradiance at the likes of the driver's eyes of at least 1 W/m$^2$ is preferred, with at least 1.8 W/m$^2$ more preferred and at least 2.5 W/m$^2$ most preferred (especially within the 99% eyellipse per SAE J194 for the particular driver seated in the driver's seat of a particular vehicle equipped with a One-Box DMS Interior Rearview Mirror Assembly), while a near-IR irradiance for occupancy detection at the likes of the front passenger-seat seating location of a front passenger of at least 0.15 W/m$^2$ is preferred, with at least 0.25 W/m$^2$ more preferred, and at least 0.4 W/m$^2$ most preferred, and a near-IR irradiance for occupancy detection at the likes of the rear seats of at least 0.1 W/m$^2$ is preferred, with at least 0.15 W/m$^2$ more preferred, and at least 0.2 W/m$^2$ most preferred.

The optical path of the light emitted by the LEDs and reflected by the reflector passes through the red glow filter and through the mirror reflective element to illuminate the driver head region, and reflects toward the camera, passing back through the mirror reflective element and the lens of the camera. The optical path (irradiance) of the narrow FOV (nFOV) LED at 100% LED power, is reduced so that only 74% is reaching the driver. However, as a worst-case scenario, the peak power has to be used. Thus, 178% LED Irradiance power needs to be used for the exposure limit. The irradiance is mostly proportional to the current running through the LED.

The camera views (and the LEDs illuminate) a driver head box or region. The forward vision, near-IR illumination and camera-to-eye visibility may be impacted with some visor positions (showing different sized drivers at different seating positions relative to the One-Box DMS Interior Rearview Mirror Assembly). FIG. 86D shows the different eye points relative to the light source as projected on a horizontal plane for a left hand drive (LHD) vehicle and DMS (with the LEDs disposed at the right side of the mirror head), while FIG. 88C shows the different eye points relative to the light source as projected on a horizontal plane for a right hand drive (RHD) vehicle and DMS (with the LEDs disposed at the right side of the mirror head). All the closest Driver Eye points will be bright enough to meet the irradiance requirements—with a nominal aim of 15° vertical/20° horizontal.

The DMS SoC disposed in the mirror head can sense its silicon die temperature and enter "throttle modes" if needed to reduce power output (and thus to reduce operating temperature). "Throttle modes" can include a reduction in algorithm feature sets computed, and/or a reduction in SoC clock frequency, and a reduction in frame rate (60 fps to 30 fps for example). The EC PWM duty cycle and drive voltage can be changed to reduce power dissipation in the mirror. Cell gap can be reduced to allow for a lower drive current. IR power can be reduced as well. Use of an LC optical switch for a DMS/OMS single box version can reduce thermal issues. This reduces the required IR LED drive power. Fans, heat pipes, conductive thermal interface materials (TIMs) and alternative heatsink materials, such as copper, can be used to improve cooling. Heatsink fin design also plays a role in cooling ability.

For example, if the temperature is determined to be above a threshold level, the system may provide thermal management and can pull back or reduce processing operations occurring within the mirror head. The system may determine the temperature within the mirror head via an on board thermistor or external thermistor or via the LED drivers having a thermistor or via a processor within the mirror head having a thermistor. To protect the in-mirror head electronics and/or to avoid exacerbating the outer skin temperature of the mirror housing of the mirror head of a One-Box DMS Interior Rearview Mirror Assembly that has been parked in a high temp/sun loading situation causing the housing of the mirror head to be at 85 degrees Celsius or above, a variety of counter measures can be used. Based on the likes of the on-board thermistor temperature sensing capabilities of chips on the board and/or external thermistors, either for a temporary period (up to 1 minute, up to 5 minutes, up to 10 minutes, up to 15 minutes, etc.) and/or until the thermistor-detected temperature is reduced to below a threshold temperature, DMS operation may be temporarily reduced during that period of time. For example, the system may pulse the LEDs at a slower rate and/or may capture image data at a reduced frame rate, or may power the LEDs at a reduced power level (i.e., the system may de-rate the maximum intensity of the LEDs and/or de-rate the pulsing on and off of the LEDs and/or de-rate the image capture rates). Optionally, the system may output (such as via a CAN communication) a signal to turn on the vehicle's air conditioning. Optionally, if the temperature is above the threshold temperature, the system may provide an alert to the driver that the DMS/OMS functions are temporarily not operable.

During operation, frames of image data are captured by the DMS camera (e.g., at a frame capture rate of 30 fps or 60 fps), and the appropriate LEDs are pulsed on and off for respective frames of captured image data. The LEDs pulse rate is synchronized with the camera frame capture rate; i.e., the LEDs are only powered on (and emitting near-IR illumination) when the imager is exposed and is gathering energy. For example, if the camera captures frames of image data at 30 fps, each frame is about 33 ms in duration, but the imager is only exposed (and gathering light energy that photoelectrically converts incoming photons into electrons) for a portion of such time; for example, 4 ms of that time. The LEDs are electrically repetitively pulsed so that they are powered only during that 4 ms time period that coincides with when the imager is gathering energy (although the LEDs may be powered on for a slightly longer time period to ensure that the LEDs are powered throughout the time period at which the imager is exposed). This is a pulse duty cycle of around 12%. The LEDs are synchronized so that they are not powered on for the entire frame time (33 ms) to reduce their heat generation and enhance thermal management, and to avoid continually directing near-IR illumination into the driver's eyes or passenger's eyes for an extended period of time. For DMS and so as to facilitate videoconferencing and taking of selfies by the driver, the system uses the full color capability (RGB) of the DMS camera, so the system combines three (R, G, B) signals into a single signal or frame. For OMS, the system does not need color and can use the DMS camera as a monochromatic camera, with a concomitant enhancement of sensitivity to incident light by the camera. In terms of duty cycle pulsing of the near-IR sources (such as nFOV LEDs or wFOV LEDs) disposed within the mirror head, a duty cycle of at least 8% is preferred; a duty cycle of at least 10% is more preferred and a duty cycle of at least 12% is most preferred. However, for eye safety and to mitigate thermal load, a duty cycle of less than 40% is preferred; a duty cycle of less than 30% is more preferred and a duty cycle of less than 20% is most preferred.

Optionally, the system may reduce the powering of (current applied to) the LEDs during daytime operation and/or may vary or adjust the pulse duty cycle dynamically in accordance with the prevailing in-cabin conditions (such as time of day or night, or whether by day being driven on a sunny or a cloudy day or whether the equipped vehicle has just recently been started after heat soak on a summers day outdoor in the hot sunshine so that the interior mirror has reached a temperature of 60-80 degrees Celsius or higher). Optionally, the system may increase the powering (current applied) and/or vary or adjust the pulse duty cycle of the LEDs to view through a driver's spectacles and especially a driver's sunglasses.

Figure 30:
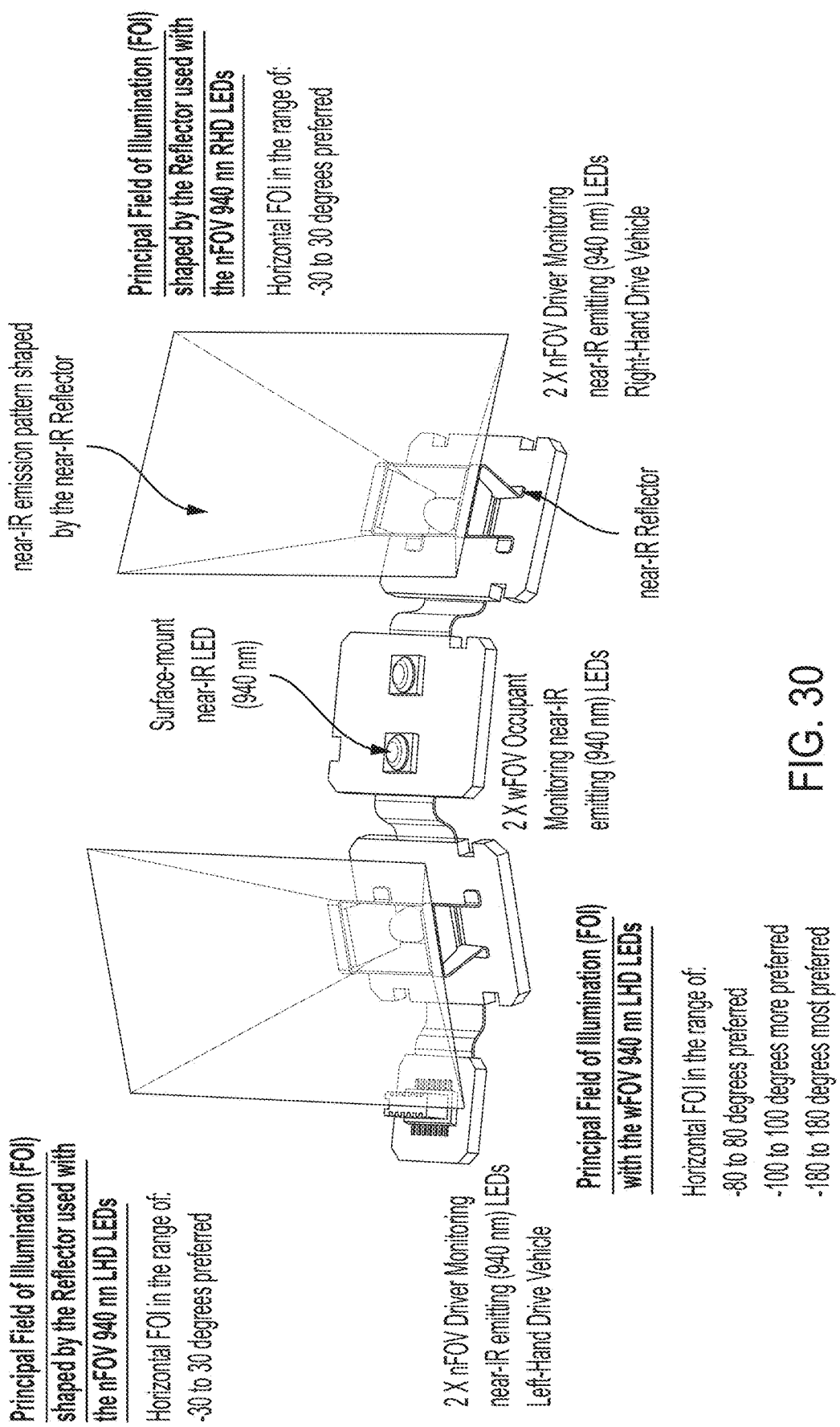
FIG. 30 shows the near-IR emission pattern shaped by the near-IR Reflector for the two narrow field of view LEDs for use in a left-hand drive vehicle and the near-IR emission pattern shaped by the near-IR Reflector for the two narrow field of view LEDs for use in a right-hand drive vehicle.
Figure 31A:
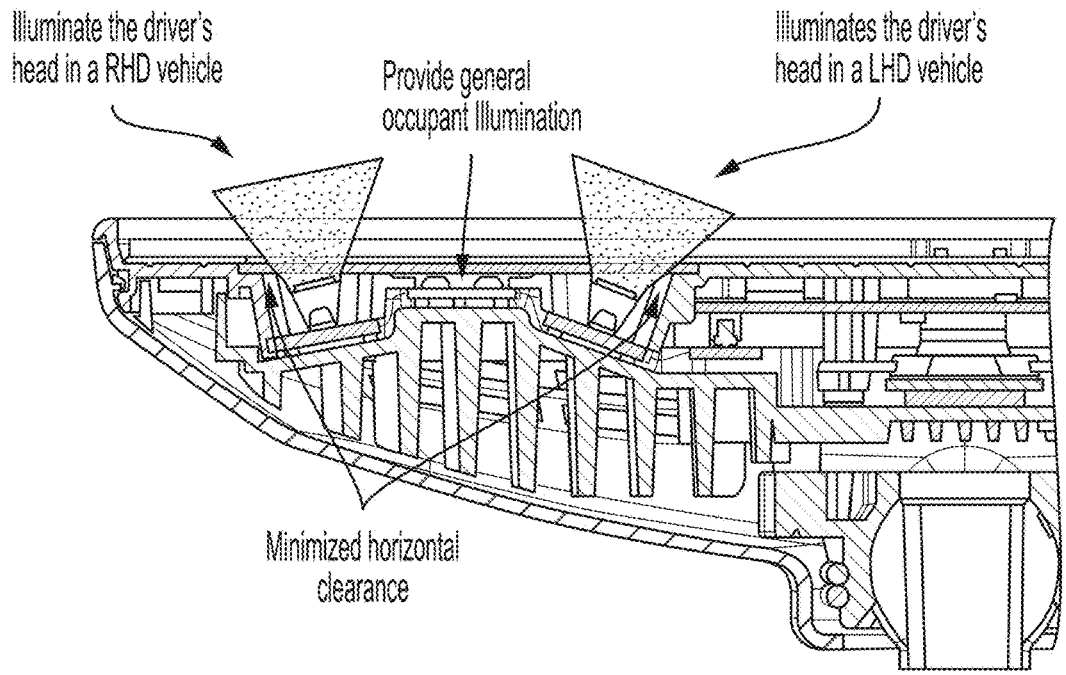
FIG. 31A-31D show near-IR light-emitting sources disposed in and supported by structure of the mirror head of the One-Box Electrochromic Interior DMS Mirror Assembly.
Figure 31B:
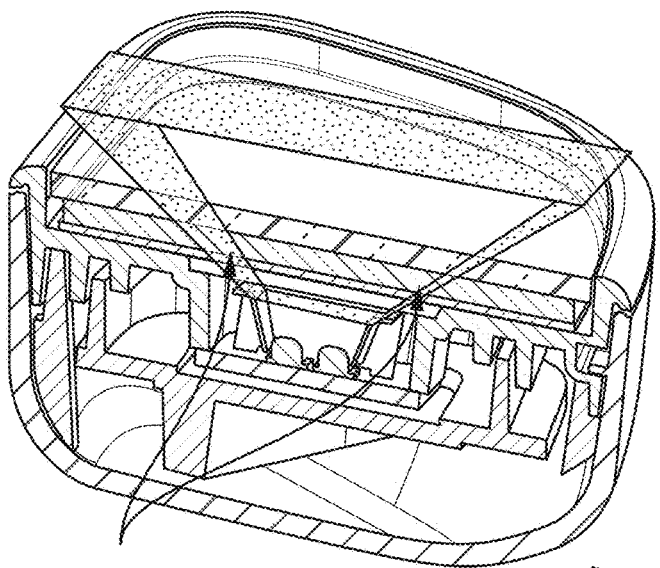
Figure 31C:
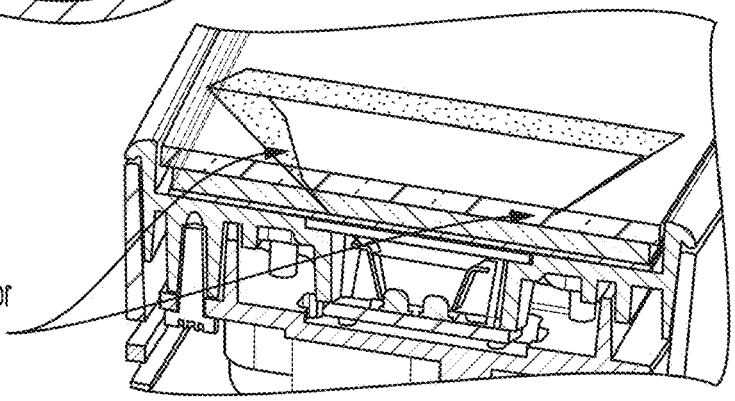
Figure 31D:
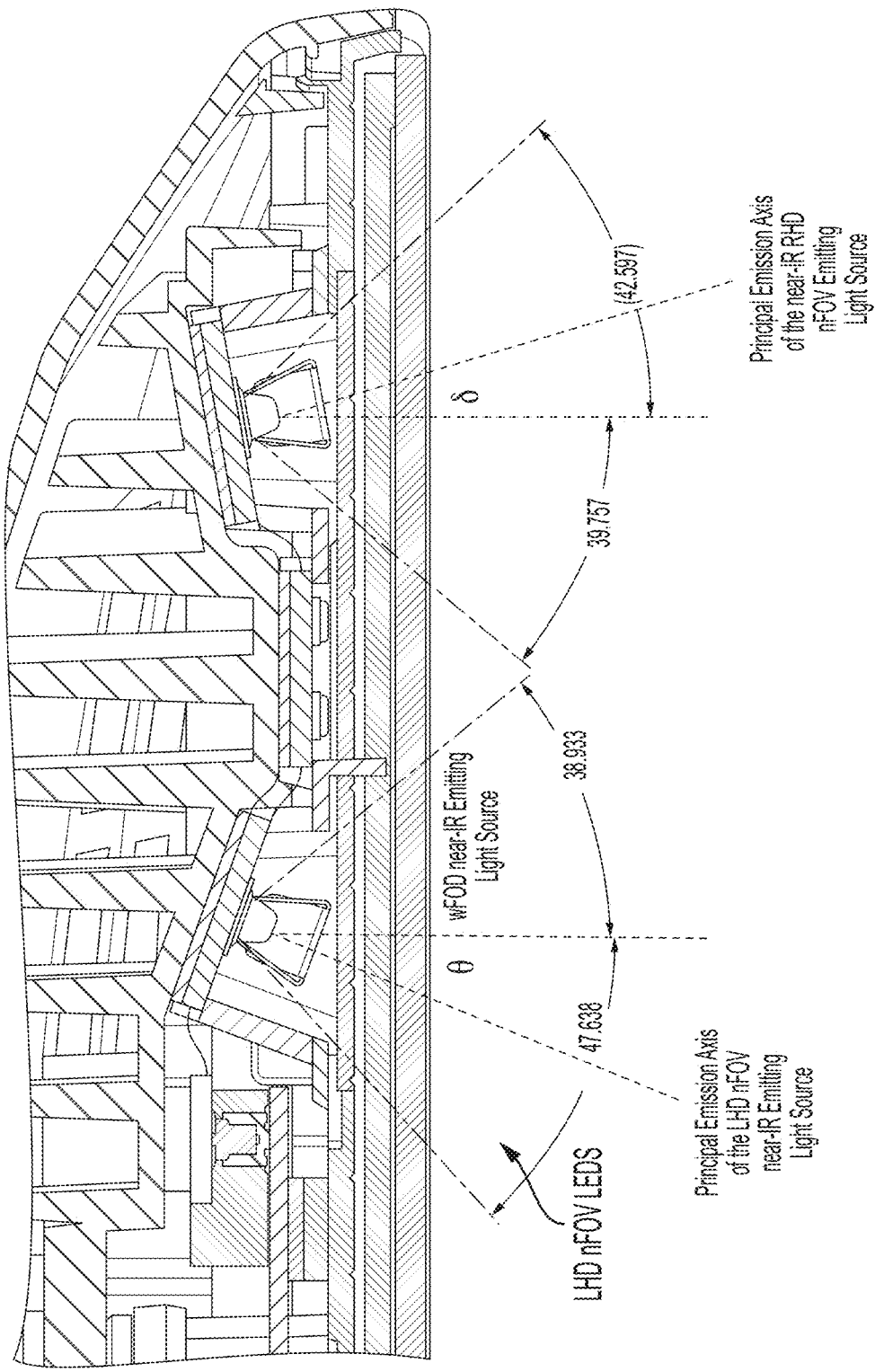

Regarding the near-IR light sources housed within the interior cavity of the mirror head, FIG. 30 shows the near-IR emission pattern shaped by the near-IR Reflector for the two narrow field of view (nFOV) 940 nm LEDs for use in a left-hand drive vehicle and the near-IR emission pattern shaped by the near-IR Reflector for the two narrow field of view (nFOV) 940 nm LEDs for use in a right-hand drive vehicle. A surface mount LED emits in all directions—the reflector thus forms a directed cone or pattern of near-IR illumination. FIGS. 31A-D show how these near-IR light-emitting sources are disposed in and are supported by/angled by [relative to the plane of the rear side of the rear glass surface of the EC Cell (its fourth surface)] structure of the mirror head of the One-Box Electrochromic Interior DMS Mirror Assembly. As shown in FIG. 31D, the LHD nFOV LEDs are at an angle of about 20 degrees (or about 22 degrees) relative to the front surface of the mirror reflective element, the wFOV LEDs are at an angle of zero degrees relative to the front surface of the mirror reflective element, and the RHD nFOV LEDs are at an angle of about 10 degrees relative to the front surface of the mirror reflective element. As also shown in FIG. 31C, the wFOV LEDs are preferably physically close to the mirror reflective element (though may be slightly to-off for to enhance covertness) so most or all of the near-IR light emitted by the wFOV LEDs goes into the vehicle cabin, while the nFOV LEDs are spaced from the mirror reflective element (by the surface mounted reflectors) and angled so the near-IR light emitted by the nFOV LEDs is guided or concentrated by the reflectors toward the driver region in the vehicle cabin.

Figure 32A:
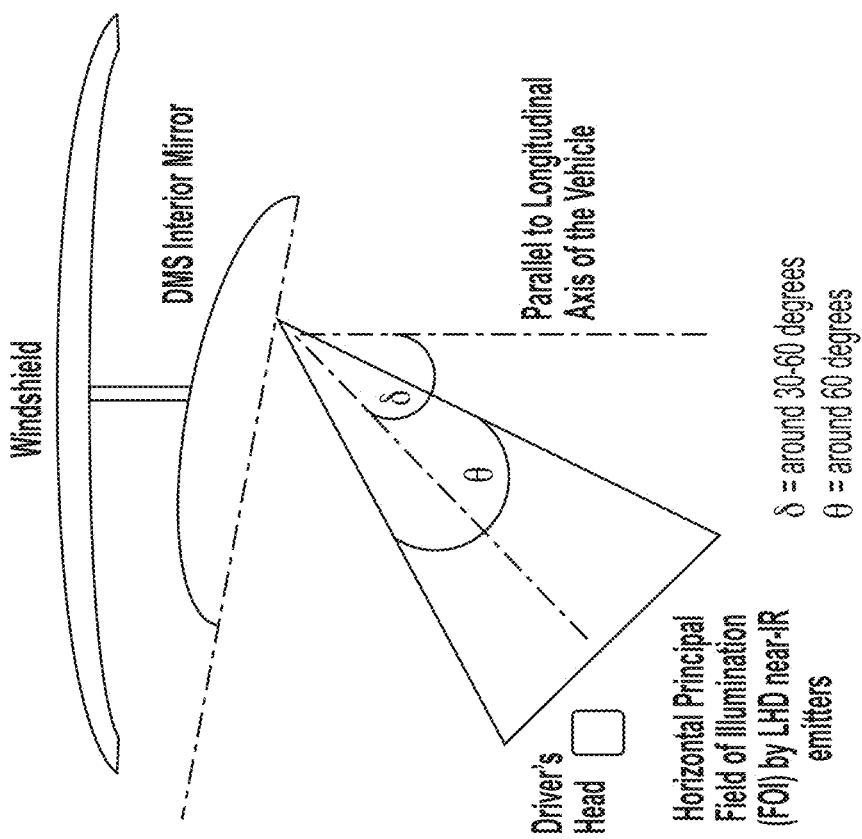
FIGS. 32A and 32B are plan views from above of the One-Box Interior DMS Mirror Assembly as mounted in a LHD vehicle.
Figure 32B:
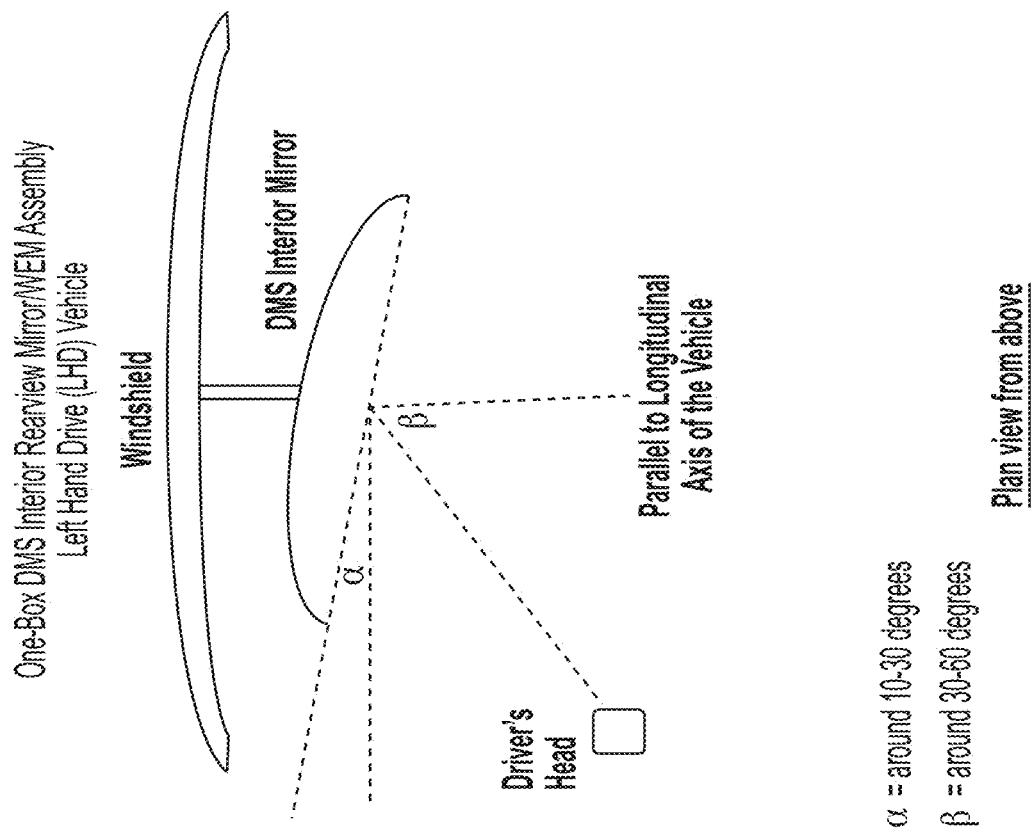
Figure 33A:
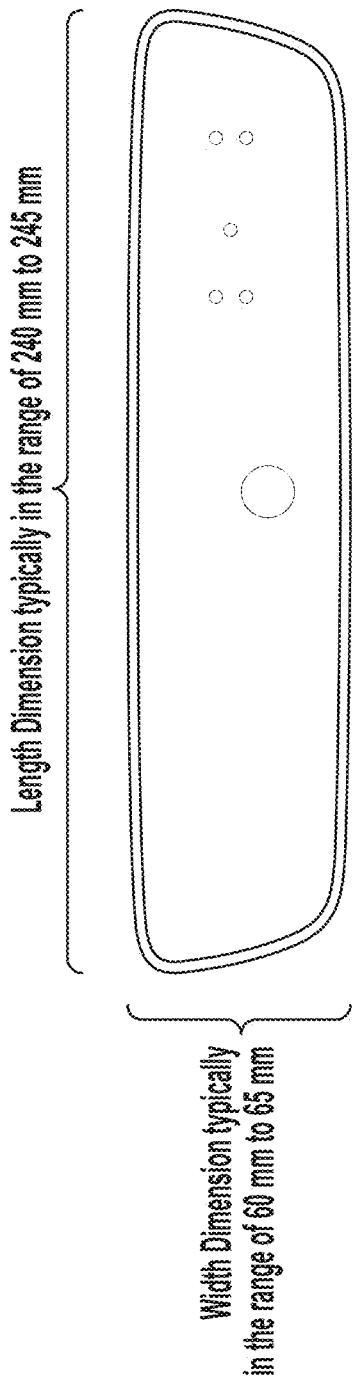
FIG. 33A-33C are schematics showing exemplary angles and dimensions of the One-Box Interior DMS Mirror Assembly in the LHD vehicle.
Figure 33B:
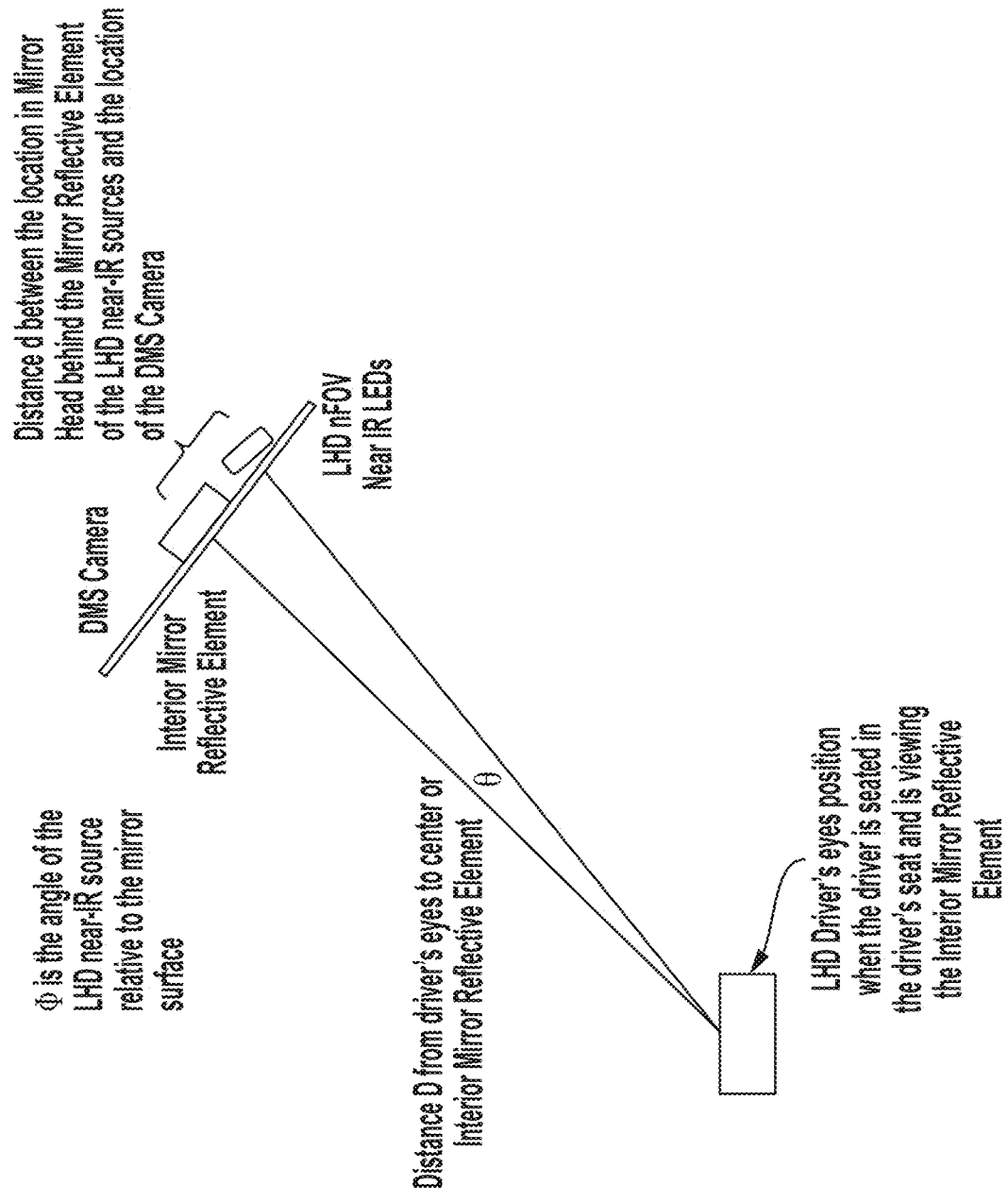
Figure 33C:
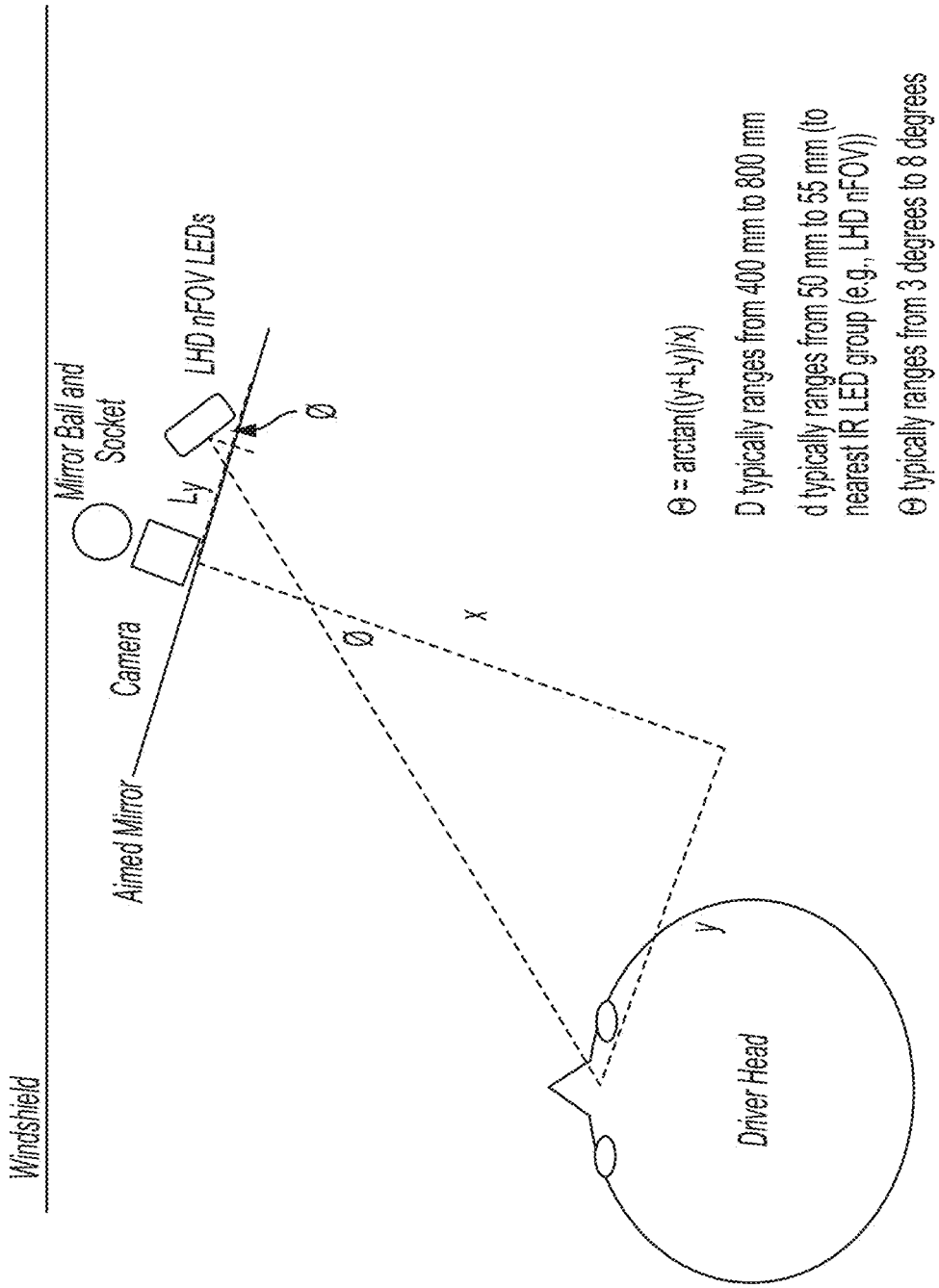
Figure 35A:
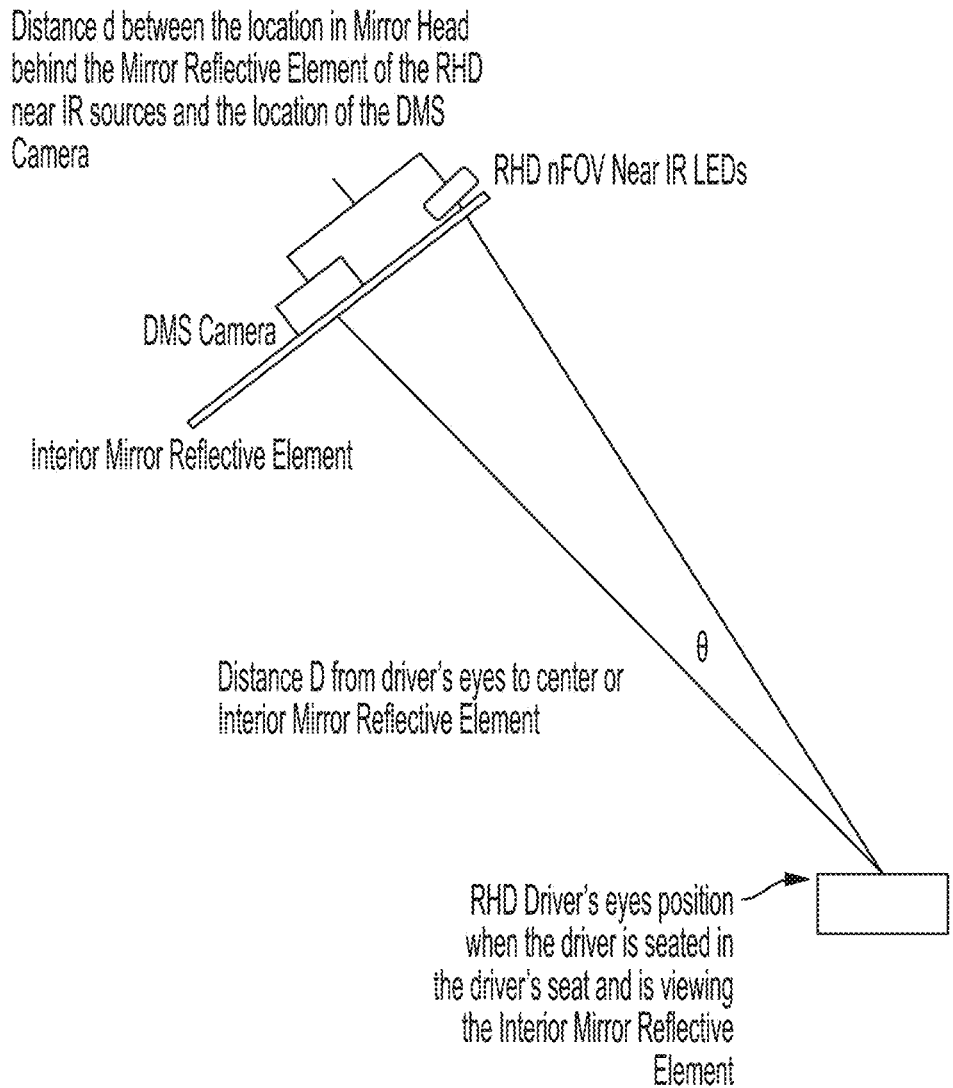
FIGS. 35A and 35B are schematics showing exemplary angles and dimensions of the One-Box Interior DMS Mirror Assembly in the RHD vehicle.
Figure 35B:
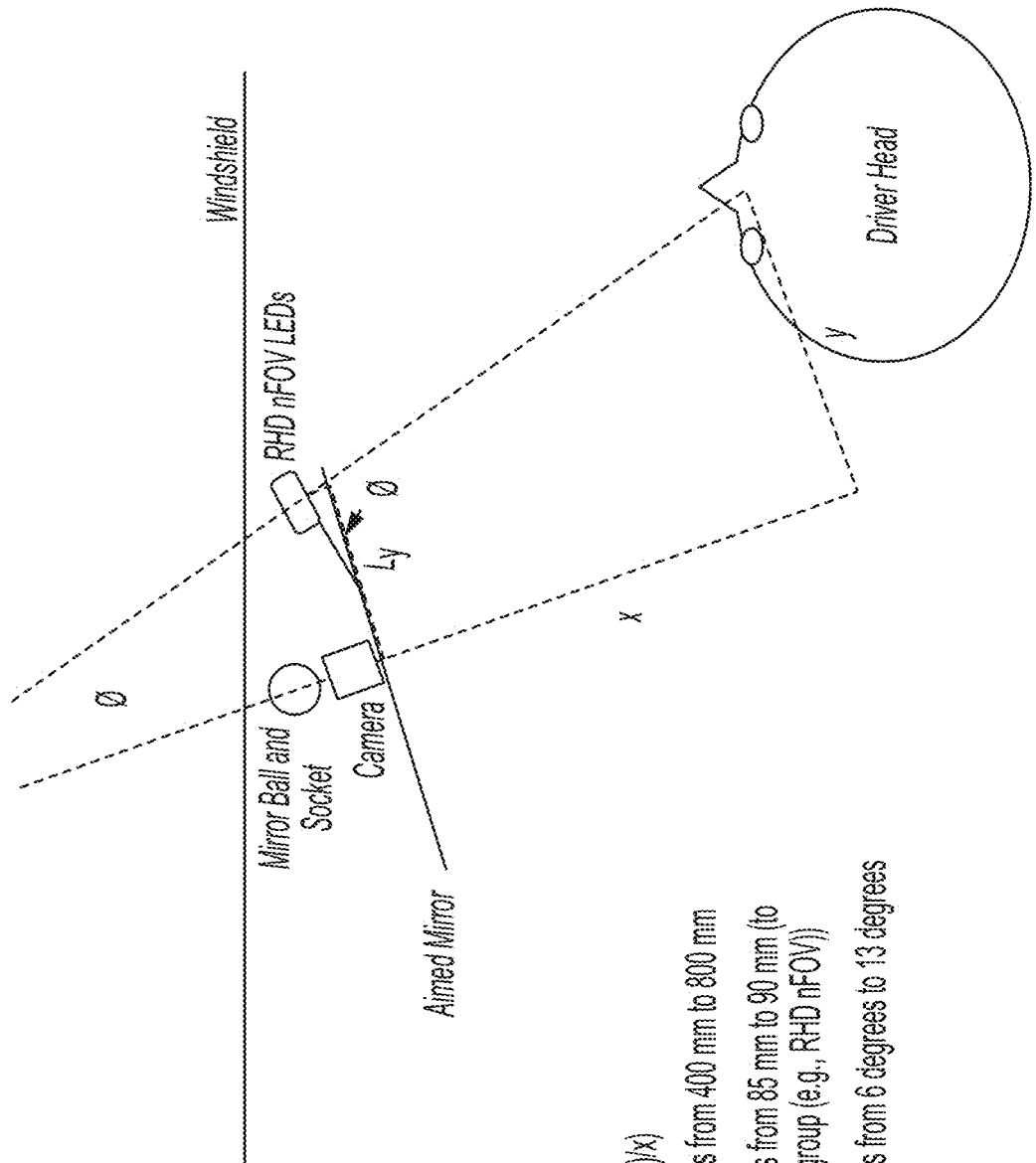

As shown in FIG. 32A, with the One-Box Interior DMS Mirror Assembly mounted at the windshield and angled toward the driver (shown for a left hand drive vehicle in FIG. 32A), the mirror head is angled or canted at about 10-30 degrees relative to a cross axis of the vehicle that is perpendicular to the longitudinal axis of the vehicle. As shown in FIG. 32B, the n-FOV light emitters emit light to illuminate the driver's head, with the angle or width of the illumination beam being around 60 degrees, with the principal axis of the illumination beam being between 10 and 30 degrees relative to a line perpendicular to the planar front surface of the mirror reflective element, more preferably between 15 and 25 degrees relative to a line perpendicular to the planar front surface of the mirror reflective element, such as around 20 degrees or 22 degrees relative to the a line perpendicular to the planar front surface of the mirror reflective element (i.e., the circuit board on which the nFOV light emitter is disposed is at an angle of about 10-30 degrees relative to the planar front surface of the mirror reflective element, more preferably at an angle between 15 and 25 degrees relative to the planar front surface of the mirror reflective element, such as around 20 degrees or 22 degrees relative to the planar front surface of the mirror reflective element). FIGS. 33A and 33B show the dimensions and angles and configuration of the One-Box Interior DMS Mirror Assembly mounted at a LHD vehicle. FIG. 33C shows geometry and equations that may be used to determine the angles of the LHD nFOV LEDs.

in FIG. 34A, with the One-Box Interior DMS Mirror Assembly mounted at the windshield and angled toward the driver (shown for a right hand drive vehicle in FIG. 34A), the mirror head is angled or canted at about 10-30 degrees relative to a cross axis of the vehicle that is perpendicular to the longitudinal axis of the vehicle. As shown in FIG. 34B, the n-FOV light emitters emit light to illuminate the driver's head, with the angle or width of the illumination beam being around 60 degrees, with the principal axis of the illumination beam being between 0 and 20 degrees relative to a line perpendicular to the planar front surface of the mirror reflective element, more preferably between 5 and 15 degrees relative to a line perpendicular to the planar front surface of the mirror reflective element, such as around 10 degrees relative to a line perpendicular to the planar front surface of the mirror reflective element (i.e., the circuit board on which the nFOV light emitter is disposed is at a non-zero angle up to about 20 degrees relative to the planar front surface of the mirror reflective element, more preferably at an angle between 5 and 15 degrees relative to the planar front surface of the mirror reflective element, such as around 10 degrees relative to the planar front surface of the mirror reflective element). FIG. 35A shows the angles and configuration of the One-Box Interior DMS Mirror Assembly mounted at a RHD vehicle. FIG. 35B shows geometry and equations that may be used to determine the angles of the LHD nFOV LEDs.

The angle of the LHD nFOV near-IR illumination source (relative to the planar surface of the mirror reflective element) thus may be different than the angle of the RHD wFOV near-IR illumination source (relative to the planar surface of the mirror reflective element), and in opposite directions (i.e., the principal emission axis of the LHD nFOV near-IR illumination sources is angled toward the left side of the mirror head (and vehicle) and the principal emission axis of the RHD nFOV near-IR illumination sources is angled toward the right side of the mirror head (and vehicle)). Optionally, the angle of the LHD nFOV near-IR illumination source (relative to the planar surface of the mirror reflective element) may be the same as the angle of the RHD wFOV near-IR illumination source (relative to the planar surface of the mirror reflective element), but in a laterally opposite direction than the angle of the RHD wFOV near-IR illumination source. For example, the nFOV near-IR illumination sources may be at an angle relative to the planar surface of the mirror reflective element of between 5 degrees and 25 degrees, such as between 10 degrees and 20 degrees, such as, for example, 15 degrees, with principal emission axis of the LHD nFOV near-IR illumination sources angled toward the left side of the mirror head (and vehicle) and the principal emission axis of the RHD nFOV near-IR illumination sources angled toward the right side of the mirror head (and vehicle). In other words, the LHD nFOV near-IR illumination source may be at, for example, −15 degrees and the RHD nFOV near-IR illumination source may be at, for example, +15 degrees relative to the planar surface of the mirror reflective element.

The principal line of sight of the DMS camera passes perpendicularly through the planar front surface of the mirror reflective element disposed at the mirror head of the One-Box DMS Interior Rearview Mirror Assembly. The field of view of the centrally-located DMS camera includes the head/eyellipse driver's eyes region when the mirror head is adjusted by the driver when the One-Box DMS Interior Rearview Mirror Assembly is installed at either a LHD vehicle or a RHD vehicle. For a variety of reasons, including that the central region of the cavity of the mirror head is crowded by the likes of the DMS camera and the ball-and-socket pivot joint about which the mirror head moves when the driver adjusts the mirror in the equipped vehicle, the nFOV near-IR emitting light source intended to illuminate the head/eyellipse driver's eyes region is located within the mirror head at a distance d mm from a centerline that bisects the center of the length dimension of the mirror reflective element. As shown in FIGS. 32A, 32B, 33A and 33B, the LHD nFOV near-IR emitting light source is angled relative to the planar front side/surface of the mirror reflective element so that, with the One-Box DMS Interior Rearview Mirror Assembly installed at a LHD vehicle and with the mirror head adjusted by the driver, the principal emission axis of the LHD nFOV near-IR emitting light source is canted toward the driver. Similarly, and such as shown in FIGS. 34A, 34B and 35A, the RHD nFOV near-IR emitting light source is angled relative to the planar front side/surface of the mirror reflective element so that, with the One-Box DMS Interior Rearview Mirror Assembly installed at a RHD vehicle and with the mirror head adjusted by the driver, the principal emission axis of the RHD nFOV near-IR emitting light source is canted toward the driver.

For an LHD application of the One-Box DMS Interior Rearview Mirror Assembly, as the dimension d increases (i.e., as the LHD nFOV near-IR emitting light source is located further away from the centerline of the mirror reflective element), the greater the angle that the principal emission axis of the LHD nFOV near-IR emitting light source must subtend relative to the plane of the planar front side/surface of the mirror reflective element in order to provide the line of illumination toward the driver of the LHD vehicle. However, for a RHD application of the One-Box DMS Interior Rearview Mirror Assembly, as the dimension d increases (i.e., as the RHD nFOV near-IR emitting light source is located further away from the centerline of the mirror reflective element), the lower the angle that the principal emission axis of the RHD nFOV near-IR emitting light source must subtend relative to the plane of the planar front side/surface of the mirror reflective element in order to provide the line of illumination toward the driver of the RHD vehicle. Thus, for applications where the One-Box DMS Interior Rearview Mirror Assembly is installed in a LHD vehicle, the LHD nFOV near-IR emitting light source is angled at, for example, about degrees relative to the planar front side/surface of the mirror reflective element, with a distance d (between the mirror centerline and the LHD nFOV near-IR emitting light source) of about 50 mm. For applications where the One-Box DMS Interior Rearview Mirror Assembly is installed in a RHD vehicle, the RHD nFOV near-IR emitting light source is angled at, for example, about 10 degrees relative to the planar front side/surface of the mirror reflective element, with a distance d (between the mirror centerline and the RHD nFOV near-IR emitting light source) of about 89 mm.

Thus, as the distance d increases, the respective angle of the LHD nFOV near-IR emitting light source (relative to the planar front side/surface of the mirror reflective element) increases, and the respective angle of the RHD nFOV near-IR emitting light source (relative to the planar front side/surface of the mirror reflective element) decreases.

Figure 37:
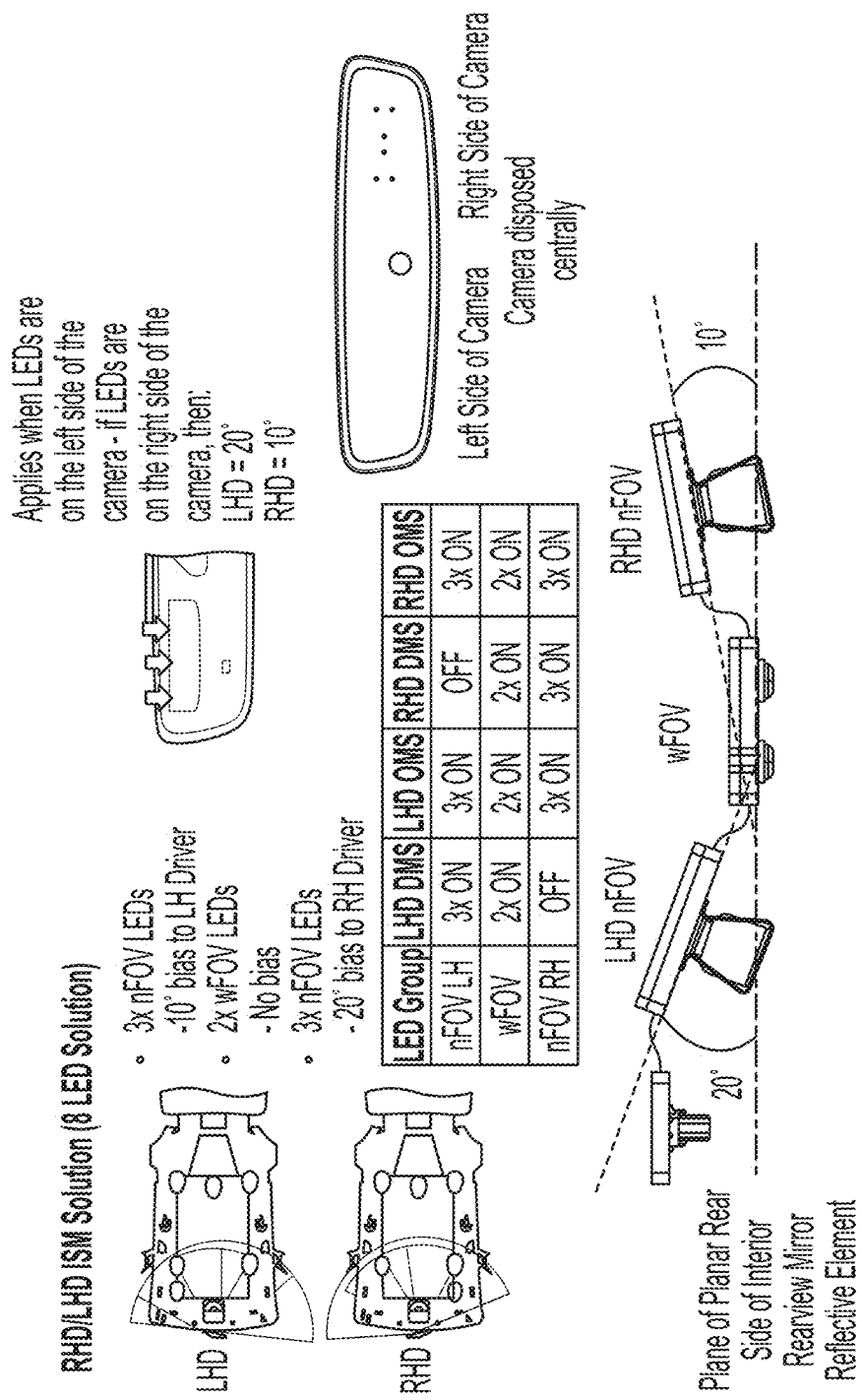
FIG. 37 shows the One-Box Interior DMS Mirror Assembly suitable for use on both a RHD vehicle and a LHD vehicle.

As shown in FIG. 37, the One-Box Interior DMS Mirror Assembly is suitable for use on a LHD vehicle or a RHD vehicle. When the One-Box Interior DMS Mirror Assembly is mounted in a LHD vehicle (see FIGS. 32A, 32B, 33A, 33B), the camera views and the light emitter(s) illuminate LHD Driver's eyes position when the driver is seated in the driver's seat and is viewing the Interior Mirror Reflective Element.

Thus, FIGS. 32A and 32B show (in a left hand drive vehicle) how a driver adjusts the mirror of a One-Box DMS Interior Rearview Mirror Assembly so that the driver can use the mirror reflective element to see rearward via a rear window of the equipped vehicle. Depending on the seating position and size of a particular driver, the front (outermost) side of the planar interior mirror reflective element subtends (in plan-view from above) an acute angle relative to the transverse axis of the vehicle in a range from about 10 degrees to about 30 degrees. As can also be seen in FIG. 32A, nFOV LEDs are located a distance to the right from the center of the mirror head (where the DMS camera is located). FIGS. 34A and 34B show the situation in a RHD vehicle. As can be seen in FIG. 31D, the Principal Emission Axis of the LHD nFOV near-IR Emitting Light Source is at an angle θ relative to the line vertically passing though the planar front glass substrate of the mirror reflective element of the mirror head of the One-Box DMS Infinity™ Electrochromic Interior Rearview Mirror Assembly shown (for an RHD vehicle, the corresponding angle is δ). Angle θ typically ranges from around −10 degrees to around −35 degrees (e.g., −20 degrees). Angle typically ranges from around 0 degrees to around 25 degrees (e.g., 10 degrees).

Figure 33F:
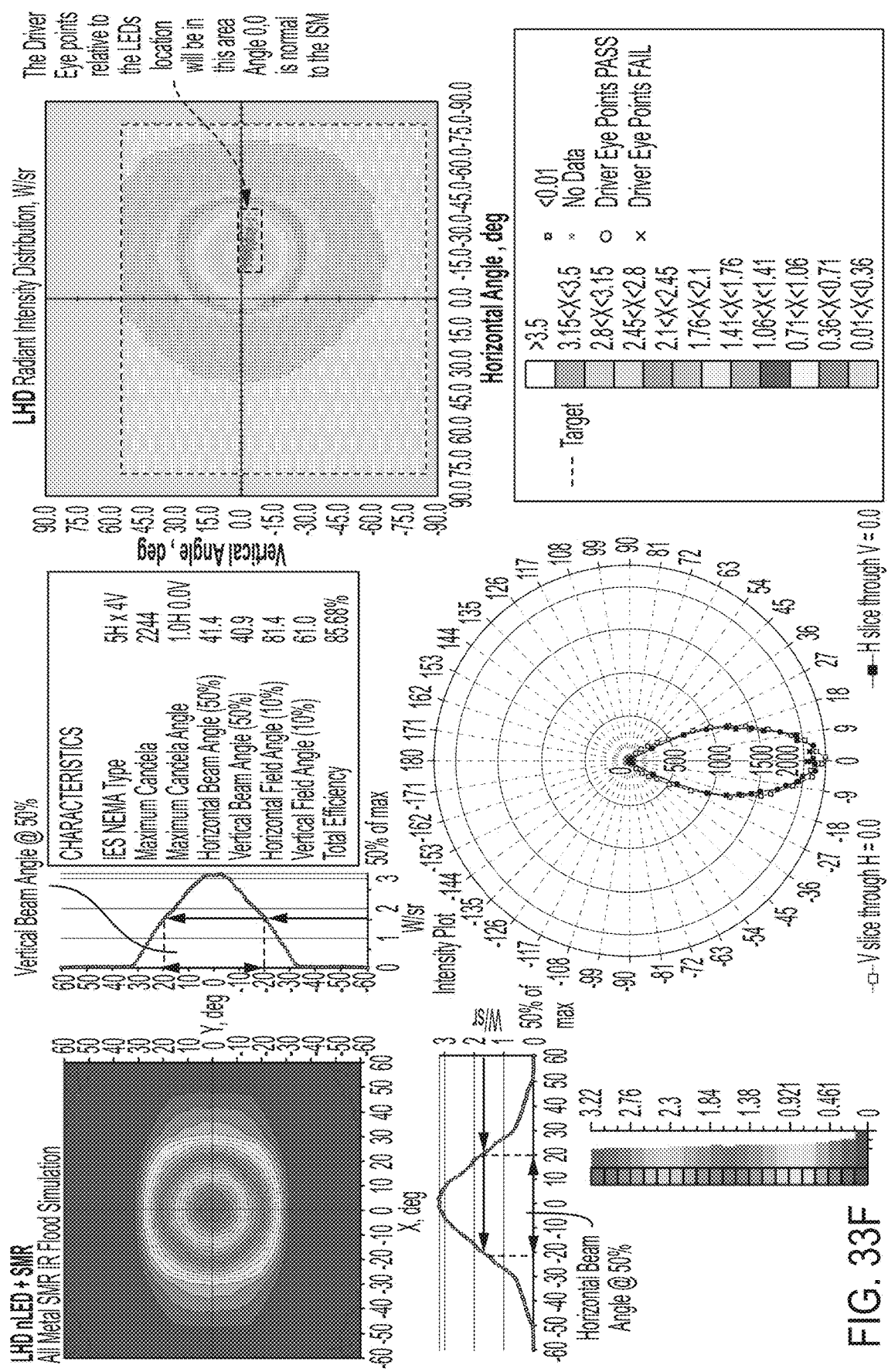
FIG. 33F shows the illumination in the cabin of the LHD vehicle when the LHD nFOV LEDs are powered.
Figure 35C:
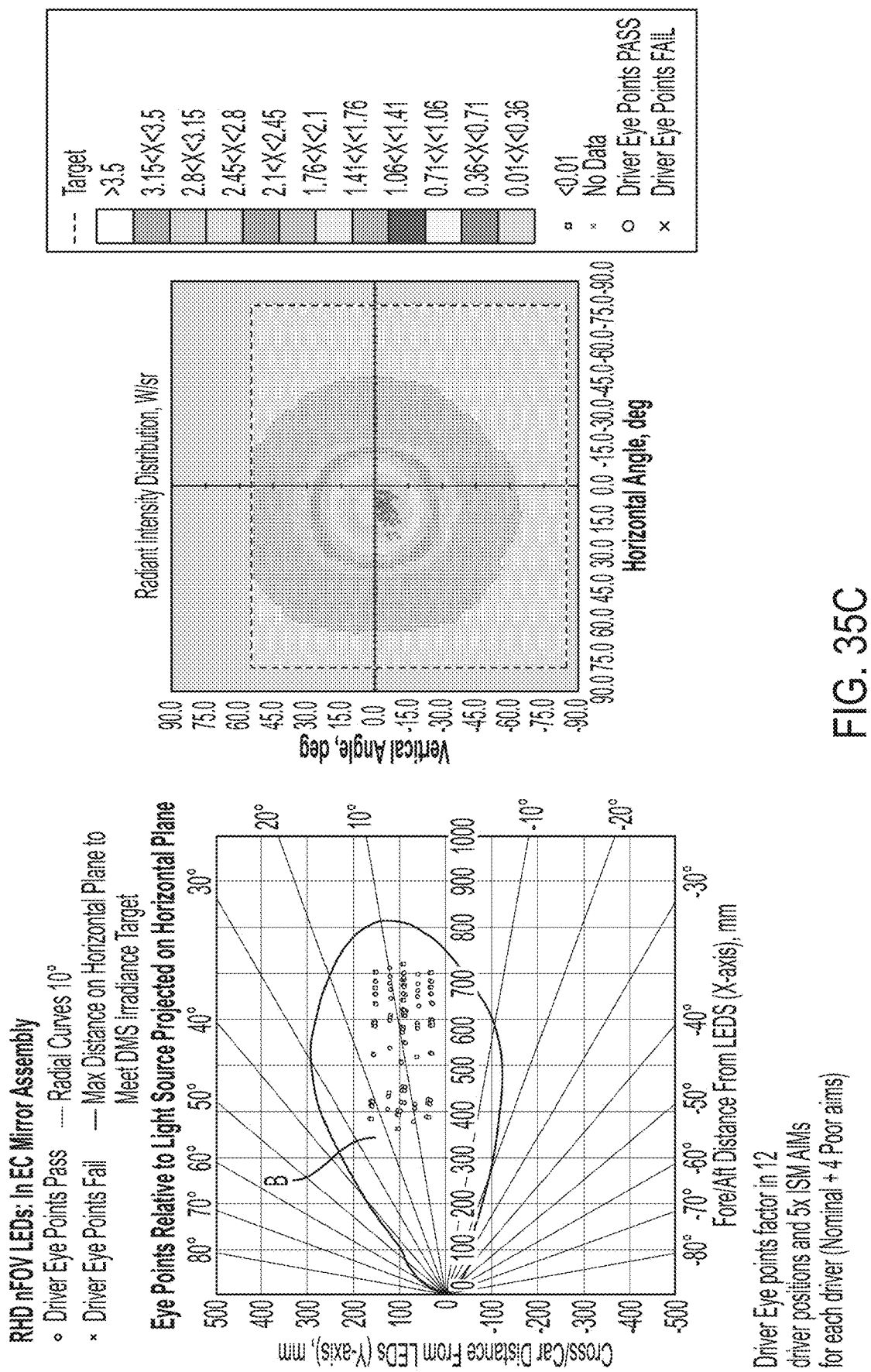
Figure 35E:
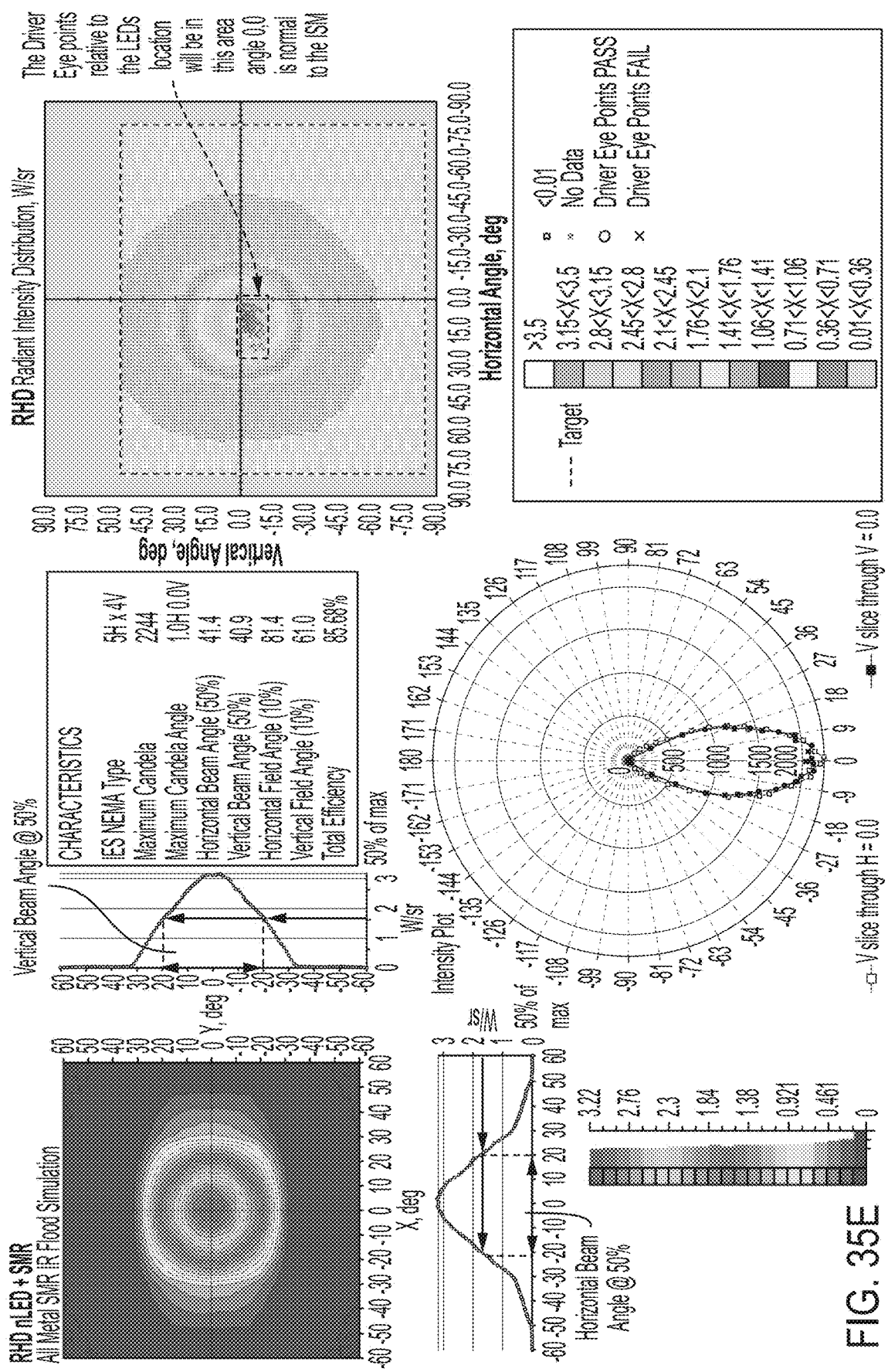
FIG. 35E shows the illumination in the cabin of the RHD vehicle when the RHD nFOV LEDs are powered.

FIGS. 33D and 33E show plots in a horizontal plane (i.e., as viewed from above) and a vertical plane (i.e., as viewed from the windshield looking rearward) of different driver eye points as illuminated by the LHD nFOV LEDs in a LHD vehicle. As shown in FIGS. 33D and 33E, any head/eye within the outline A will have near-IR irradiance of at least 2.5 W/m². FIG. 33F shows the illumination in the cabin of the LHD vehicle when the LHD nFOV LEDs (with the surface mounted reflectors) are powered. As shown in FIG. 33F, the horizontal half beam angle of the LHD nFOV LEDs is 41.4 degrees and the vertical half beam angle of the LHD nFOV LEDs is 40.9 degrees. FIGS. 35C and 35D show plots in a horizontal plane (i.e., as viewed from above) and a vertical plane (i.e., as viewed from the windshield looking rearward) of different driver eye points as illuminated by the RHD nFOV LEDs in a RHD vehicle. As shown in FIGS. 35C and 35D, any head/eye within the outline B will have near-IR irradiance of at least 2.5 W/m². FIG. 35E shows the illumination in the cabin of the RHD vehicle when the RHD nFOV LEDs (with the surface mounted reflectors) are powered. As shown in FIG. 35E, the horizontal half beam angle of the RHD nFOV LEDs is 41.4 degrees and the vertical half beam angle of the LHD nFOV LEDs is 40.9 degrees. FIG. 36 shows the illumination in the cabin of the vehicle when the wFOV LEDs are powered. As shown in FIG. 36, the horizontal half beam angle of the wFOV LEDs is 155 degrees and the vertical half beam angle of the wFOV LEDs is 130 degrees.

As can be seen in FIG. 37, the LHD nFOV is angled (relative the plane of the planar rear side of the Interior Rearview Mirror Reflective Element), and the RHD nFOV also is angled (relative the plane of the planar rear side of the Interior Rearview Mirror Reflective Element). The principal emission axis of the RHD nFOV however is in a direction that is different than and is opposite to the direction of the principal emission axis of the LHD nFOV.

The illumination provided by the light sources meets the automotive safety requirements, including the Safety Goal 2 (ASIL B). The system shall be classified as exempt according to IEC 62471:2006. The system operates in a safe state, whereby the system shall emit no IR radiation.

As can be seen in FIGS. 31A-37, the driver monitoring camera is centrally located in the mirror head. The nFOV near-IR LEDs that, in a RHD vehicle, monitor the driver's head, are positioned towards one lateral side of the mirror head and are angled [relative to the plane of the rear side of the rear glass surface of the EC Cell (its fourth surface)] at an acute angle around 10 degrees and view in a direction away from the lateral side of the mirror head. The nFOV near-IR LEDs that, in a LHD vehicle, illuminate the driver's head, are positioned closer to the central region of the mirror head (where the driver-monitoring camera is disposed) and are angled [relative to the plane of the rear side of the rear glass surface of the EC Cell (its fourth surface)] at an acute angle around 20 degrees and view in a direction opposite to that of the other nFOV LEDs. The wFOV near-IR LEDs that provide general cabin/occupant illumination are disposed in the mirror head between where the nFOV LEDs are located—and have their principal axis of view perpendicular to the plane of the rear side of the rear glass planar surface of the EC Cell.

Thus, upon ignition-on and/or at start-up of the propulsion system (such as an engine in an internal combustion engine vehicle or an electric drive in an electric vehicle) of the equipped vehicle, the One-Box Interior DMS Rearview Mirror Assembly is powered. When powered, the DMS camera captures frames of image data at a frame capture rate of at least 15 fps, preferably at least 30 fps, more preferably at least 60 fps. During driving, the ECU of the One-Box Interior DMS Rearview Mirror Assembly is aware of whether the vehicle is being driven in left hand drive (LHD) country or in a right hand drive (RHD) country. This can be based on data provided by the equipped vehicle based on likes of the current geographic location of the equipped vehicle as determined by the like of a GPS system. Also, when the vehicle first leaves its vehicle assembly plant, the automaker involved will have the steering column at the left side of the front cabin region for a LHD vehicle and will have the steering column at the right side of the front cabin region for a RHD vehicle. When set for a left hand drive vehicle or a right hand drive vehicle/knowing where the vehicle is being driven, the image processing of the image data captured by the DMS camera is set to process image data representative of the driver region (e.g., the left hand front seat region for a left hand drive vehicle or the right hand front seat region for a right hand drive vehicle) for DMS frame capture, and the light sources are controlled or powered to provide enhanced illumination of the driver region for the DMS frame capture. The light sources of the One-Box Interior DMS Rearview Mirror Assembly in a preferred embodiment include a first set of light sources (the wFOV light source) disposed between a second set of light sources (e.g., the left hand (LH) light source) and a third set of light sources (e.g., the right hand (RH) light source).

For a left hand drive vehicle equipped with the One-Box Interior DMS Rearview Mirror Assembly, during capture of a DMS set of captured frames of image data (for a driver monitoring function), the LHD nFOV light source (preferably a plurality of near-IR emitting LEDs comprising at least two LEDs and more preferably comprising four or less LEDs) and the wFOV light source (preferably a plurality of near-IR emitting LEDs comprising at least two LEDs and more preferably comprising four or less LEDs) are energized. The illumination provided by the LHD nFOV light source and the wFOV light source combine to illuminate the head region of the driver (who is seated at the left side of the vehicle) with an irradiance of at least 1.25 W/m$^2$, more preferably at least 1.8 W/m$^2$ and most preferably at least 2.3 W/m$^2$. The LHD nFOV near-IR light source has a narrow field of illumination cone/zone that encompasses/illuminates the driver's head-box region (and thus provides enhanced irradiance at the driver's face. The wFOV near IR light source is also energized during this capture of the DMS set of captured frames of image data for the driver monitoring function, but the LHD nFOV near-IR light source is not energized. This selective energizing of one but not the other of the LHD and RHD light sources (taking a LHD drive as illustrative where the LHD light source is energized but the RHD light source is not energized) avoids wastefully generating heat within the mirror head by energizing the RHD light source that contributes scant illumination of the driver sitting in the left-hand driver's seat. The wFOV light source however adds some level of irradiance to the driver's head box region and also illuminates the area where the driver's hands would be (the steering wheel, center console, etc.) and thus regardless of whether in a LHD or a RHD vehicle, the wFOV light source is energized all the time the vehicle is powered and operated. Thus, for DMS frame capture in a left hand drive vehicle, the One-Box Interior DMS Rearview Mirror Assembly will only power the LHD nFOV light source and the wFOV light source since these are the light sources that will illuminate the driver of the left hand drive vehicle. Light emitted by the RHD nFOV light source, when powered, does not cover in any significance any part of the LH driver so the RHD nFOV light source is not powered during DMS frame capture in a LHD vehicle. Of course in a RHD vehicle, this reverses. For DMS frame capture in a right hand drive vehicle, the One-Box Interior DMS Rearview Mirror Assembly will only power the RHD nFOV light source and the wFOV light source since these are the light sources that will illuminate the driver of the right hand drive vehicle.

For either a left hand drive vehicle or a right hand drive equipped with the One-Box Interior DMS Rearview Mirror Assembly, during capture of an OMS set of captured frames of image data (for an occupant monitoring function), all three sets of near-IR light sources (LHD nFOV and wFOV and RHD nFOV) are energized so that near-IR floodlighting within the vehicle cabin is maximized, and especially to illuminate likes of a second row of rear seats or even a third row of rear seats).

For the left hand drive vehicle equipped with the One-Box Interior DMS Rearview Mirror Assembly, during capture of an OMS set of captured frames of image data (for an occupant monitoring or occupant detection function), the LHD nFOV light source, the wFOV light source and the RHD nFOV light source (preferably a plurality of near-IR emitting LEDs comprising at least two LEDs and more preferably comprising four or less LEDs) are all energized. The illumination provided by the LHD nFOV light source, the wFOV light source and the RHD nFOV light source combine to illuminate the second row or rear seats and the passenger seat region with an irradiance of at least 0.1 W/m$^2$, of preferably at least 0.15 W/m$^2$, and more preferably at least 0.2 W/m$^2$, and the illumination provided by the wFOV light source and the RHD nFOV light source combine to illuminate the front passenger seat region with an irradiance of at least 0.15 W/m$^2$, of preferably at least 0.25 W/m$^2$, and more preferably at least 0.4 W/m$^2$.

Thus, for DMS frame capture in a left hand drive vehicle, the One-Box Interior DMS Rearview Mirror Assembly will only power the LHD nFOV light source and the wFOV light source since these are the light sources that will illuminate the driver of the left hand drive vehicle, and for OMS frame capture in the left hand drive vehicle, the One-Box Interior DMS Rearview Mirror Assembly will power the LHD nFOV light source, the wFOV light source and the RHD nFOV light source.

Similarly, for a right hand drive vehicle equipped with the One-Box Interior DMS Rearview Mirror Assembly, during capture of a DMS set of captured frames of image data (for a driver monitoring function), the RHD nFOV light source (preferably a plurality of near-IR emitting LEDs comprising at least two LEDs and more preferably comprising four or less LEDs) and the wFOV light source (preferably a plurality of near-IR emitting LEDs comprising at least two LEDs and more preferably comprising four or less LEDs) are energized. The illumination provided by the RHD nFOV light source and the wFOV light source combine to illuminate the head region of the driver (at the right side of the vehicle) with an irradiance of at least 1.25 W/m$^2$, more preferably at least 1.8 W/m$^2$ and most preferably at least 2.3 W/m$^2$. The RHD nFOV light source has a narrow field of illumination cone that covers the driver's head box region (and thus provides enhanced irradiance at the driver's face without increasing the input power to the RHD nFOV light source, while also providing reduced heat generation in the system and reducing the number of LEDs needed), while the wFOV light source adds some level of irradiance to the driver's head box region but also illuminates the area where the driver's hands would be (the steering wheel, center console, etc.). Thus, for DMS frame capture in a right hand drive vehicle, the One-Box Interior DMS Rearview Mirror Assembly will only power the RHD nFOV light source and the wFOV light source since these are the light sources that will illuminate the driver of the right hand drive vehicle. Light emitted by the LHD nFOV light source, when powered, does not cover any part of the RH driver so the LHD nFOV light source is not powered during DMS frame capture.

For the right hand drive vehicle equipped with the One-Box Interior DMS Rearview Mirror Assembly, during capture of an OMS set of captured frames of image data (for an occupant monitoring or occupant detection function), the RHD nFOV light source, the wFOV light source and the LHD nFOV light source (preferably a plurality of near-IR emitting LEDs comprising at least two LEDs and more preferably comprising four or less LEDs) are all energized. The illumination provided by the RHD nFOV light source, the wFOV light source and the LHD nFOV light source combine to illuminate the second row or rear seats and the passenger seat region with an irradiance of at least 0.1 W/m$^2$, of preferably at least 0.15 W/m$^2$, and more preferably at least 0.2 W/m$^2$, and the illumination provided by the wFOV light source and the LHD nFOV light source combine to illuminate the front passenger seat region with an irradiance of at least 0.15 W/m$^2$, of preferably at least 0.25 W/m$^2$, and more preferably at least 0.4 W/m$^2$.

Thus, for DMS frame capture in a right hand drive vehicle, the One-Box Interior DMS Rearview Mirror Assembly will only power the RHD nFOV light source and the wFOV light source since these are the light sources that will illuminate the driver of the right hand drive vehicle, and for OMS frame capture in the right hand drive vehicle, the One-Box Interior DMS Rearview Mirror Assembly will power the RHD nFOV light source, the wFOV light source and the LHD nFOV light source.

The illumination protocols/scenarios described herein can be dynamic in that they can adjust to a current driving situation. For example, the illumination protocols can adjust for daytime/nighttime (by time of day or time of night) driving conditions; the illumination protocols can adjust responsive to a level of ambient cabin lighting, such as can occur on a sunny day vs cloudy day or at dawn or dusk; or the illumination protocols can adjust (such as for thermal management) to temporarily de-rate in-cabin illumination for a temporary limited period of time after ignition-on or start-up occurs when the vehicle has been parked out in the sun on a hot sunny day.

Whether the One-Box Interior DMS Rearview Mirror Assembly is disposed in a LHD vehicle or a RHD vehicle, the DMS camera, for purposes of occupancy detection, preferably has a field of illumination that covers the seating positions (front and rear) of occupants of the vehicle. Similarly, to provide near-IR floodlighting of such passengers seated in the interior cabin of the vehicle, the field of illumination by the wFOV near-IR illuminator, whether the One-Box Interior DMS Rearview Mirror Assembly is used in a LHD or a RHD vehicle, covers the seating positions (front and rear) of occupants of the vehicle. However, for DMS functionality, it is desirable that the driver's face/head/body is near-IR illuminated as intensely as possible. Thus, for a LHD vehicle, it is desirable to have the LHD nFOV near-IR illuminator directed toward the driver of the LHD vehicle, while for a RHD vehicle, it is desirable to have the RHD nFOV near-IR illuminator directed toward the driver of the RHD vehicle. Given that the central area of the DMS mirror head has limited space to accommodate the camera, a wFOV near-IR illuminator, an nFOV near-IR illuminator and the mirror pivot joint and similar/associated hardware, the nFOV near-IR illuminators, for practical reasons, are disposed to the left side of the camera or to the right side of the camera.

Thus, and such as shown in FIGS. 31C, 33B, 33C, 35A, 35B and 36 (and discussed above), the LHD nFOV near-IR illuminator is tilted or angled toward the left hand side of the vehicle, with the angle of tilt increasing the further the LHD nFOV near-IR illuminator is positioned distance from the center of the mirror head, and the RHD nFOV near-IR illuminator needs to be tilted or angled toward the right hand side of the vehicle, with the angle of tilt decreasing the further the RHD nFOV near-IR illuminator is positioned distance from the center of the mirror head.

Figure 39C:
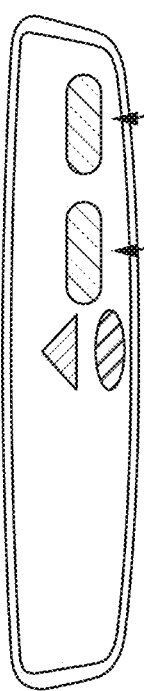
FIGS. 39A-E show different locations for the wFOV and nFOV near-IR illuminators at a mirror head for the One-Box Interior DMS Rearview Mirror Assembly.
Figure 39D:
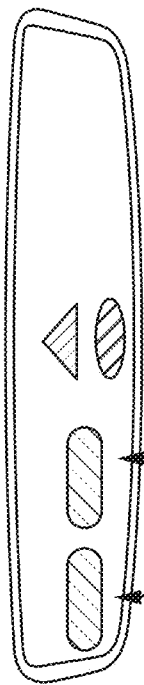
Figure 39E:
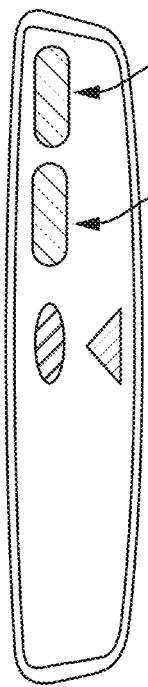
Figure 39A:
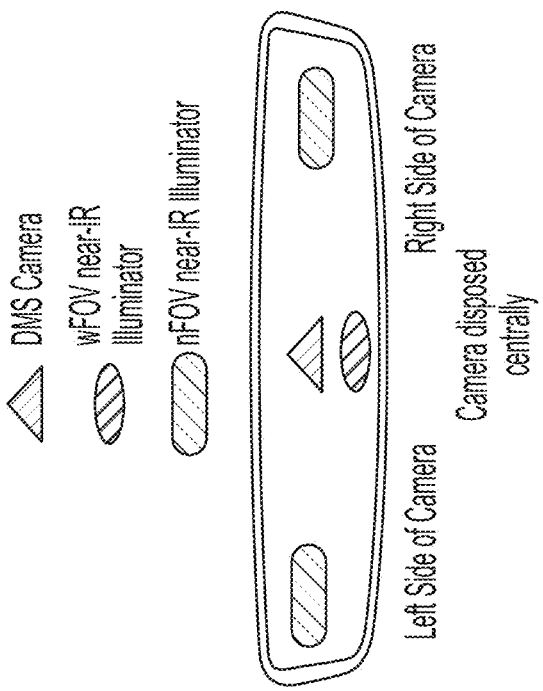

Optionally, for practical reasons, such as manufacturing and packaging and cost reasons, it can be desirable to have the nFOV near-IR illuminators on one side (e.g., the left side) or the other side (e.g., the right side) of the camera centrally disposed in the mirror head or to have the LHD nFOV near-IR illuminator on one side (e.g., the left side) and the RHD nFOV near-IR illuminator on the other side (e.g., the right side). For example, and such as shown in FIG. 39A, a One-Box Interior DMS Rearview Mirror Assembly may have the camera and the wFOV near-IR illuminator centrally disposed at the mirror head (with the camera centrally located above or below the wFOV near-IR illuminator), with one of the nFOV near-IR illuminators (e.g., the LHD nFOV near-IR illuminator that is for illuminating the driver of a LHD vehicle) disposed at the left side of the mirror head (at the left side of the camera) and the other of the nFOV near-IR illuminators (e.g., the RHD nFOV near-IR illuminator that is for illuminating the driver of a RHD vehicle) disposed at the right side of the mirror head (at the right side of the camera). Alternatively, it is contemplated that the LHD nFOV near-IR illuminator may be disposed at the right side of the mirror head and the RHD nFOV near-IR illuminator may be disposed at the left side of the mirror head.

Figure 39B:
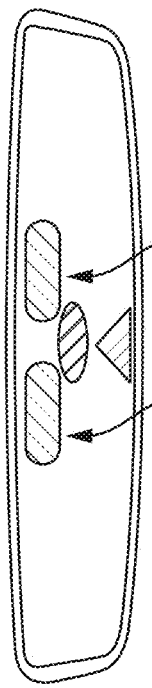

Optionally, the nFOV near-IR illuminators may be more centrally disposed in the mirror head (such as above or below the centrally located wFOV near-IR illuminator). For example, and such as shown in FIG. 39B, the wFOV near-IR illuminator may be centrally located (e.g., above or below the centrally located camera), and the nFOV near-IR illuminators may be disposed at or above (or below) the wFOV near-IR illuminator. As shown in FIG. 39B, one of the nFOV near-IR illuminators (e.g., the LHD nFOV near-IR illuminator that is for illuminating the driver of a LHD vehicle) is disposed at the left side of the centerline of the mirror head (at the left side of the camera) and the other of the nFOV near-IR illuminators (e.g., the RHD nFOV near-IR illuminator that is for illuminating the driver of a RHD vehicle) is disposed at the right side of the centerline of the mirror head (at the right side of the camera). Alternatively, it is contemplated that the LHD nFOV near-IR illuminator may be disposed at the right side of the centerline of the mirror head and the RHD nFOV near-IR illuminator may be disposed at the left side of the centerline of the mirror head. It is further contemplated that the LHD nFOV near-IR illuminator and the RHD nFOV near-IR illuminator may be vertically arranged at the centerline of the mirror head, with one above the other.

Optionally, the wFOV near-IR illuminator may be centrally disposed (e.g., above or below the centrally disposed camera), and both nFOV near-IR illuminators may be disposed at one side or the other of the mirror head. For example, and such as shown in FIG. 39C, the wFOV near-IR illuminator is centrally disposed (e.g., above or below the centrally disposed camera), and the LHD and RHD nFOV near-IR illuminators are disposed at the right side of the mirror head, with the LHD nFOV near-IR illuminator disposed closer to the center of the mirror head than the RHD nFOV near-IR illuminator. Alternatively, and such as shown in FIG. 39D, the wFOV near-IR illuminator is centrally disposed (e.g., above or below the centrally disposed camera), and the LHD and RHD nFOV near-IR illuminators are disposed at the left side of the mirror head, with the RHD nFOV near-IR illuminator disposed closer to the center of the mirror head than the LHD nFOV near-IR illuminator. Optionally, the wFOV near-IR illuminator and/or the nFOV near-IR illuminators may be disposed at a lower region of the mirror head (see FIGS. 39C and 113D) or may be disposed at an upper region of the mirror head (see FIG. 39E). Thus, and such as shown in FIG. 39E, one or both of the nFOV near-IR illuminators may be higher up toward the upper region of the mirror head, and/or the wFOV near-IR illuminator may be higher up toward the upper region of the mirror head.

In a vehicle (whether LHD or RHD), the driver grasps the mirror head to adjust what the interior mirror reflective element views so that the driver sees out the rear window of the equipped vehicle. The camera moves in tandem with movement of the mirror head by the driver. In so doing, the driver moves the mirror head to a position/orientation where the driver-monitoring camera within the mirror head is viewing the head of the driver.

The near-IR signal emitted by the LEDs is preferably at 940 nm wavelength so that it is more readily recognized by the DMS processor (there is a decrease in ambient solar light at that wavelength due to absorption of 940 nm light by water in the atmosphere). The DMS camera includes a filter that allows/passes that wavelength and attenuates other light. The camera will thus operate with an enhanced 940 nm signal, which enhances driver monitoring in situations where the driver is wearing sunglasses. The rest of the in-cabin light (i.e., the ambient light) is filtered so the camera focuses on the 940 nm wavelength and then avoids "seeing" reflection at sunglasses. The DMS function may provide dynamic camera control (increase or decrease exposure time or frame capture rate) and LED control (increase or decrease power to LEDs and/or increase or decrease on time) to accommodate changes in lighting and/or to accommodate driver sunglasses or the like.

The mirror reflector may comprise a stack of coatings specific to the needs related to three basic requirements: (i) reflect much of the visible light to prevent seeing details such as the camera behind the glass (this can also be stated as transmitting less than 25% of visible light, one way through the glass subassembly), (ii) transmit near infrared (NIR) that comes out from NIR LEDs behind the glass, reflects off occupants and comes back to the camera behind the glass (the goal for the coating is greater than 95% transmission at 940 nm wavelength) and (iii) control the color of reflected light incident at the mirror reflective element to be neutral or to the blue side for any manufacturing variance, avoiding red and green shifts. Also, due to fixed as well as variable costs, it is desirable to have the minimum number of layers in the coating as well as minimum total thickness of all layers.

Figure 40:
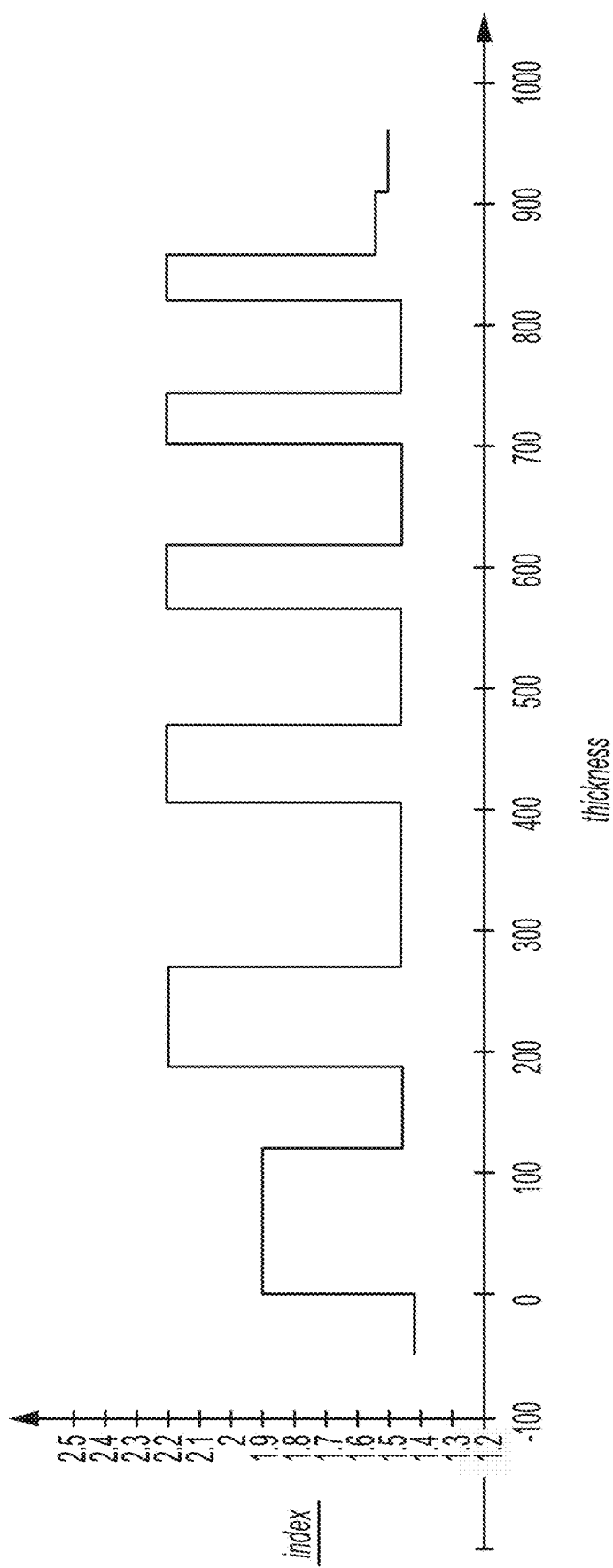
FIG. 40 is a table showing a transflector stack for a visible-light transmitting/visible-light reflecting/near-IR light transmitting transflective substrate suitable for use in the One-Box Electrochromic Interior DMS Mirror Assembly.

Sodalime glass comprises a planar air-side separated from a tin-side by a thickness dimension of the glass plate or substrate. The glass plate is formed by moving molten glass across a bath of molten tin. As a consequence, the outer glass surface at the tin side of the float sodalime glass plate develops a layer that is rich in/impregnated by/mixed with tin (i.e., Sn) atoms. This tin-rich glass surface constitutes a SodaSn layer at the side/surface of the sodalime substrate. FIG. 40 shows a stack of thin film coatings formed with alternating layers, which is the layer layup with thicknesses and materials that make up the coating. These coatings are placed on the third surface of the mirror "cell" assembly (i.e., the third surface of a laminate-type electrochromic mirror reflective element, such as the types described in U.S. Pat. Nos. 7,274,501; 7,184,190 and/or 7,255,451, which are hereby incorporated herein by reference in their entireties). The SodaSn layer is not part of the coating, but is an inherent layer of Sn due to the manufacturing of the float glass. The presence of the Sn also improves adhesion of the coating at that side of the glass substrate. For the final layer, the ITO is a transparent electrically conductive layer required for the electrochromic function and it is needed on both sides of the solid polymer matrix electrolyte preferably forming the electrochromic medium of the laminate-type electrochromic mirror reflective element.

Figure 41:
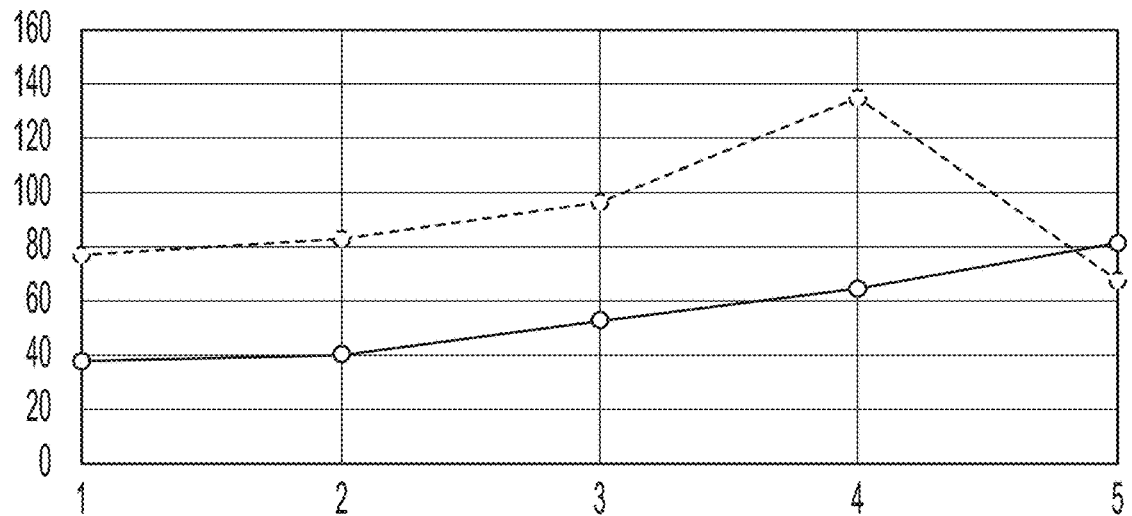
FIG. 41 is a graph showing the thicknesses of the layers of the transflector of FIG. 40.

A visible-light transmitting/visible-light reflecting/near-IR light transmitting transflective substrate suitable for use in One-Box Electrochromic Interior DMS Mirror Assembly is shown in FIG. 40, which shows layer thicknesses for the alternating $Nb_2O_5$ and $SiO_2$ layers of the transflector stack. FIG. 41 shows the thicknesses of the layers in a graph form. The transflective mirror reflector comprises a first layer of $Nb_2O_5$ having a physical thickness of 37.62 nm, a first layer of $SiO_2$ having a physical thickness of 77.41 nm, a second layer of $Nb_2O_5$ having a physical thickness of 40.67 nm, a second layer of $SiO_2$ having a physical thickness of 83.25 nm, a third layer of $Nb_2O_5$ having a physical thickness of 53.29 nm, a third layer of $SiO_2$ having a physical thickness of 96.76 nm, a fourth layer of $Nb_2O_5$ having a physical thickness of 64.55 nm, a fourth layer of $SiO_2$ having a physical thickness of 135.11 nm, a fifth layer of $Nb_2O_5$ having a physical thickness of 82.21 nm, a fifth layer of $SiO_2$ having a physical thickness of 68.21 nm, and a layer of ITO having a physical thickness of 120 nm.

Figure 42:
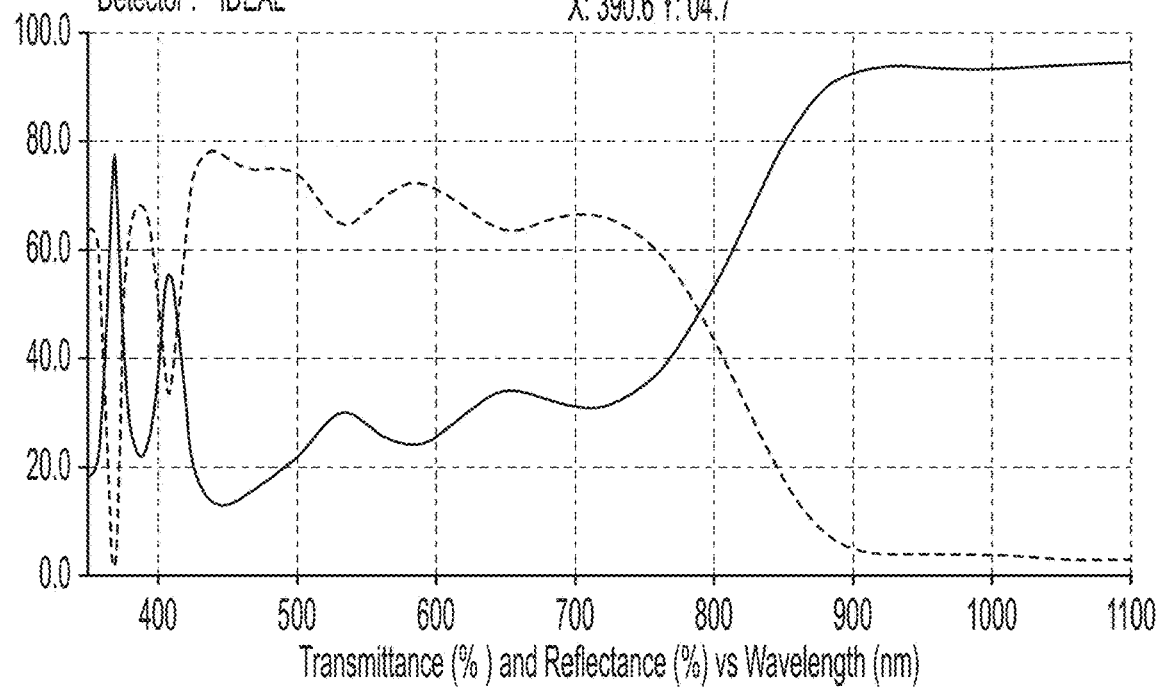
FIGS. 42 and 43 show transmittance and color of the visible-light transmitting/visible-light reflecting/near-IR light transmitting transflective mirror reflective element of FIG. 40.
Figure 43:
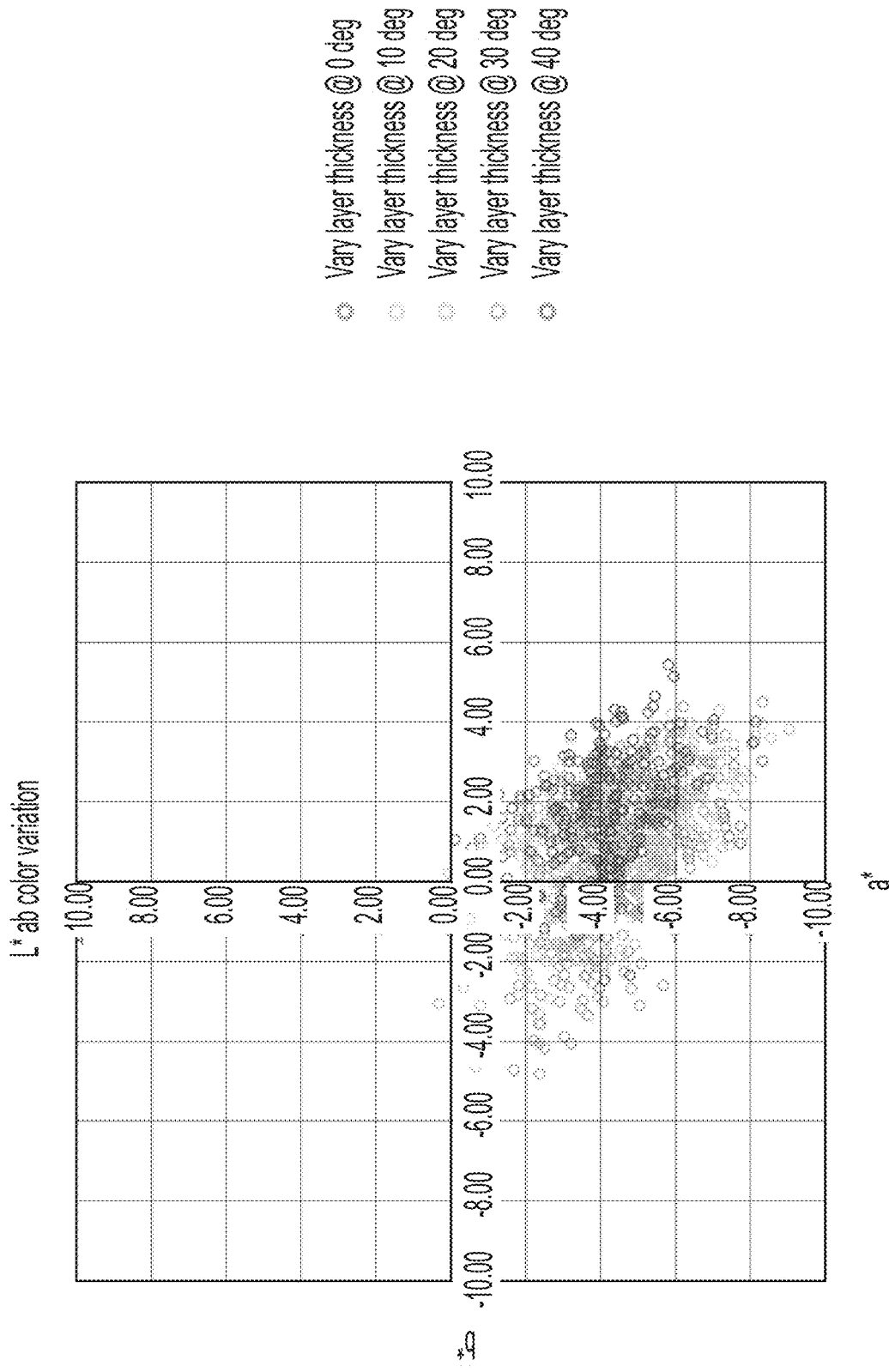
Figure 44A:
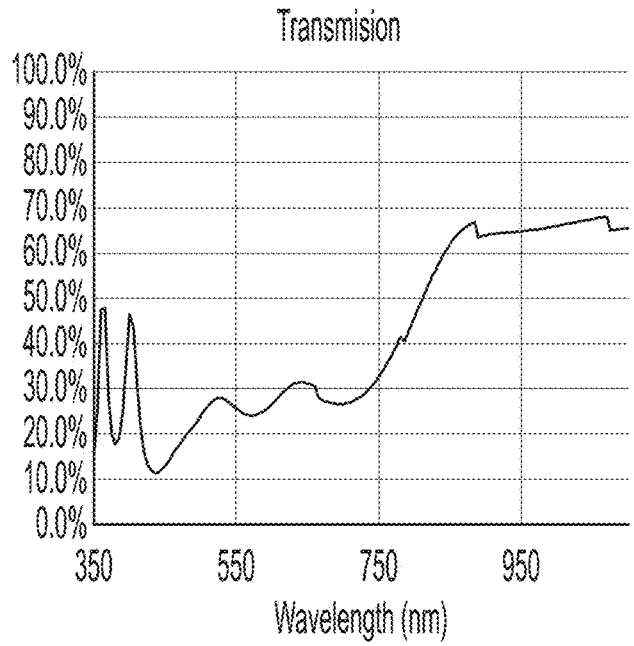
FIGS. 44A-D show transmission and reflection properties of the mirror reflective element having the transflector of FIG. 40.
Figure 44B:
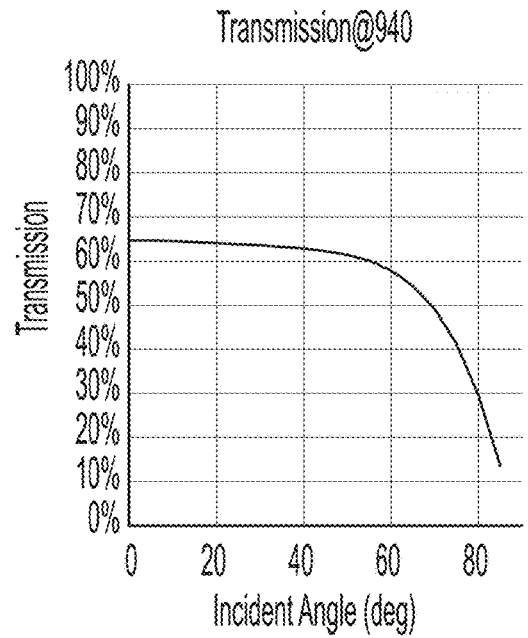
Figure 44C:
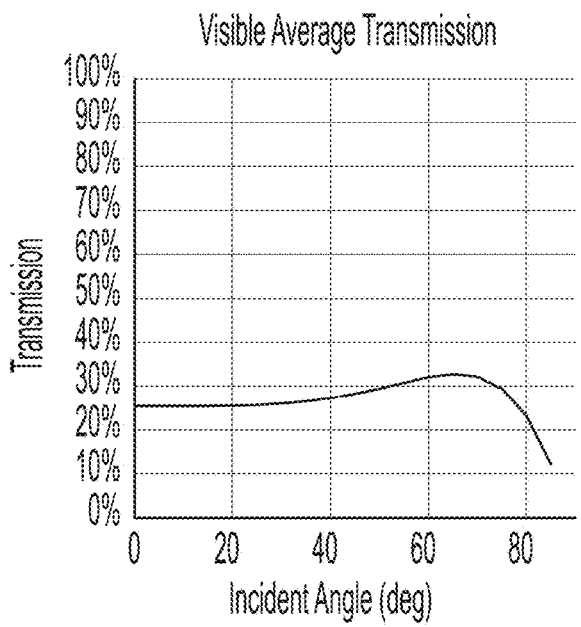
Figure 44D:
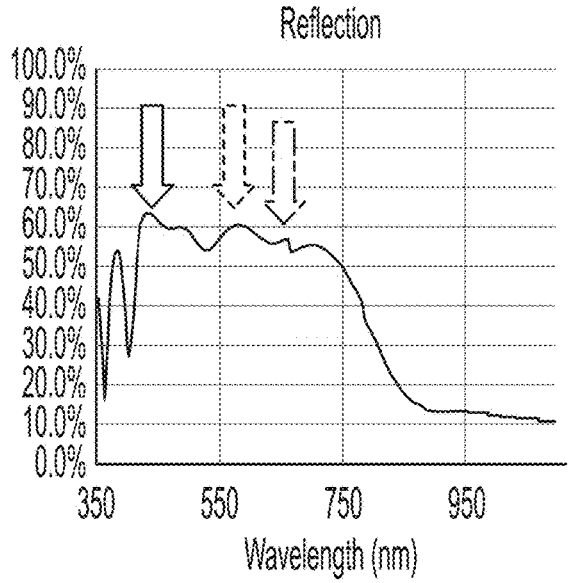

The transmittance properties and color plot of the transflector are shown in FIGS. 42 and 43, respectively). The transmission of light passing through the mirror reflective element of FIG. 40 is plotted (vs. wavelength of light) in FIG. 44A. FIG. 44B shows the transmission of light having a wavelength of 940 nm vs incident angle, while FIG. 44C shows the transmission of visible light vs incident angle. The reflection of light (vs wavelength) for the mirror reflective element of FIG. 40 is shown in FIG. 44D. The substrate upon which the transflector stack is coated is a vehicular interior mirror-shaped planar soda-lime glass substrate of 2 millimeters plate thickness. For use as the rear substrate in a laminate-type EC cell (such as is disclosed in U.S. Pat. Nos. 7,274,501; 7,184,190 and/or 7,255,451, which are hereby incorporated herein by reference in their entireties), and to reduce overall assembly weight, a thinner glass substrate is preferred. For example, a glass substrate of plate thickness 1.6 mm or less is more preferred and a glass substrate of plate thickness 1.1 mm or less is most preferred. Also, use of low-iron glass (as discussed herein) is preferred in order to increase both overall visible light transmission and near-IR (such as at 940 nm) light transmission. For example, Guardian UltraClear® Low-Iron Glass (available from Guardian Glass Company, 2300 Harmon Rd, Auburn Hills, MI, USA) is clearer and is more color neutral than standard soda-lime float glass, and is available in plate thicknesses from 2 mm to 12 mm. Also, Guardian Extra-Clear® low-iron glass (available from Guardian Glass 19, rue du Puits Romain L-8070 Bertrange Grande-Duchy de Luxembourg) can be used. Also, Corning Infra-Red Transmitting Glass 9754 can be used, preferably in conjunction with use of an IR cut-off filter that cuts off transmission through the glass substrate of IR radiation above 1 micron wavelength.

Photopic visible light reflectivity (measured first-surface in accordance with SAE J964a which is the SAE Recommended Practice for determining total and specular reflectance for vehicular mirrors with flat and curved surfaces and for determining diffuse reflectance and haze for mirrors with a flat surface) for a transflector-coated glass substrate (such as the embodiment that is shown in FIG. 40) preferably is at least 45% R, more preferably is at least 55% R and most preferably is at least 65% R. Visible light transmission for a transflector-coated glass substrate preferably is at least 15% T, more preferably is at least 20% T and most preferably is at least 25% T, and preferably is less than 35% T, more preferably less than 30% T [measured using CIE Standard Illuminant D65 and a photopic detector having a spectral response that follows the CIE photopic luminous efficiency function (which mimics the human eye's response in the visible region)]. Near-IR transmission at the near-IR emission peak wavelength (such as 940 nm) of a near-IR emitting light source for a transflector-coated glass substrate (such as the embodiment that is shown in FIG. 40) preferably is at least 60% T, more preferably is at least 70% T and most preferably is at least 80% T.

One-Box Electrochromic Interior DMS Mirror Assembly preferably comprises a two-substrate laminate-type EC mirror reflective element that has (i) a front glass planar substrate (with a first surface and a second surface that is separated from the first surface by a thickness dimension of the front glass substrate) and (ii) a rear glass planar substrate (with a third surface and a fourth surface that is separated from the third surface by a thickness dimension of the rear glass substrate). In the One-Box Electrochromic Interior DMS Mirror Assembly, the rear substrate comprises the transflective mirror substrate of FIG. 40, and the multi-layer stack of coatings comprises the third surface of the rear substrate of the two-substrate laminate-type EC mirror reflective element (a.k.a. an "EC Cell"). The front and rear substrates are juxtaposed in the EC Cell, and an electrochromic medium is sandwiched between (a) the second surface (that comprises a transparent electrically conductive coating, preferably of ITO, with a sheet resistance less than 30 ohms/square preferably, more preferably less than 25 ohms/square and most preferably less than 20 ohms/square) of the front glass substrate and (b) the multi-layer stack transflector-coated surface of the rear glass substrate. The electrochromic medium (i) contacts the transparent electrically conductive coating at the second surface of the front substrate and (ii) contacts the outermost layer of the multi-layer stack transflector-coated third surface of the rear glass substrate. So that electrically conductive contact to the EC medium can be made, the outermost layer of the multi-layer stack transflector-coated third surface of the rear glass substrate comprises a transparent electrically conductive coating (preferably a layer of indium tin oxide; i.e., ITO) with a sheet resistance less than 30 ohms/square preferably, more preferably less than 25 ohms/square and most preferably less than 20 ohms/square.

Note that in the likes of the alternating multi-layer stack of FIG. 40, and depending on other factors in the overall construction, fewer, more or different layers can be used. For example, a third surface conductive transflector of the One-Box Electrochromic Interior DMS Mirror Assembly is shown. This approach incorporates a single semimetal/semiconducting layer of Silicon (Si) and has a high T % (around 90%) at 940 nm and around 40% in the visible region. In addition, the visual appearance is neutral. The advantage of this design is that is reduces the number of layers and reduces total stack thickness. For the multi-layer stack of thin film coatings that forms the mirror transflector of an interior mirror reflective element suitable for use for a One-Box DMS Interior Rearview Mirror Assembly, total physical stack thickness (i.e., the sum of the physical thickness of all of the individual thin film coating layers of the multi-layer stack) preferably is less than 1,500 nm, more preferably is less than 1,000 nm, and most preferably is less than 750 nm. This makes the DMS stack easier and less expensive to manufacture. Of course, use of a Si semiconductor layer can be contemplated for more than one layer in the multi-layer stack.

The mirror transflector may include a silicon layer due to the high index of refraction (3.5 to 4) of Silicon (but its extinction coefficient is higher than for dielectrics such as NbO or $TiO_2$ or $SiO_2$). Optionally, the mirror transflector could use a layer of Germanium. The layers alternate a high index of refraction layer with a lower index of refraction layer to achieve the best match of transmittance and reflectance. The number of layers is reduced by using a layer of high index silicon or germanium. The layers have different refractive indices, and the amount of such difference relates to how many layers may be required to achieve the desired effect. Larger index differences between layers can lead to requiring less layers. The mirror transflector may use Niobium oxide instead of Titanium oxide because the sputter deposition rate for $NbO/Nb_2O_5$ is faster than the sputter deposition rate for $TiO_2$.

The layers are sputter deposited onto the substrate used in the mirror reflective element using pressed oxide ceramic targets. The targets preferably are rotary targets (magnetron). In the vacuum chamber where the layers are deposited, the chamber may include a mixture of Oxygen and Argon. The layers preferably are sputtered via medium frequency (about 40 KHz) sputtering (MF sputtering). Twin rotary magnetrons preferably are used, with two targets side-by-side. A 40 KHz sine wave alternating voltage (positive and negative) is applied. The process may use two (or more) twin-targets per chamber. Silicon may be sputter deposited using a pure Silicon target.

The target optical design for the multi-layer stack is to have transmissivity of at least 20% T for visible light and at least 60% T for near-IR light, and to achieve this in the most economical and effective way. The number of layers and refractivity of layers and sputter rate of layers are balanced to economically achieve the desired effect. The process may utilize aspects of the processes described in U.S. Pat. No. 5,751,489, which is hereby incorporated herein by reference in its entirety.

Mid-frequency AC Sputtering (such as at 40 KHz) in a multi-station/multi-target in-line conveyorized-traylpallet vacuum deposition process is a preferred deposition technology for the dielectric High Index/Low Index film alternating coating layers that make up the multi-layer stack forming the mirror transflector of the mirror reflective element of the One-Box OMS Interior Rearview Mirror Assembly. Mid-frequency AC Sputtering (a.k.a. Medium AC Sputtering) is preferred over RF Sputtering for coating dielectrics because it operates in the kHz rather than MHz range and thus requires less sophisticated and less expensive power sources and is a process that is adaptable to large scale applications. MF or Mid-frequency AC power supplies cover a wide range of voltage outputs between 300 V to 1200 V—generally in the 25 to 300 kW range—at frequencies between 20 to 70 kHz with 40 kHz used most commonly. For forming likes of the Niobium Oxide or Silicon Dioxide layers of the multi-layer transflector, reactive sputtering preferably is used where a reactive gas (oxygen) is introduced into the plasma to form an oxide layer deposited onto the substrate being coated. In Mid-frequency AC Sputtering, two cathodes are used with an AC current switched back and forth between them which cleans the target surface with each reversal to reduce the charge build up on dielectrics that leads to arcing which can spew droplets into the plasma and prevent uniform thin film growth.

As the substrates are moved past the targets, the targets sputter deposit the materials onto the moving substrates. A carrier moving continuously at 1 meter/min under a sputtering target would deposit a film thickness of 25 nm. For ITO: NDDR is (10 nm·m/min)/(KW/m) with about 10 KW/m of target length maximum power density. Generally, for a constant deposition power level and dimensions, the rate of deposition of NbO is around 2.5 times greater than for likes of $SiO_2$ or $TiO_2$. Generally, for a constant deposition power level and dimensions, the rate of deposition of ITO is around 2 times greater than for $NbO/Nb_2O_5$ and is around 5 times greater than for likes of $SiO_2$ or $TiO_2$.

Combined with arc detection and suppression circuitry, MF or Mid-frequency AC Sputtering offers the advantages of improving process stability and increasing deposition rates as well as overcoming a problem faced when trying to reactively sputter a dielectric coating with DC sputtering in that the anode can become coated with an insulating coating. In the case of AC sputtering, the cathodes act as an anode every half cycle and provide a "clean" anode surface. Mid-frequency AC Sputtering for the multi-layer HI/LO index coatings for the mirror transflector of the mirror reflective element of the One-Box DIMS Interior Rearview Mirror Assembly preferably employs dual magnetrons to confine the electrons above the target and reduce arcing for process control. Optionally, either "Balanced" or "Unbalanced" magnetrons can be arranged side by side, tilted towards each other, or face to face.

As an alternative to in-line vacuum deposition, deposition of the various thin film dielectric coatings to form the multi-layer HL-stack mirror transflector can be deposited onto glass substrates in a batch vacuum deposition chamber. For example, a plurality of individual cut mirror-shaped glass substrates can be loaded into a planetary fixture in a vacuum deposition chamber. For deposition of, for example, Niobium Oxide and Silicon Oxide layers, a cylindrical vacuum chamber can be equipped with two (one for NbO and one for $SiO_2$) twin Mid-Frequency AC Sputtering deposition targets that sputter the respective layers onto the glass substrates as the glass substrates are rotated past the sputtering targets in the vacuum chamber, such rotation enhancing uniformity of coating onto the plurality of substrates being coated. Alternatively, electron beam evaporation can be used with an electron beam evaporating the likes of Niobium Oxide and Silicon Oxide/Dioxide from individual crucibles in a multiple-crucible turret.

Optionally, the mirror reflective element may comprise a double laminate electrochromic mirror element or construction having a first glass substrate and a second glass substrate with a first electrochromic medium disposed therebetween, and a second electro-optic medium (e.g., an electrochromic medium, such as a solid polymer matrix or SPM) and a third glass substrate behind the second or rear glass substrate. The cold mirror coating visible reflection can be relaxed from the current 60%-67% reflectivity to more like 45% Reflection of visible light because the SPM can block more visible light with reduced effect on near-IR light. The second or rear SPM can be left dark and only cleared or undimmed when visible camera images are needed, which hides the camera behind the glass but allows it to be visible if and when desired. This system has advantages over using a liquid crystal shutter in the transmission of near-IR light. A higher percent of near-IR light can pass through SPM. Also, the range of transmission control for visible light is a much larger range and goes to clear. The LC shutter transmission for near-IR light is about 85% and the visible light range control is from 0% to 25% T. SPM near-IR light transmission is about 100% when clear, about 90% when dark, and SPM visible light transmission is about 100% when clear and about 30% when dark. Thus, the mirror reflective element thus may comprise glass-ITO-SPM-ITO-stack~R45%-glass-ITO-SPM-ITO-glass.

Therefore, a vehicular driver monitoring system includes a vehicular interior rearview mirror assembly comprising a mirror head adjustably attached at a mounting base, the mounting base configured to attach at an interior portion of a vehicle. The mirror head comprises a mirror reflective element. A driver monitoring camera is accommodated by the mirror head, and the driver monitoring camera moves in tandem with the mirror head when, with the mounting base attached at the interior portion of the vehicle, the mirror head is adjusted relative to the mounting base to adjust a driver's rearward view. A near infrared light emitter is accommodated by the mirror head, and the near infrared light emitter moves in tandem with the mirror head when, with the mounting base attached at the interior portion of the vehicle, the mirror head is adjusted relative to the mounting base to adjust the driver's rearward view. The near infrared light emitter comprises at least a first light emitting element and a second light emitting element. The first light emitting element is oriented at the mirror head so that a beam of light emitted by the first light emitting element would be directed toward a driver's region of a left hand drive vehicle if the vehicular interior rearview mirror assembly were installed in the left hand drive vehicle and adjusted to provide the driver of the left hand drive vehicle a rearward view. The second light emitting element is oriented at the mirror head so that a beam of light emitted by the second light emitting element would be directed toward a driver's region of a right hand drive vehicle if the vehicular interior rearview mirror assembly were installed in the right hand drive vehicle and adjusted to provide the driver of the right hand drive vehicle a rearward view. Control circuitry is operable to enable the first light emitting element or the second light emitting element responsive to indication that the vehicular interior rearview mirror assembly is installed or will be installed in a left hand drive vehicle or a right hand drive vehicle.

The control circuitry may comprise a processor operable to process image data captured by the driver monitoring camera, and, with the mounting base attached at the interior portion of the left hand drive vehicle or the right hand drive vehicle, the processor processes image data captured by the driver monitoring camera to determine at least one selected from the group consisting of (i) driver attentiveness, (ii) driver drowsiness and (iii) driver gaze direction.

The driver monitoring camera and the near infrared light emitter are accommodated by the mirror head behind the mirror reflective element, and the driver monitoring camera views through the mirror reflective element and the near infrared light emitter emits near infrared light through the mirror reflective element.

The driver monitoring camera views through a transflective mirror reflector of the mirror reflective element, and the near infrared light emitter emits near infrared light that passes through the transflective mirror reflector of the mirror reflective element.

The near infrared light emitter may comprise at least one wider beam light emitting element, and the at least one wider beam light emitting element is activated when the driver monitoring camera captures image data for an occupant monitoring function. The first light emitting element is angled relative to the at least one wider beam light emitting element toward a left side of the vehicular interior rearview mirror assembly, and the second light emitting element is angled relative to the at least one wider beam light emitting element toward a right side of the vehicular interior rearview mirror assembly. The first light emitting element may be disposed at the left side of the at least one wider beam light emitting element, and the second light emitting element may be disposed at the right side of the at least one wider beam light emitting element. The first light emitting element may comprise at least two narrower beam light emitting diodes, and the second light emitting element may comprise at least two narrower beam light emitting diodes, and the narrower beam light emitting diodes emit a narrower beam of light, when energized, as compared to the beam of light emitted by the at least one wider beam light emitting element when energized.

The control circuitry may enable the first light emitting element responsive to indication that the vehicular interior rearview mirror assembly is installed in a left hand drive vehicle. The control circuitry may enable the first light emitting element responsive to indication that the vehicular interior rearview mirror assembly will be installed in a left hand drive vehicle.

The control circuitry may enable the second light emitting element responsive to indication that the vehicular interior rearview mirror assembly is installed in a right hand drive vehicle. The control circuitry may enable the second light emitting element responsive to indication that the vehicular interior rearview mirror assembly will be installed in a right hand drive vehicle.

The control circuitry enables the first light emitting element or the second light emitting element responsive to an input signal at a vehicle assembly plant where the vehicle is assembled.

The mirror reflective element is attached at a mirror attachment plate, and the driver monitoring camera and the near infrared light emitter are disposed behind the mirror attachment plate and are aligned with respective apertures through the mirror attachment plate. A heat dissipating element may be attached at the mirror attachment plate. The mirror attachment plate and the heat dissipating element may encase the driver monitoring camera, the near infrared light emitter, and the control circuitry and function to limit electromagnetic interference of the driver monitoring camera, the near infrared light emitter, and the control circuitry.

With the vehicular interior rearview mirror assembly installed in a left hand drive vehicle (so that the first near infrared light emitter is enabled for the driver monitoring function), and when the driver monitoring camera captures image data for the driver monitoring function, the first near infrared light emitter is electrically powered to emit light and the second near infrared light emitter is not electrically powered to emit light. With the vehicular interior rearview mirror assembly installed in the left hand drive vehicle, and when the driver monitoring camera captures image data for an occupant monitoring function, the second near infrared light emitter is electrically powered to emit light, and the first near infrared light emitter may not be electrically powered to emit light.

With the vehicular interior rearview mirror assembly installed in a right hand drive vehicle (so that the second near infrared light emitter is enabled for the driver monitoring function), and when the driver monitoring camera captures image data for the driver monitoring function, the second near infrared light emitter is electrically powered to emit light and the first near infrared light emitter is not electrically powered to emit light. With the vehicular interior rearview mirror assembly installed in the right hand drive vehicle, and when the driver monitoring camera captures image data for an occupant monitoring function, the first near infrared light emitter is electrically powered to emit light, and the second near infrared light emitter may not be electrically powered to emit light.

Therefore, a vehicular driver monitoring system comprises a vehicular interior rearview mirror assembly comprising a mirror head adjustably attached at a mounting base, the mounting base configured to attach at an interior portion of a vehicle equipped with the vehicular driver monitoring system. The mirror head comprises a mirror reflective element. The mirror head accommodates electronic circuitry. A driver monitoring camera is accommodated by the mirror head, and the driver monitoring camera moves in tandem with the mirror head when, with the mounting base attached at the interior portion of the vehicle, the mirror head is adjusted relative to the mounting base to adjust a rearward view of a driver of the vehicle. A first near infrared light emitter and a second near infrared light emitter are accommodated within the mirror head. The first and second near infrared light emitters move in tandem with the mirror head when, with the mounting base attached at the interior portion of the vehicle, the mirror head is adjusted relative to the mounting base to adjust the driver's rearward view. The first near infrared light emitter is accommodated within the mirror head so that a beam of light emitted by the first near infrared light emitter is directed toward a driver's region of a left hand drive vehicle when the vehicular interior rearview mirror assembly is installed in the left hand drive vehicle and is adjusted by the driver of the vehicle to set the driver's rearward view. The second near infrared light emitter is accommodated within the mirror head so that a beam of light emitted by the second near infrared light emitter, when electrically powered to emit light, is directed toward a driver's region of a right hand drive vehicle when the vehicular interior rearview mirror assembly is installed in the right hand drive vehicle and is adjusted by the driver of the vehicle to set the driver's rearward view. When the vehicular interior rearview mirror assembly is installed or will be installed in a left hand drive vehicle, the first near infrared light emitter, when electrically powered to emit light, emits light for a driver monitoring function. When the vehicular interior rearview mirror assembly is installed or will be installed in a right hand drive vehicle, the second near infrared light emitter, when electrically powered to emit light, emits light for the driver monitoring function.

The electronic circuitry may comprise a processor operable to process image data captured by the driver monitoring camera, and wherein, with the mounting base attached at the interior portion of the left hand drive vehicle or the right hand drive vehicle, the processor processes image data captured by the driver monitoring camera to determine at least one selected from the group consisting of (i) driver attentiveness, (ii) driver drowsiness and (iii) driver gaze direction.

The driver monitoring camera and the first and second near infrared light emitters are accommodated by the mirror head behind the mirror reflective element, and the driver monitoring camera views through the mirror reflective element and the first and second near infrared light emitters, when electrically powered to emit light, emit near infrared light through the mirror reflective element. The driver monitoring camera may view through a transflective mirror reflector of the mirror reflective element, and the first and second near infrared light emitters, when electrically powered to emit light, emit near infrared light that may pass through the transflective mirror reflector of the mirror reflective element.

The mirror reflective element may comprise an electrochromic mirror reflective element having a front planar glass substrate and a rear planar glass substrate. The front planar glass substrate comprises a first planar glass surface separated from a second planar glass surface by a plate thickness dimension of the front planar glass substrate, and the rear planar glass substrate comprises a third planar glass surface separated from a fourth planar glass surface by a plate thickness dimension of the rear planar glass substrate. The second planar glass surface of the front planar glass substrate has a transparent electrically conductive coating disposed thereat, and the third planar glass surface of the rear planar glass substrate has the transflective mirror reflector disposed thereat. An electrochromic medium is disposed between and contacts the transparent electrically conductive coating disposed at the second planar glass surface of the front planar glass substrate and the transflective mirror reflector disposed at the third planar glass surface of the rear planar glass substrate.

The transflective mirror reflector may comprise alternating thin film layers of $Nb_2O_5$ and $SiO_2$. The transflective mirror reflector may comprise no more than five layers of $Nb_2O_5$ and five layers of $SiO_2$. The transflective mirror reflector may comprise a first layer of $Nb_2O_5$ having a physical thickness of 37.62 nm, a first layer of $SiO_2$ having a physical thickness of 77.41 nm, a second layer of $Nb_2O_5$ having a physical thickness of 40.67 nm, a second layer of $SiO_2$ having a physical thickness of 83.25 nm, a third layer of $Nb_2O_5$ having a physical thickness of 53.29 nm, a third layer of $SiO_2$ having a physical thickness of 96.76 nm, a fourth layer of $Nb_2O_5$ having a physical thickness of 64.55 nm, a fourth layer of $SiO_2$ having a physical thickness of 135.11 nm, a fifth layer of $Nb_2O_5$ having a physical thickness of 82.21 nm, a fifth layer of $SiO_2$ having a physical thickness of 68.21 nm, and a layer of ITO having a physical thickness of 120 nm.

The mirror reflective element may comprise a prismatic mirror reflective element, and the prismatic mirror reflective element comprises a glass substrate, which has a wedge-shaped cross-section having a first planar glass surface separated from a second planar glass surface, and the plane of first planar glass surface slopes at an angle relative to the plane of the second planar glass surface. The second planar glass surface is an uncoated glass surface, and the transflective mirror reflector is disposed at the second planar glass surface of the glass substrate of the prismatic mirror reflective element.

The mirror head may comprise a stray light blocking element disposed between a lens of the driver monitoring camera and the mirror reflective element. The stray light blocking element circumscribes the lens and engages a rear surface of the mirror reflective element to block stray light from entering the lens. The stray light blocking element may comprise a cone-shaped element attached to the driver monitoring camera. The stray light blocking element may comprise a flexible cone-shaped element attached to the driver monitoring camera.

With the mounting base attached at the interior portion of the left hand drive vehicle or the right hand drive vehicle, the driver monitoring camera and the first and second near infrared light emitters may be disposed at a lower region of the mirror head and below the mirror reflective element.

The vehicular driver monitoring system may comprise at least one wider beam near infrared light emitter accommodated within the mirror head. The at least one wider beam near infrared light emitter is electrically powered to emit light when the driver monitoring camera captures image data for an occupant monitoring function.

The first near infrared light emitter may be angled relative to the at least one wider beam near infrared light emitter toward a left side of the vehicular interior rearview mirror assembly, and the second near infrared light emitter may be angled relative to the at least one wider beam near infrared light emitter toward a right side of the vehicular interior rearview mirror assembly. The first near infrared light emitter may be disposed at the left side of the at least one wider beam near infrared light emitter, and the second near infrared light emitter may be disposed at the right side of the at least one wider beam near infrared light emitter.

The first near infrared light emitter may comprise at least two narrower beam light emitting diodes, and the second near infrared light emitter may comprise at least two narrower beam light emitting diodes. The narrower beam light emitting diodes may emit a narrower beam of light, when electrically powered to emit light, as compared to the beam of light emitted by the at least one wider beam near infrared light emitter when electrically powered to emit light.

With the vehicular interior rearview mirror assembly installed in a left hand drive vehicle, and when the driver monitoring camera captures image data for the driver monitoring function, the first near infrared light emitter is electrically powered to emit light and the second near infrared light emitter is not electrically powered to emit light. With the vehicular interior rearview mirror assembly installed in the left hand drive vehicle, and when the driver monitoring camera captures image data for the driver monitoring function, the at least one wider beam near infrared light emitter may be electrically powered to emit light. With the vehicular interior rearview mirror assembly installed in the left hand drive vehicle, and when the driver monitoring camera captures image data for the driver monitoring function, the at least one wider beam near infrared light emitter may not be electrically powered to emit light. With the vehicular interior rearview mirror assembly installed in the left hand drive vehicle, and when the driver monitoring camera captures image data for the occupant monitoring function, the second near infrared light emitter and the at least one wider beam near infrared light emitter may be electrically powered to emit light. With the vehicular interior rearview mirror assembly installed in the left hand drive vehicle, and when the driver monitoring camera captures image data for the occupant monitoring function, the first near infrared light emitter may also electrically powered to emit light.

With the vehicular interior rearview mirror assembly installed in a right hand drive vehicle, and when the driver monitoring camera captures image data for the driver monitoring function, the second near infrared light emitter is electrically powered to emit light and the first near infrared light emitter is not electrically powered to emit light. With the vehicular interior rearview mirror assembly installed in the right hand drive vehicle, and when the driver monitoring camera captures image data for the driver monitoring function, the at least one wider beam near infrared light emitter may be electrically powered to emit light. With the vehicular interior rearview mirror assembly installed in the right hand drive vehicle, and when the driver monitoring camera captures image data for the driver monitoring function, the at least one wider beam near infrared light emitter may not be electrically powered to emit light. With the vehicular interior rearview mirror assembly installed in the right hand drive vehicle, and when the driver monitoring camera captures image data for the occupant monitoring function, the first near infrared light emitter and the at least one wider beam near infrared light emitter may be electrically powered to emit light. With the vehicular interior rearview mirror assembly installed in the right hand drive vehicle, and when the driver monitoring camera captures image data for the occupant monitoring function, the second near infrared light emitter may also electrically powered to emit light.

The electronic circuitry may enable the first near infrared light emitter for the driver monitoring function responsive to indication that the vehicular interior rearview mirror assembly is installed in or will be installed in a left hand drive vehicle, and the electronic circuitry may enable the second near infrared light emitter for the driver monitoring function responsive to indication that the vehicular interior rearview mirror assembly is installed in or will be installed in a right hand drive vehicle.

The electronic circuitry may enable the first near infrared light emitter for the driver monitoring function responsive to the indication indicating that the vehicular interior rearview mirror assembly is installed in a left hand drive vehicle. The indication may comprise an input provided to the electronic circuitry at a vehicle manufacturing facility where the vehicular interior rearview mirror assembly is installed in the left hand drive vehicle.

The electronic circuitry may enable the first near infrared light emitter for the driver monitoring function responsive to the indication indicating that the vehicular interior rearview mirror assembly will be installed in a left hand drive vehicle. The indication may comprise an input provided to the electronic circuitry at a mirror manufacturing facility where the vehicular interior rearview mirror assembly is assembled.

The electronic circuitry may enable the second near infrared light emitter for the driver monitoring function responsive to indication that the vehicular interior rearview mirror assembly is installed in a right hand drive vehicle. The indication may comprise an input provided to the electronic circuitry at a vehicle manufacturing facility where the vehicular interior rearview mirror assembly is installed in the right hand drive vehicle.

The electronic circuitry may enable the second near infrared light emitter for the driver monitoring function responsive to indication that the vehicular interior rearview mirror assembly will be installed in a right hand drive vehicle. The indication may comprise an input provided to the electronic circuitry at a mirror manufacturing facility where the vehicular interior rearview mirror assembly is manufactured.

The electronic circuitry may set the first near infrared light emitter or the second near infrared light emitter for the driver monitoring function responsive to an input signal at a vehicle assembly plant where the vehicular interior rearview mirror assembly is installed at the vehicle. The electronic circuitry may set the first near infrared light emitter or the second near infrared light emitter for the driver monitoring function responsive to an input signal at a mirror manufacturer assembly plant where the vehicular interior rearview mirror assembly is manufactured.

The interior portion of the vehicle may comprise a portion of a windshield of the vehicle at an in-cabin side of the windshield of the vehicle.

The vehicular driver monitoring system may comprise an occupant monitoring camera disposed at a display screen located at an A-pillar at a passenger side of the vehicle.

The mirror reflective element is attached at a mirror attachment plate, and the driver monitoring camera and the first and second near infrared light emitters may be disposed behind the mirror attachment plate and are aligned with respective apertures through the mirror attachment plate. The vehicular driver monitoring system may comprise a heat dissipating element attached at the mirror attachment plate. The mirror attachment plate and the heat dissipating element encase the driver monitoring camera, the first and second near infrared light emitters, and the electronic circuitry and function to limit electromagnetic interference of the driver monitoring camera, the first and second near infrared light emitters, and the electronic circuitry.

Image data captured by the driver monitoring camera may be used, with the mounting base attached at the interior portion of the vehicle, to determine when the driver attempts to use an infotainment system of the vehicle, and, responsive to determination that the driver is attempting use the infotainment system, and responsive to the vehicle being operated by the driver, the infotainment system does not respond to use by the driver of the infotainment system.

Image data captured by the driver monitoring camera may be processed to determine a driver gesture, and responsive to determination of a driver gesture, a garage door opener system of the vehicle is operated. The determined driver gesture may comprise the driver holding up one, two or three fingers.

The vehicular driver monitoring system may comprise a central near infrared light emitter accommodated within the mirror head and disposed between the first near infrared light emitter and the second near infrared light emitter. The first and second near infrared light emitters may be disposed at a right-side region of the mirror head. The first near infrared light emitter may be angled relative to the mirror reflective element with a principal beam axis of light emitted by the first near infrared light emitter being at an angle of greater than 10 degrees and less than 30 degrees relative to a line perpendicular to the mirror reflective element. The first near infrared light emitter may be angled relative to the mirror reflective element with a principal beam axis of light emitted by the first near infrared light emitter being at an angle of greater than 15 degrees and less than 25 degrees relative to a line perpendicular to the mirror reflective element. The second near infrared light emitter may be angled relative to the mirror reflective element with a principal beam axis of light emitted by the second near infrared light emitter being at an angle of greater than 0 degrees and less than 20 degrees relative to a line perpendicular to the mirror reflective element. The second near infrared light emitter may be angled relative to the mirror reflective element with a principal beam axis of light emitted by the second near infrared light emitter being at an angle of greater than 5 degrees and less than 15 degrees relative to a line perpendicular to the mirror reflective element.

The first and second near infrared light emitters may be disposed at a left-side region of the mirror head. The second near infrared light emitter may be angled relative to the mirror reflective element with a principal beam axis of light emitted by the first near infrared light emitter being at an angle of greater than 10 degrees and less than 30 degrees relative to a line perpendicular to the mirror reflective element. The second near infrared light emitter may be angled relative to the mirror reflective element with a principal beam axis of light emitted by the first near infrared light emitter being at an angle of greater than 15 degrees and less than 25 degrees relative to a line perpendicular to the mirror reflective element. The first near infrared light emitter may be angled relative to the mirror reflective element with a principal beam axis of light emitted by the second near infrared light emitter being at an angle of greater than 0 degrees and less than 20 degrees relative to a line perpendicular to the mirror reflective element. The first near infrared light emitter may be angled relative to the mirror reflective element with a principal beam axis of light emitted by the second near infrared light emitter being at an angle of greater than 5 degrees and less than 15 degrees relative to a line perpendicular to the mirror reflective element.

When the vehicular driver monitoring system is operating in a driver monitoring mode, the first near infrared light emitter or the second near infrared light emitter may be operated to emit light toward the driver's region. When the vehicular driver monitoring system is operating in an occupant monitoring mode, the central near infrared light emitter and the second near infrared light emitter may be operated to emit light. Image data captured by the driver monitoring camera for occupant monitoring may be captured when the first near infrared light emitter, the central near infrared light emitter and the second near infrared light emitter are emitting light. Image data captured by the driver monitoring camera for driver monitoring may be captured when the first near infrared light emitter and the central near infrared light emitter are emitting light.

With the vehicular interior rearview mirror assembly installed in the left hand drive vehicle, and when the vehicular driver monitoring system is operating in a driver monitoring mode, the first near infrared light emitter may be pulsed on and off at a first pulse rate. With the vehicular interior rearview mirror assembly installed in the left hand drive vehicle, and when the vehicular driver monitoring system is operating in the driver monitoring mode, the central near infrared light emitter may be pulsed on and off at the first pulse rate. With the vehicular interior rearview mirror assembly installed in the left hand drive vehicle, and when the vehicular driver monitoring system is operating in an occupant monitoring mode, the second near infrared light emitter may be pulsed on and off at a second pulse rate that is different than the first pulse rate. The second pulse rate may be half the first pulse rate. The driver monitoring camera may capture image data at a capture rate that corresponds with the first pulse rate.

With the vehicular interior rearview mirror assembly installed in the right hand drive vehicle, and when the vehicular driver monitoring system is operating in a driver monitoring mode, the second near infrared light emitter may be pulsed on and off at a first pulse rate. With the vehicular interior rearview mirror assembly installed in the right hand drive vehicle, and when the vehicular driver monitoring system is operating in the driver monitoring mode, the central near infrared light emitter may be pulsed on and off at the first pulse rate. With the vehicular interior rearview mirror assembly installed in the right hand drive vehicle, and when the vehicular driver monitoring system is operating in an occupant monitoring mode, the first near infrared light emitter may be pulsed on and off at a second pulse rate that is different than the first pulse rate. The second pulse rate may be half the first pulse rate. The driver monitoring camera may capture image data at a capture rate that corresponds with the first pulse rate.

When the vehicular interior rearview mirror assembly is installed or will be installed in a left hand drive vehicle, the second near infrared light emitter may not be electrically powered to emit light for the driver monitoring function. When the vehicular interior rearview mirror assembly is installed or will be installed in a right hand drive vehicle, the first near infrared light emitter may not be electrically powered to emit light for the driver monitoring function.

With the vehicular interior rearview mirror assembly installed in a left hand drive vehicle, and when the driver monitoring camera captures image data for the driver monitoring function, the first near infrared light emitter may be electrically powered to emit light and the second near infrared light emitter may not be electrically powered to emit light. With the vehicular interior rearview mirror assembly installed in the left hand drive vehicle, and when the driver monitoring camera captures image data for an occupant monitoring function, the second near infrared light emitter may be electrically powered to emit light. With the vehicular interior rearview mirror assembly installed in the right hand drive vehicle, and when the driver monitoring camera captures image data for the occupant monitoring function, the first near infrared light emitter may be electrically powered to emit light.

With the vehicular interior rearview mirror assembly installed in a right hand drive vehicle, and when the driver monitoring camera captures image data for the driver monitoring function, the second near infrared light emitter may be electrically powered to emit light and the first near infrared light emitter may not be electrically powered to emit light. With the vehicular interior rearview mirror assembly installed in the right hand drive vehicle, and when the driver monitoring camera captures image data for an occupant monitoring function, the first near infrared light emitter may be electrically powered to emit light. With the vehicular interior rearview mirror assembly installed in the right hand drive vehicle, and when the driver monitoring camera captures image data for the occupant monitoring function, the second near infrared light emitter may be electrically powered to emit light.

The driver monitoring system, including the cameras and processor, may utilize aspects of the systems described in U.S. Pat. Nos. 10,065,574; 10,017,114; 9,405,120 and/or 7,914,187, and/or U.S. Publication Nos. US-2021-0323473; US-2021-0291739; US-2020-0202151; US-2020-0143560; US-2017-0274906; US-2017-0217367; US-2016-0209647; US-2016-0137126; US-2015-0352953; US-2015-0296135; US-2015-0294169; US-2015-0232030; US-2015-0092042; US-2015-0022664; US-2015-0015710; US-2015-0009010 and/or US-2014-0336876, and/or U.S. patent application Ser. No. 17/650,255, filed Feb. 8, 2022, which published on Aug. 11, 2022 as U.S. Patent Publication No. US-2022-0254132, Ser. No. 17/649,723, filed Feb. 2, 2022, which published on Aug. 4, 2022 as U.S. Patent Publication No. US-2022-0242438, and/or Ser. No. 17/450,721, filed Oct. 13, 2021, now U.S. Pat. No. 11,518,401, and/or U.S. provisional application Ser. No. 63/260,359, filed Aug. 18, 2021, and/or U.S. provisional application Ser. No. 63/201,894, filed May 18, 2021, and/or International PCT Application No. PCT/US2022/070882, filed Mar. 1, 2022, which published on Sep. 9, 2022 as International Publication No. WO 2022187805, which are all hereby incorporated herein by reference in their entireties.

The mirror assembly may include a mirror actuator that positions the mirror head at a predetermined or preselected or determined orientation relative to the driver's head. The mirror assembly and/or mirror actuator may utilize aspects of the mirror systems described in U.S. Pat. Nos. 9,616,815; 7,722,199 and/or 6,698,905, which are hereby incorporated herein by reference in their entireties. The mirror assembly (such as the mounting base) may be mounted at the in-cabin side of the vehicle windshield or the mirror assembly may be located or attached elsewhere at the vehicle, such as at an overhead console or headliner of the vehicle or the like.

Optionally, the interior mirror assembly may comprise a dual-mode interior rearview video mirror that can switch from a traditional reflection mode to a live-video display mode, such as is by utilizing aspects of the mirror assemblies and systems described in U.S. Pat. Nos. 10,442,360; 10,421,404; 10,166,924 and/or 10,046,706, and/or U.S. Publication Nos. US-2021-0162926; US-2021-0155167; US-2020-0377022; US-2019-0258131; US-2019-0146297; US-2019-0118717 and/or US-2017-0355312, which are all hereby incorporated herein by reference in their entireties. The electrically operated actuator may provide the memory setting function and may also operate to adjust the mirror head between the reflection mode and video display mode, such as responsive to a user actuatable input in the vehicle or at the mirror assembly (e.g., a toggle or switch or button at the mirror head).

Optionally, the driver monitoring system may be integrated with a camera monitoring system (CMS) of the vehicle. The integrated vehicle system incorporates multiple inputs, such as from the inward viewing or driver monitoring camera and from the forward or outward viewing camera, as well as from a rearward viewing camera and sideward viewing cameras of the CMS, to provide the driver with unique collision mitigation capabilities based on full vehicle environment and driver awareness state. The image processing and detections and determinations are performed locally within the interior rearview mirror assembly and/or the overhead console region, depending on available space and electrical connections for the particular vehicle application.

The CMS cameras and system may utilize aspects of the systems described in U.S. Publication Nos. US-2021-0245662; US-2021-0162926; US-2021-0155167; US-2018-0134217 and/or US-2014-0285666, and/or International PCT Application No. PCT/US2022/070062, filed Jan. 6, 2022 and published Jul. 14, 2022 as International Publication No. WO 2022/150826, which are hereby incorporated herein by reference in their entireties. The connections between the cameras and the controller or PCB(s) and/or between the displays and the controllers or PCBs may be made via respective coaxial cables, which may provide power and control of the cameras (by the controller) and which may provide image data from the cameras to the controller, and which may provide video images from the controller to the display devices. The connections and communications may utilize aspects of the systems described in U.S. Pat. Nos. 10,264,219; 9,900,490 and/or 9,609,757, which are hereby incorporated herein by reference in their entireties.

The mirror reflective element may comprise a variable reflectance electro-optic mirror reflective element, such as an electrochromic mirror reflective element or a liquid crystal mirror reflective element. For example, the mirror reflective element may comprise a laminate construction variable reflectance electro-optic (such as electrochromic) reflective element assembly having a front glass substrate and a rear glass substrate with an electro-optic medium (such as electrochromic medium) sandwiched therebetween and bounded by a perimeter seal. The front substrate has a front or first surface (the surface that generally faces the driver of a vehicle when the mirror assembly is normally mounted at the vehicle) and a rear or second surface opposite the front surface, and the rear substrate has a front or third surface and a rear or fourth surface opposite the front surface, with the electro-optic medium disposed between the second surface and the third surface and bounded by the perimeter seal of the reflective element (such as is known in the electrochromic mirror art). The second surface has a transparent conductive coating established thereat (such as an indium tin oxide (ITO) layer, or a doped tin oxide layer or any other transparent electrically semi-conductive layer or coating or the like, such as indium cerium oxide (ICO), indium tungsten oxide (IWO), or indium oxide (IO) layers or the like or a zinc oxide layer or coating, or a zinc oxide coating or the like doped with aluminum or other metallic materials, such as silver or gold or the like, or other oxides doped with a suitable metallic material or the like, or such as disclosed in U.S. Pat. No. 7,274,501, which is hereby incorporated herein by reference in its entirety), while the third surface has a metallic reflector coating (or multiple layers or coatings) established thereat. The front or third surface of the rear substrate may include one or more transparent semi-conductive layers (such as an ITO layer or the like), and one or more metallic electrically conductive layers (such as a layer of silver, aluminum, chromium or the like or an alloy thereof), and may include multiple layers such as disclosed in U.S. Pat. Nos. 7,274,501; 7,184,190 and/or 7,255,451, which are hereby incorporated herein by reference in their entireties.

The mirror reflector may comprise any suitable coatings or layers, such as a transflective coating or layer (that is partially transmissive of visible light and/or near infrared light and that is partially reflective of visible light), such as described in U.S. Pat. Nos. 7,626,749; 7,274,501; 7,255,451; 7,195,381; 7,184,190; 6,690,268; 5,140,455; 6,178,034; 6,154,306; 6,002,511; 5,567,360; 5,525,264; 5,610,756; 5,406,414; 5,076,673; 5,073,012; 5,115,346; 5,724,187; 5,668,663; 5,910,854; 5,142,407 and/or 4,712,879, which are hereby incorporated herein by reference in their entireties, disposed at the front surface of the rear substrate (commonly referred to as the third surface of the reflective element) and opposing the electro-optic medium, such as an electrochromic medium disposed between the front and rear substrates and bounded by the perimeter seal. Optionally, the mirror reflector could be disposed at the rear surface of the rear substrate (commonly referred to as the fourth surface of the reflective element). The driver monitoring camera may be accommodated in the mirror head and view through the transflective mirror reflector toward the driver's head region and/or the near IR light emitter may be accommodated in the mirror head and emit light that passes through the transflective mirror reflector to illuminate the driver's head region. The transflective mirror reflector may be spectrally tuned so as to transmit or pass a particular spectral band of light (e.g., near infrared light) while reflecting other spectral bands of light (e.g., visible light). The camera may be sensitive to near infrared light, such that the near IR light emitter can emit near IR light that passes through the transflective mirror reflector and the camera may be sensitive to the near IR light that reflects off of the driver's head and passes back through the transflective mirror reflector.

The third surface defines the active EC area or surface of the rear substrate within the perimeter seal. The coated third surface may also be coated to define a tab-out region (such as by utilizing aspects of the mirror assemblies described in U.S. Pat. Nos. 7,274,501; 7,184,190 and/or 7,255,451, which are hereby incorporated herein by reference in their entireties) for providing electrical connection of the conductive layers to an electrical clip of connector or bus-bar, such as the types described in U.S. Pat. Nos. 5,066,112 and 6,449,082, which are hereby incorporated herein by reference in their entireties.

The reflective element and mirror casing are adjustable relative to a base portion or mounting assembly to adjust the driver's rearward 'view when the mirror assembly is normally mounted at or in the vehicle. The mounting assembly may comprise a single-ball or single-pivot mounting assembly, whereby the reflective element and casing are adjustable relative to the vehicle windshield (or other interior portion of the vehicle) about a single pivot joint, or the mounting assembly may comprise other types of mounting configurations, such as a double-ball or double-pivot mounting configuration or the like. The socket or pivot element is configured to receive a ball member of the base portion, such as for a single pivot or single ball mounting structure or a double pivot or double ball mounting structure or the like (such as a pivot mounting assembly of the types described in U.S. Pat. Nos. 6,318,870; 6,593,565; 6,690,268; 6,540,193; 4,936,533; 5,820,097; 7,249,860; 6,877,709; 6,329,925; 7,289,037; 7,249,860 and/or 6,483,438, which are hereby incorporated herein by reference in their entireties).

The mirror assembly may comprise any suitable construction, such as, for example, a mirror assembly with the reflective element being nested in the mirror casing and with a bezel portion that circumscribes a perimeter region of the front surface of the reflective element, or with the mirror casing having a curved or beveled perimeter edge around the reflective element and with no overlap onto the front surface of the reflective element (such as by utilizing aspects of the mirror assemblies described in U.S. Pat. Nos. 7,184,190; 7,274,501; 7,255,451; 7,289,037; 7,360,932; 7,626,749; 8,049,640; 8,277,059 and/or 8,529,108, which are hereby incorporated herein by reference in their entireties) or such as a mirror assembly having a rear substrate of an electro-optic or electrochromic reflective element nested in the mirror casing, and with the front substrate having curved or beveled perimeter edges, or such as a mirror assembly having a prismatic reflective element that is disposed at an outer perimeter edge of the mirror casing and with the prismatic substrate having curved or beveled perimeter edges, such as described in U.S. Pat. Nos. 8,508,831; 8,730,553; 9,598,016 and/or 9,346,403, and/or U.S. Publication Nos. US-2014-0313563 and/or US-2015-0097955, which are hereby incorporated herein by reference in their entireties (and with electrochromic and prismatic mirrors of such construction are commercially available from the assignee of this application under the trade name INFINITY™ mirror). Optionally, the mirror reflective element may comprise a variable reflectivity liquid crystal (VRLC) reflective element, such as by utilizing aspects of the mirror assemblies described in U.S. provisional application Ser. No. 63/201,891, filed May 18, 2021, which is hereby incorporated herein by reference in its entirety.

Optionally, the mirror casing may include a bezel portion that circumscribes a perimeter region of the front surface of the reflective element, or the perimeter region of the front surface of the reflective element may be exposed (such as by utilizing aspects of the mirror reflective elements described in U.S. Pat. Nos. 8,508,831 and/or 8,730,553, and/or U.S. Publication Nos. US-2014-0022390; US-2014-0293169 and/or US-2015-0097955, which are hereby incorporated herein by reference in their entireties).

Although shown as an electro-optic mirror application, it is envisioned that the mirror assembly may comprise a prismatic reflective element. The prismatic mirror assembly may be mounted or attached at an interior portion of a vehicle (such as at an interior surface of a vehicle windshield) via the mounting means described above, and the reflective element may be toggled or flipped or adjusted between its daytime reflectivity position and its nighttime reflectivity position via any suitable toggle means, such as by utilizing aspects of the mirror assemblies described in U.S. Pat. Nos. 7,420,756; 7,338,177; 7,289,037; 7,274,501; 7,255,451; 7,249,860; 6,318,870; 6,598,980; 5,327,288; 4,948,242; 4,826,289; 4,436,371 and/or 4,435,042, and/or U.S. Publication No. US-2010-0085653, which are hereby incorporated herein by reference in their entireties.

Optionally, the mirror assembly may include one or more other displays, such as the types disclosed in U.S. Pat. Nos. 5,530,240 and/or 6,329,925, which are hereby incorporated herein by reference in their entireties, and/or display-on-demand transflective type displays, and/or video displays or display screens, such as the types disclosed in U.S. Pat. Nos. 8,890,955; 7,855; 755; 7,338,177; 7,274,501; 7,255,451; 7,195,381; 7,184,190; 7,046,448; 5,668,663; 5,724,187; 5,530,240; 6,329,925; 6,690,268; 7,734,392; 7,370,983; 6,902,284; 6,428,172; 6,420,975; 5,416,313; 5,285,060; 5,193,029 and/or 4,793,690, and/or in U.S. Pat. Pub. Nos. US-2006-0050018; US-2009-0015736; US-2009-0015736 and/or US-2010-0097469, which are all hereby incorporated herein by reference in their entireties.

The video display screen may be controlled or operable in response to an input or signal, such as a signal received from one or more cameras or image sensors of the vehicle, such as a video camera or sensor, such as a CMOS imaging array sensor, a CCD sensor or the like, and image processors or image processing techniques, such as utilizing aspects of the cameras and image processors described U.S. Pat. Nos. 5,550,677; 5,760,962; 6,690,268; 6,498,620; 6,396,397; 6,222,447; 6,201,642; 6,097,023; 5,796,094; 5,715,093; 6,922,292; 6,757,109; 6,717,610; 6,590,719; 6,320,176; 6,559,435; 6,831,261; 6,806,452; 6,822,563; 6,946,978; 7,038,577; 7,004,606; 7,720,580; 8,446,470; 8,451,107 and/or 9,126,525, and/or U.S. Pat. Pub. Nos. US-2006-0171704; US-2009-0244361 and/or US-2010-0214791, which are all hereby incorporated herein by reference in their entireties. The imaging sensor or camera may be activated and the display screen may be activated in response to the vehicle shifting into reverse, such that the display screen is viewable by the driver and is displaying an image of the rearward scene while the driver is reversing the vehicle. It is envisioned that the image processor or controller may comprise the likes of an EYEQ™ image processing chip available from Mobileye Vision Technologies Ltd. of Jerusalem, Israel, and processes image data captured by the forward viewing camera and the driver monitoring camera (and optionally surround view cameras and/or CMS cameras of the vehicle).

Changes and modifications in the specifically described embodiments may be carried out without departing from the principles of the present invention, which is intended to be limited only by the scope of the appended claims as interpreted according to the principles of patent law.

The invention claimed is:

1. A vehicular cabin monitoring system, the vehicular cabin monitoring system comprising:
a vehicular interior rearview mirror assembly comprising an interior rearview mirror head adjustably attached at a mounting base, the mounting base configured to attach at an interior portion of a vehicle equipped with the vehicular cabin monitoring system;
wherein the interior rearview mirror head accommodates an interior rearview mirror reflective element;
wherein the interior rearview mirror head accommodates electronic circuitry;
a driver monitoring camera accommodated by the interior rearview mirror head, wherein the interior rearview mirror reflective element and the driver monitoring camera move in tandem with the interior rearview mirror head when, with the mounting base of the vehicular interior rearview mirror assembly attached at the interior portion of the equipped vehicle, the interior rearview mirror head is adjusted by a driver of the equipped vehicle relative to the mounting base to set a rearward view of the interior rearview mirror reflective element for the driver;
wherein the equipped vehicle is one selected from the group consisting of (i) a left hand drive vehicle and (ii) a right hand drive vehicle;
a first near infrared light emitter and a second near infrared light emitter accommodated by the interior rearview mirror head, wherein the first and second near infrared light emitters move in tandem with the interior rearview mirror head when, with the mounting base attached at the interior portion of the equipped vehicle, the interior rearview mirror head is adjusted by the driver of the equipped vehicle relative to the mounting base to set the rearward view of the interior rearview mirror reflective element for the driver of the equipped vehicle;
wherein, when the equipped vehicle comprises a left hand drive vehicle and with the mounting base attached at the interior portion of the equipped left hand drive vehicle, a beam of near infrared light emitted by the first near infrared light emitter, when electrically activated to emit near infrared light, is directed toward a driver-side front seating location of the equipped left hand drive vehicle when the interior rearview mirror head of the vehicular interior rearview mirror assembly is adjusted by the driver of the equipped left hand drive vehicle to set the rearward view of the interior rearview mirror reflective element for the driver of the equipped left hand drive vehicle;
wherein, when the equipped vehicle comprises a right hand drive vehicle and with the mounting base attached at the interior portion of the equipped right hand drive vehicle, a beam of near infrared light emitted by the second near infrared light emitter, when electrically activated to emit near infrared light, is directed toward a driver-side front seating location of the equipped right hand drive vehicle when the interior rearview mirror head of the vehicular interior rearview mirror assembly is adjusted by the driver of the equipped right hand drive vehicle to set the rearward view of the interior rearview mirror reflective element for the driver of the equipped right hand drive vehicle;
a processor operable to process image data captured by the driver monitoring camera;
wherein the processor is operable to process image data captured by the driver monitoring camera at least for a driver monitoring function;
wherein, when the equipped vehicle comprises a left hand drive vehicle and with the mounting base attached at the interior portion of the equipped left hand drive vehicle, the first near infrared light emitter, when electrically activated to emit near infrared light, emits near infrared light for the driver monitoring function;
wherein, when the equipped vehicle comprises a left hand drive vehicle and with the mounting base attached at the interior portion of the equipped left hand drive vehicle, the second near infrared light emitter is pulsed on and off at a pulse rate that is less than a pulse rate of the first near infrared light emitter;
wherein, when the equipped vehicle comprises a right hand drive vehicle and with the mounting base attached at the interior portion of the equipped right hand drive vehicle, the second near infrared light emitter, when electrically activated to emit near infrared light, emits near infrared light for the driver monitoring function;
wherein, when the equipped vehicle comprises a right hand drive vehicle and with the mounting base attached at the interior portion of the equipped right hand drive vehicle, the first near infrared light emitter is pulsed on and off at a pulse rate that is less than a pulse rate of the second near infrared light emitter; and
wherein, with the mounting base of the vehicular interior rearview mirror assembly attached at the interior portion of the equipped vehicle, and via the processor processing image data captured by the driver monitoring camera for the driver monitoring function, at least one selected from the group consisting of (i) driver attentiveness is monitored, (ii) driver drowsiness is monitored and (iii) driver gaze direction is monitored.

2. The vehicular cabin monitoring system of claim 1, wherein the driver monitoring camera is disposed within the interior rearview mirror head at least partially behind the interior rearview mirror reflective element.

3. The vehicular cabin monitoring system of claim 2, wherein the processor operable to process image data captured by the driver monitoring camera processes image data captured by the driver monitoring camera to monitor driver attentiveness.

4. The vehicular cabin monitoring system of claim 2, wherein the processor operable to process image data captured by the driver monitoring camera processes image data captured by the driver monitoring camera to monitor driver drowsiness.

5. The vehicular cabin monitoring system of claim 2, wherein the processor operable to process image data captured by the driver monitoring camera processes image data captured by the driver monitoring camera to monitor driver gaze direction.

6. The vehicular cabin monitoring system of claim 2, wherein the driver monitoring camera views through the interior rearview mirror reflective element.

7. The vehicular cabin monitoring system of claim 6, wherein the first and second near infrared light emitters are disposed within the interior rearview mirror head behind the interior rearview mirror reflective element, and wherein the first near infrared light emitter, when electrically activated to emit near infrared light, emits near infrared light that passes through the interior rearview mirror reflective element, and wherein the second near infrared light emitter, when electrically activated to emit near infrared light, emits near infrared light that passes the interior rearview mirror reflective element.

8. The vehicular cabin monitoring system of claim 6, wherein the driver monitoring camera views through a transflective mirror reflector of the interior rearview mirror reflective element, and wherein the transflective mirror reflector of the interior rearview mirror reflective element transmits near infrared light incident thereon, transmits visible light incident thereon and reflects visible light incident thereon.

9. The vehicular cabin monitoring system of claim 8, wherein the first near infrared light emitter, when electrically activated to emit near infrared light, emits near infrared light that passes through the transflective mirror reflector of the interior rearview mirror reflective element, and wherein the second near infrared light emitter, when electrically activated to emit near infrared light, emits near infrared light that passes through the transflective mirror reflector of the interior rearview mirror reflective element.

10. The vehicular cabin monitoring system of claim 8, wherein the interior rearview mirror reflective element comprises an interior rearview mirror electrochromic reflective element having a front planar glass substrate and a rear planar glass substrate, and wherein the front planar glass substrate comprises a first planar glass surface separated from a second planar glass surface by a plate thickness dimension of the front planar glass substrate, and wherein the rear planar glass substrate comprises a third planar glass surface separated from a fourth planar glass surface by a plate thickness dimension of the rear planar glass substrate, and wherein the second planar glass surface of the front planar glass substrate has a transparent electrically conductive coating disposed thereat, and wherein the third planar glass surface of the rear planar glass substrate has the transflective mirror reflector disposed thereat, and wherein an electrochromic medium is disposed in a space between the front and rear planar glass substrates and contacts the transparent electrically conductive coating disposed at the second planar glass surface of the front planar glass substrate and the transflective mirror reflector disposed at the third planar glass surface of the rear planar glass substrate.

11. The vehicular cabin monitoring system of claim 10, wherein the electronic circuitry accommodated by the interior rearview mirror head comprises the processor operable to process image data captured by the driver monitoring camera at least for the driver monitoring function.

12. The vehicular cabin monitoring system of claim 11, wherein the first near infrared light emitter, when electrically activated to emit near infrared light, emits near infrared light that passes through the transflective mirror reflector of the interior rearview mirror electrochromic reflective element, and wherein the second near infrared light emitter, when electrically activated to emit near infrared light, emits near infrared light that passes through the transflective mirror reflector of the interior rearview mirror electrochromic reflective element.

13. The vehicular cabin monitoring system of claim 8, wherein the transflective mirror reflector comprises alternating thin film layers of $Nb_2O_5$ and $SiO_2$.

14. The vehicular cabin monitoring system of claim 8, wherein the interior rearview mirror reflective element comprises an interior rearview mirror prismatic reflective element, and wherein the interior rearview mirror prismatic reflective element comprises a glass substrate, and wherein the glass substrate has a wedge-shaped cross-section having a first planar glass surface separated from a second planar glass surface by a plate thickness dimension of the glass substrate, and wherein the plane of the first planar glass surface slopes at an angle relative to the plane of the second planar glass surface, and wherein the first planar glass surface is an uncoated glass surface, and wherein the transflective mirror reflector is disposed at the second planar glass surface of the glass substrate of the interior rearview mirror prismatic reflective element.

15. The vehicular cabin monitoring system of claim 14, wherein the first near infrared light emitter, when electrically activated to emit near infrared light, emits near infrared light that passes through the transflective mirror reflector of the interior rearview prismatic mirror reflective element, and wherein the second near infrared light emitter, when electrically activated to emit near infrared light, emits near infrared light that passes through the transflective mirror reflector of the interior rearview mirror prismatic reflective element.

16. The vehicular cabin monitoring system of claim 1, wherein, with the mounting base attached at the interior portion of the equipped vehicle, the first and second near infrared light emitters are disposed at a lower region of the interior rearview mirror head, and wherein near infrared light emitted by the first and second near infrared light emitters, when activated to emit near infrared light, does not pass through the interior rearview mirror reflective element.

17. The vehicular cabin monitoring system of claim 1, comprising a third near infrared light emitter accommodated by the interior rearview mirror head, and wherein the third near infrared light emitter is electrically activated to emit near infrared light when the driver monitoring camera captures image data for an occupant detection function, and wherein the processor operable to process image data captured by the driver monitoring camera is operable to process captured image data for the occupant detection function, and wherein, via processing by the processor for the occupant detection function of image data captured by the driver monitoring camera, an occupant present at a passenger seat region within an interior cabin of the equipped vehicle is detected.

18. The vehicular cabin monitoring system of claim 17, wherein, when the equipped vehicle comprises a left hand drive vehicle and with the mounting base attached at the interior portion of the equipped left hand drive vehicle and when the driver monitoring camera captures image data for the occupant detection function, the first near infrared light emitter is electrically activated to emit near infrared light and the second near infrared light emitter is electrically activated to emit near infrared light and the third near infrared light emitter is electrically activated to emit near infrared light.

19. The vehicular cabin monitoring system of claim 17, wherein the first near infrared light emitter is disposed within the interior rearview mirror head of the interior rearview mirror reflective element to the left of the third near infrared light emitter, and wherein the second near infrared light emitter is disposed within the interior rearview mirror head of the interior rearview mirror reflective element to the right of the third near infrared light emitter.

20. The vehicular cabin monitoring system of claim 19, wherein, when the equipped vehicle comprises a left hand drive vehicle and with the mounting base attached at the interior portion of the equipped left hand drive vehicle, and when the driver monitoring camera captures image data for the driver monitoring function, the first near infrared light emitter is electrically activated to emit near infrared light and the second near infrared light emitter is not electrically activated to emit near infrared light.

21. The vehicular cabin monitoring system of claim 17, wherein the first near infrared light emitter is disposed behind the interior rearview mirror reflective element, and wherein the second near infrared light emitter is disposed behind the interior rearview mirror reflective element, and wherein the third near infrared light emitter is disposed behind the interior rearview mirror reflective element of the vehicular interior rearview mirror assembly at a location between where the first near infrared light emitter is disposed at the vehicular interior rearview mirror assembly and where the second near infrared light emitter is disposed at the vehicular interior rearview mirror assembly.

22. The vehicular cabin monitoring system of claim 21, wherein, when the equipped vehicle comprises a left hand drive vehicle and with the mounting base attached at the interior portion of the equipped left hand drive vehicle, and when the driver monitoring camera captures image data for the driver monitoring function, the first near infrared light emitter is electrically activated to emit near infrared light and the second near infrared light emitter is not electrically activated to emit near infrared light.

23. The vehicular cabin monitoring system of claim 22, wherein, when the equipped vehicle comprises a left hand drive vehicle and with the mounting base attached at the interior portion of the equipped left hand drive vehicle, and when the driver monitoring camera captures image data for the driver monitoring function, the third near infrared light emitter is electrically activated to emit near infrared light.

24. The vehicular cabin monitoring system of claim 21, wherein, when the equipped vehicle comprises a left hand drive vehicle and with the mounting base attached at the interior portion of the equipped left hand drive vehicle, and when the driver monitoring camera captures image data for the occupant detection function, at least the third near infrared light emitter is electrically activated to emit near infrared light.

25. The vehicular cabin monitoring system of claim 24, wherein, when the equipped vehicle comprises a left hand drive vehicle and with the mounting base attached at the interior portion of the equipped left hand drive vehicle and with at least the third near infrared light emitter electrically activated to emit near infrared light for the occupant detection function and with the interior rearview mirror head of the vehicular interior rearview mirror assembly installed in the left hand drive vehicle adjusted by the driver of the equipped left hand drive vehicle to set the rearward view of the interior rearview mirror reflective element for the driver, near infrared irradiance at a passenger-side front seating location is at least 0.15 watts per square meter.

26. The vehicular cabin monitoring system of claim 24, wherein, when the equipped vehicle comprises a left hand drive vehicle and with the mounting base attached at the interior portion of the equipped left hand drive vehicle and with at least the third near infrared light emitter electrically activated to emit near infrared light for the occupant detection function and with the interior rearview mirror head of the vehicular interior rearview mirror assembly installed in the equipped left hand drive vehicle adjusted by the driver of the equipped left hand drive vehicle to set the rearward view of the interior rearview mirror reflective element for the driver, near infrared irradiance at a rear-passenger seating location is at least 0.1 watts per square meter.

27. The vehicular cabin monitoring system of claim 24, wherein the second near infrared light emitter is electrically activated to emit near infrared light and the third near infrared light emitter is electrically activated to emit near infrared light.

28. The vehicular cabin monitoring system of claim 17, wherein, when the equipped vehicle comprises a right hand drive vehicle and with the mounting base attached at the interior portion of the equipped right hand drive vehicle, and when the driver monitoring camera captures image data for the driver monitoring function, the second near infrared light emitter is electrically activated to emit near infrared light and the first near infrared light emitter is not electrically activated to emit near infrared light.

29. The vehicular cabin monitoring system of claim 28, wherein, when the equipped vehicle comprises a right hand drive vehicle and with the mounting base attached at the interior portion of the equipped right hand drive vehicle, and when the driver monitoring camera captures image data for the driver monitoring function, the third near infrared light emitter is electrically activated to emit near infrared light.

30. The vehicular cabin monitoring system of claim 28, wherein, when the equipped vehicle comprises a right hand drive vehicle and with the mounting base attached at the interior portion of the equipped right hand drive vehicle, and when the driver monitoring camera captures image data for the occupant detection function, at least the third near infrared light emitter is electrically activated to emit near infrared light.

31. The vehicular cabin monitoring system of claim 28, wherein, when the driver monitoring camera captures image data for the occupant detection function, the second near infrared light emitter is electrically activated to emit near infrared light and the third near infrared light emitter is electrically activated to emit near infrared light.

32. The vehicular cabin monitoring system of claim 28, wherein, when the equipped vehicle comprises a right hand drive vehicle and with the mounting base attached at the interior portion of the equipped right hand drive vehicle, and when the driver monitoring camera captures image data for the occupant detection function, the first near infrared light emitter is electrically activated to emit near infrared light and the second near infrared light emitter is electrically activated to emit near infrared light and the third near infrared light emitter is electrically activated to emit near infrared light.

33. The vehicular cabin monitoring system of claim 17, wherein, with the mounting base attached at the interior portion of the equipped vehicle, the first near infrared light emitter is disposed behind the interior rearview mirror reflective element at a left side of the vehicular interior rearview mirror assembly, and wherein the second near infrared light emitter is disposed behind the interior rearview mirror reflective element at a right side of the vehicular interior rearview mirror assembly, and wherein the third near infrared light emitter is disposed behind the interior rearview mirror reflective element of the vehicular interior rearview mirror assembly at a location between where the first near infrared light emitter is disposed at the left side of the vehicular interior rearview mirror assembly and where the second near infrared light emitter is disposed at the right side of the vehicular interior rearview mirror assembly.

34. The vehicular cabin monitoring system of claim 17, wherein, with the mounting base attached at the interior portion of the equipped vehicle, the first near infrared light emitter, the second near infrared light emitter and the third near infrared light emitter are disposed behind the interior rearview mirror reflective element at a left side of the vehicular interior rearview mirror assembly, and wherein the third near infrared light emitter is disposed behind the interior rearview mirror reflective element of the vehicular interior rearview mirror assembly at a location between where the first near infrared light emitter is disposed at the vehicular interior rearview mirror assembly and where the second near infrared light emitter is disposed at the vehicular interior rearview mirror assembly, and wherein the first near infrared light emitter is disposed at the left side of the vehicular interior rearview mirror assembly at a location to the left of the location of the third near infrared light emitter.

35. The vehicular cabin monitoring system of claim 17, wherein, with the mounting base attached at the interior portion of the equipped vehicle, the first near infrared light emitter, the second near infrared light emitter and the third near infrared light emitter are disposed behind the interior rearview mirror reflective element at a right side of the vehicular interior rearview mirror assembly, and wherein the third near infrared light emitter is disposed behind the interior rearview mirror reflective element of the vehicular interior rearview mirror assembly at a location between where the first near infrared light emitter is disposed at the vehicular interior rearview mirror assembly and where the second near infrared light emitter is disposed at the vehicular interior rearview mirror assembly, and wherein the first near infrared light emitter is disposed at the right side of the vehicular interior rearview mirror assembly at a location to the left of the location of the third near infrared light emitter.

36. The vehicular cabin monitoring system of claim 1, wherein the interior portion of the equipped vehicle comprises a portion of a windshield of the equipped vehicle at an in-cabin side of the windshield of the equipped vehicle.

37. The vehicular cabin monitoring system of claim 36, wherein the interior rearview mirror reflective element is attached at a mirror attachment plate, and wherein the driver monitoring camera and the first and second near infrared light emitters are disposed behind the mirror attachment plate and are aligned with respective apertures through the mirror attachment plate.

38. The vehicular cabin monitoring system of claim 37, comprising a heat dissipating element at the mirror attachment plate.

39. The vehicular cabin monitoring system of claim 38, wherein the mirror attachment plate and the heat dissipating element limit electromagnetic interference (i) at the driver monitoring camera, (ii) at the first and second near infrared light emitters and (iii) at the electronic circuitry.

40. The vehicular cabin monitoring system of claim 1, wherein the interior rearview mirror reflective element has a front planar side and a rear planar side that is separated from the front planar side by a thickness dimension of the interior rearview mirror reflective element, and wherein the first near infrared light emitter is angled relative to the front planar side of the interior rearview mirror reflective element with a principal beam axis of light emitted by the first near infrared light emitter being at an angle of greater than 10 degrees and less than 30 degrees relative to an axis perpendicular to the front planar side of the interior rearview mirror reflective element.

41. The vehicular cabin monitoring system of claim 40, wherein the second near infrared light emitter is angled relative to the front planar side of the interior rearview mirror reflective element with a principal beam axis of light emitted by the second near infrared light emitter being at an angle of greater than 5 degrees and less than 15 degrees relative to an axis perpendicular to the front planar side of the interior rearview mirror reflective element, and wherein the respective principal beam axes of light emitted by the first and second near infrared light emitters diverge.

42. The vehicular cabin monitoring system of claim 1, wherein, when the equipped vehicle comprises a left hand drive vehicle and with the mounting base attached at the interior portion of the equipped left hand drive vehicle, and when the driver monitoring camera captures image data for the driver monitoring function, the first near infrared light emitter is electrically activated to emit near infrared light and the second near infrared light emitter is not electrically activated to emit near infrared light.

43. The vehicular cabin monitoring system of claim 1, wherein, when the equipped vehicle comprises a right hand drive vehicle and with the mounting base attached at the interior portion of the equipped right hand drive vehicle, and when the driver monitoring camera captures image data for the driver monitoring function, the first near infrared light emitter is not electrically activated to emit near infrared light and the second near infrared light emitter is electrically activated to emit near infrared light.

44. The vehicular cabin monitoring system of claim 1, wherein, when the equipped vehicle comprises a left hand drive vehicle and with the mounting base attached at the interior portion of the equipped left hand drive vehicle and with at least the first near infrared light emitter electrically activated to emit near infrared light for the driver monitoring function and with the interior rearview mirror head of the vehicular interior rearview mirror assembly adjusted by the driver of the left hand drive vehicle to set the rearward view of the interior rearview mirror reflective element for the driver, near infrared irradiance at the eyes of the driver is at least 2.5 watts per square meter within the 99% eyellipse per SAE J194.

45. A vehicular cabin monitoring system, the vehicular cabin monitoring system comprising:
   a vehicular interior rearview mirror assembly comprising an interior rearview mirror head adjustably attached at a mounting base, the mounting base configured to attach at an interior portion of a left hand drive vehicle equipped with the vehicular cabin monitoring system;
   wherein the interior rearview mirror head accommodates an interior rearview mirror reflective element;
   wherein the interior rearview mirror head accommodates electronic circuitry;
   a driver monitoring camera accommodated by the interior rearview mirror head, wherein the interior rearview mirror reflective element and the driver monitoring camera move in tandem with the interior rearview mirror head when, with the mounting base of the vehicular interior rearview mirror assembly attached at the interior portion of the equipped left hand drive vehicle, the interior rearview mirror head is adjusted by a driver of the equipped left hand drive vehicle relative to the mounting base to set a rearward view of the interior rearview mirror reflective element for the driver;
   a first near infrared light emitter and a second near infrared light emitter accommodated by the interior rearview mirror head, wherein the first and second near infrared light emitters move in tandem with the interior rearview mirror head when, with the mounting base attached at the interior portion of the equipped left hand drive vehicle, the interior rearview mirror head is adjusted by the driver of the equipped left hand drive vehicle relative to the mounting base to set the rearward view of the interior rearview mirror reflective element for the driver;

wherein a beam of near infrared light emitted by the first near infrared light emitter, when electrically activated to emit near infrared light, is directed toward a driver-side front seating location of the equipped left hand drive vehicle when the vehicular interior rearview mirror assembly is installed in the equipped left hand drive vehicle and when the interior rearview mirror head is adjusted by the driver of the equipped left hand drive vehicle to set the rearward view of the interior rearview mirror reflective element for the driver;

a processor operable to process image data captured by the driver monitoring camera;

wherein the processor is operable to process image data captured by the driver monitoring camera at least for a driver monitoring function;

wherein, when the driver monitoring camera captures image data for the driver monitoring function, the first near infrared light emitter is electrically activated to emit near infrared light and the second near infrared light emitter is not electrically activated to emit near infrared light;

wherein, with the vehicular interior rearview mirror assembly installed in the equipped left hand drive vehicle, the second near infrared light emitter is pulsed on and off at a pulse rate that is less than a pulse rate of the first near infrared light emitter; and wherein, with the vehicular interior rearview mirror assembly installed in the equipped left hand drive vehicle and via the processor processing image data captured by the driver monitoring camera for the driver monitoring function, at least one selected from the group consisting of (i) driver attentiveness is monitored, (ii) driver drowsiness is monitored and (iii) driver gaze direction is monitored.

46. The vehicular cabin monitoring system of claim 45, wherein the driver monitoring camera is disposed within the interior rearview mirror head at least partially behind the interior rearview mirror reflective element.

47. The vehicular cabin monitoring system of claim 46, wherein the processor operable to process image data captured by the driver monitoring camera processes image data captured by the driver monitoring camera to monitor driver attentiveness.

48. The vehicular cabin monitoring system of claim 46, wherein the processor operable to process image data captured by the driver monitoring camera processes image data captured by the driver monitoring camera to monitor driver drowsiness.

49. The vehicular cabin monitoring system of claim 46, wherein the processor operable to process image data captured by the driver monitoring camera processes image data captured by the driver monitoring camera to monitor driver gaze direction.

50. The vehicular cabin monitoring system of claim 46, wherein the driver monitoring camera views through the interior rearview mirror reflective element.

51. The vehicular cabin monitoring system of claim 50, wherein the first and second near infrared light emitters are disposed within the interior rearview mirror head behind the interior rearview mirror reflective element, and wherein the first near infrared light emitter, when electrically activated to emit near infrared light, emits near infrared light that passes through the interior rearview mirror reflective element, and wherein the second near infrared light emitter, when electrically activated to emit near infrared light, emits near infrared light that passes through the interior rearview mirror reflective element.

52. The vehicular cabin monitoring system of claim 50, wherein the driver monitoring camera views through a transflective mirror reflector of the interior rearview mirror reflective element, and wherein the transflective mirror reflector of the interior rearview mirror reflective element transmits near infrared light incident thereon, transmits visible light incident thereon and reflects visible light incident thereon.

53. The vehicular cabin monitoring system of claim 52, wherein the first near infrared light emitter, when electrically activated to emit near infrared light, emits near infrared light that passes through the transflective mirror reflector of the interior rearview mirror reflective element, and wherein the second near infrared light emitter, when electrically activated to emit near infrared light, emits near infrared light that passes through the transflective mirror reflector of the interior rearview mirror reflective element.

54. The vehicular cabin monitoring system of claim 52, wherein the interior rearview mirror reflective element comprises an interior rearview mirror electrochromic reflective element having a front planar glass substrate and a rear planar glass substrate, and wherein the front planar glass substrate comprises a first planar glass surface separated from a second planar glass surface by a plate thickness dimension of the front planar glass substrate, and wherein the rear planar glass substrate comprises a third planar glass surface separated from a fourth planar glass surface by a plate thickness dimension of the rear planar glass substrate, and wherein the second planar glass surface of the front planar glass substrate has a transparent electrically conductive coating disposed thereat, and wherein the third planar glass surface of the rear planar glass substrate has the transflective mirror reflector disposed thereat, and wherein an electrochromic medium is disposed in a space between the front and rear planar glass substrates and contacts the transparent electrically conductive coating disposed at the second planar glass surface of the front planar glass substrate and the transflective mirror reflector disposed at the third planar glass surface of the rear planar glass substrate.

55. The vehicular cabin monitoring system of claim 54, wherein the electronic circuitry accommodated by the interior rearview mirror head comprises the processor operable to process image data captured by the driver monitoring camera at least for the driver monitoring function.

56. The vehicular cabin monitoring system of claim 54, wherein the first near infrared light emitter, when electrically activated to emit near infrared light, emits near infrared light that passes through the transflective mirror reflector of the interior rearview mirror electrochromic reflective element, and wherein the second near infrared light emitter, when electrically activated to emit near infrared light, emits near infrared light that passes through the transflective mirror reflector of the interior rearview mirror electrochromic reflective element.

57. The vehicular cabin monitoring system of claim 52, wherein the transflective mirror reflector comprises alternating thin film layers of $Nb_2O_5$ and $SiO_2$.

58. The vehicular cabin monitoring system of claim 52, wherein the interior rearview mirror reflective element comprises an interior rearview mirror prismatic reflective element, and wherein the interior rearview mirror prismatic reflective element comprises a glass substrate, and wherein the glass substrate has a wedge-shaped cross-section having a first planar glass surface separated from a second planar glass surface by a plate thickness dimension of the glass substrate, and wherein the plane of the first planar glass surface slopes at an angle relative to the plane of the second planar glass surface, and wherein the first planar glass surface is an uncoated glass surface, and wherein the transflective mirror reflector is disposed at the second planar glass surface of the glass substrate of the interior rearview mirror prismatic reflective element.

59. The vehicular cabin monitoring system of claim 58, wherein the first near infrared light emitter, when electrically activated to emit near infrared light, emits near infrared light that passes through the transflective mirror reflector of the interior rearview mirror reflective element, and wherein the second near infrared light emitter, when electrically activated to emit near infrared light, emits near infrared light that passes through the transflective mirror reflector of the interior rearview mirror reflective element.

60. The vehicular cabin monitoring system of claim 45, wherein, with the mounting base attached at the interior portion of the equipped left hand drive vehicle, the first and second near infrared light emitters are disposed at a lower region of the interior rearview mirror head, and wherein near infrared light emitted by the first and second near infrared light emitters, when activated to emit near infrared light, does not pass through the interior rearview mirror reflective element.

61. The vehicular cabin monitoring system of claim 45, comprising a third near infrared light emitter accommodated by the interior rearview mirror head, and wherein the third near infrared light emitter is electrically activated to emit near infrared light when the driver monitoring camera captures image data for an occupant detection function, and wherein the processor is operable to process image data captured by the driver monitoring camera for the occupant detection function, and wherein, via processing by the processor for the occupant detection function of image data captured by the driver monitoring camera, an occupant present at a passenger seat region within an interior cabin of the equipped left hand drive vehicle is detected.

62. The vehicular cabin monitoring system of claim 61, wherein, with at least the third near infrared light emitter electrically activated to emit near infrared light for the occupant detection function and with the interior rearview mirror head of the vehicular interior rearview mirror assembly installed in the equipped left hand drive vehicle adjusted by the driver of the equipped left hand drive vehicle to set the rearward view of the interior rearview mirror reflective element for the driver, near infrared irradiance at a passenger-side front seating location is at least 0.15 watts per square meter.

63. The vehicular cabin monitoring system of claim 61, wherein, with at least the third near infrared light emitter electrically activated to emit near infrared light for the occupant detection function and with the interior rearview mirror head of the vehicular interior rearview mirror assembly installed in the equipped left hand drive vehicle adjusted by the driver of the equipped left hand drive vehicle to set the rearward view of the interior rearview mirror reflective element for the driver, near infrared irradiance at a rear-passenger seating location is at least 0.1 watts per square meter.

64. The vehicular cabin monitoring system of claim 61, wherein the first near infrared light emitter is disposed within the interior rearview mirror head of the interior rearview mirror reflective element to the left of the third near infrared light emitter, and wherein the second near infrared light emitter is disposed within the interior rearview mirror head of the interior rearview mirror reflective element to the right of the third near infrared light emitter.

65. The vehicular cabin monitoring system of claim 64, wherein the first near infrared light emitter is angled relative to the third near infrared light emitter toward a left side of the vehicular interior rearview mirror assembly, and wherein the second near infrared light emitter is angled relative to the third near infrared light emitter toward a right side of the vehicular interior rearview mirror assembly.

66. The vehicular cabin monitoring system of claim 61, wherein, when the driver monitoring camera captures image data for the driver monitoring function, the first and third near infrared light emitters are electrically activated to emit near infrared light.

67. The vehicular cabin monitoring system of claim 61, wherein, when the driver monitoring camera captures image data for the occupant detection function, at least the third near infrared light emitter is electrically activated to emit near infrared light.

68. The vehicular cabin monitoring system of claim 61, wherein, when the driver monitoring camera captures image data for the occupant detection function, the second near infrared light emitter is electrically activated to emit near infrared light and the third near infrared light emitter is electrically activated to emit near infrared light.

69. The vehicular cabin monitoring system of claim 61, wherein, when the driver monitoring camera captures image data for the occupant detection function, the first near infrared light emitter is electrically activated to emit near infrared light and the second near infrared light emitter is electrically activated to emit near infrared light and the third near infrared light emitter is electrically activated to emit near infrared light.

70. The vehicular cabin monitoring system of claim 61, wherein the first near infrared light emitter is disposed behind the interior rearview mirror reflective element of the vehicular interior rearview mirror assembly, and wherein the second near infrared light emitter is disposed behind the interior rearview mirror reflective element of the vehicular interior rearview mirror assembly, and wherein the third near infrared light emitter is disposed behind the interior rearview mirror reflective element of the vehicular interior rearview mirror assembly at a location between where the first near infrared light emitter is disposed at the vehicular interior rearview mirror assembly and where the second near infrared light emitter is disposed at the vehicular interior rearview mirror assembly.

71. The vehicular cabin monitoring system of claim 70, wherein the first near infrared light emitter comprises at least two narrow beam light emitting diodes, and wherein the second near infrared light emitter comprises at least two narrow beam light emitting diodes, and wherein the third near infrared light emitter comprises at least two wide beam light emitting diodes, and wherein each of the narrow beam light emitting diodes emits a beam of near infrared light, when electrically activated to emit near infrared light, that is narrower than the beam of near infrared light emitted by any of the wide beam light emitting diodes when electrically activated to emit near infrared light.

72. The vehicular cabin monitoring system of claim 61, wherein, with the mounting base attached at the interior portion of the equipped left hand drive vehicle, the first near infrared light emitter is disposed behind the interior rearview mirror reflective element at a left side of the vehicular interior rearview mirror assembly, and wherein the second near infrared light emitter is disposed behind the interior rearview mirror reflective element at a right side of the vehicular interior rearview mirror assembly, and wherein the third near infrared light emitter is disposed behind the interior rearview mirror reflective element of the vehicular interior rearview mirror assembly at a location between where the first near infrared light emitter is disposed at the left side of the vehicular interior rearview mirror assembly and where the second near infrared light emitter is disposed at the right side of the vehicular interior rearview mirror assembly.

73. The vehicular cabin monitoring system of claim 61, wherein, with the mounting base attached at the interior portion of the equipped left hand drive vehicle, the first near infrared light emitter, the second near infrared light emitter and the third near infrared light emitter are disposed behind the interior rearview mirror reflective element at a left side of the vehicular interior rearview mirror assembly, and wherein the third near infrared light emitter is disposed behind the interior rearview mirror reflective element of the vehicular interior rearview mirror assembly at a location between where the first near infrared light emitter is disposed at the vehicular interior rearview mirror assembly and where the second near infrared light emitter is disposed at the vehicular interior rearview mirror assembly, and wherein the first near infrared light emitter is disposed at the left side of the vehicular interior rearview mirror assembly at a location to the left of the location of the third near infrared light emitter.

74. The vehicular cabin monitoring system of claim 61, wherein, with the mounting base attached at the interior portion of the equipped left hand drive vehicle, the first near infrared light emitter, the second near infrared light emitter and the third near infrared light emitter are disposed behind the interior rearview mirror reflective element at a right side of the vehicular interior rearview mirror assembly, and wherein the third near infrared light emitter is disposed behind the interior rearview mirror reflective element of the vehicular interior rearview mirror assembly at a location between where the first near infrared light emitter is disposed at the vehicular interior rearview mirror assembly and where the second near infrared light emitter is disposed at the vehicular interior rearview mirror assembly, and wherein the first near infrared light emitter is disposed at the right side of the vehicular interior rearview mirror assembly at a location to the left of the location of the third near infrared light emitter.

75. The vehicular cabin monitoring system of claim 45, wherein the interior portion of the equipped left hand drive vehicle comprises a portion of a windshield of the equipped left hand drive vehicle at an in-cabin side of the windshield of the equipped left hand drive vehicle.

76. The vehicular cabin monitoring system of claim 75, wherein the interior rearview mirror reflective element is attached at a mirror attachment plate, and wherein the driver monitoring camera and the first and second near infrared light emitters are disposed behind the mirror attachment plate and are aligned with respective apertures through the mirror attachment plate.

77. The vehicular cabin monitoring system of claim 76, comprising a heat dissipating element at the mirror attachment plate.

78. The vehicular cabin monitoring system of claim 76, wherein the mirror attachment plate and the heat dissipating element limit electromagnetic interference (i) at the driver monitoring camera, (ii) at the first and second near infrared light emitters and (iii) at the electronic circuitry.

79. The vehicular cabin monitoring system of claim 45, wherein the interior rearview mirror reflective element has a front planar side and a rear planar side that is separated from the front planar side by a thickness dimension of the interior rearview mirror reflective element, and wherein the first near infrared light emitter is angled relative to the front planar side of the interior rearview mirror reflective element with a principal beam axis of light emitted by the first near infrared light emitter being at an angle of greater than 10 degrees and less than 30 degrees relative to an axis perpendicular to the front planar side of the interior rearview mirror reflective element.

80. The vehicular cabin monitoring system of claim 79, wherein the second near infrared light emitter is angled relative to the front planar side of the interior rearview mirror reflective element with a principal beam axis of light emitted by the second near infrared light emitter being at an angle of greater than 5 degrees and less than 15 degrees relative to an axis perpendicular to the front planar side of the interior rearview mirror reflective element, and wherein the respective principal beam axes of light emitted by the first and second near infrared light emitters diverge.

81. The vehicular cabin monitoring system of claim 45, wherein, with at least the first near infrared light emitter electrically activated to emit near infrared light for the driver monitoring function and with the interior rearview mirror head of the vehicular interior rearview mirror assembly installed in the equipped left hand drive vehicle adjusted by the driver of the equipped left hand drive vehicle to set the rearward view of the interior rearview mirror reflective element for the driver, near infrared irradiance at the eyes of the driver is at least 2.5 watts per square meter within the 99% eyellipse per SAE J194.

82. A vehicular cabin monitoring system, the vehicular cabin monitoring system comprising:
  a vehicular interior rearview mirror assembly comprising an interior rearview mirror head adjustably attached at a mounting base, the mounting base configured to attach at an interior portion of a left hand drive vehicle equipped with the vehicular cabin monitoring system;
  wherein the interior portion of the equipped left hand drive vehicle comprises a portion of a windshield of the equipped left hand drive vehicle at an in-cabin side of the windshield of the equipped left hand drive vehicle;
  wherein the interior rearview mirror head accommodates an interior rearview mirror reflective element
  wherein the interior rearview mirror reflective element comprises a transflective mirror reflector;
  wherein the transflective mirror reflector of the interior rearview mirror reflective element transmits near infrared light incident thereon, transmits visible light incident thereon and reflects visible light incident thereon;
  wherein the interior rearview mirror head accommodates electronic circuitry;
  a driver monitoring camera accommodated by the interior rearview mirror head, wherein the interior rearview mirror reflective element and the driver monitoring camera move in tandem with the interior rearview mirror head when, with the mounting base of the vehicular interior rearview mirror assembly attached at the interior portion of the equipped left hand drive vehicle, the interior rearview mirror head is adjusted by a driver of the equipped left hand drive vehicle relative to the mounting base to set a rearward view of the interior rearview mirror reflective element for the driver;
  wherein the driver monitoring camera is disposed within the interior rearview mirror head at least partially behind the interior rearview mirror reflective element;

wherein the driver monitoring camera views through the transflective mirror reflector of the interior rearview mirror reflective element;

a first near infrared light emitter and a second near infrared light emitter accommodated by the interior rearview mirror head, wherein the first and second near infrared light emitters move in tandem with the interior rearview mirror head when, with the mounting base attached at the interior portion of the equipped left hand drive vehicle, the interior rearview mirror head is adjusted by the driver of the equipped left hand drive vehicle relative to the mounting base to set the rearward view of the interior rearview mirror reflective element for the driver;

wherein a beam of near infrared light emitted by the first near infrared light emitter, when electrically activated to emit near infrared light, is directed toward a driver-side front seating location of the equipped left hand drive vehicle when the vehicular interior rearview mirror assembly is installed in the equipped left hand drive vehicle and when the interior rearview mirror head is adjusted by the driver of the equipped left hand drive vehicle to set the rearward view of the interior rearview mirror reflective element for the driver;

wherein the first and second near infrared light emitters are disposed within the interior rearview mirror head behind the interior rearview mirror reflective element;

wherein the first near infrared light emitter, when electrically activated to emit near infrared light, emits near infrared light that passes through the transflective mirror reflector of the interior rearview mirror reflective element;

wherein the second near infrared light emitter, when electrically activated to emit near infrared light, emits near infrared light that passes through the transflective mirror reflector of the interior rearview mirror reflective element;

a processor operable to process image data captured by the driver monitoring camera;

wherein the processor is operable to process image data captured by the driver monitoring camera at least for a driver monitoring function;

wherein the electronic circuitry accommodated by the interior rearview mirror head comprises the processor operable to process image data captured by the driver monitoring camera at least for the driver monitoring function;

wherein, when the driver monitoring camera captures image data for the driver monitoring function, the first near infrared light emitter is electrically activated to emit near infrared light and the second near infrared light emitter is not electrically activated to emit near infrared light;

wherein the second near infrared light emitter is pulsed on and off at a pulse rate that is less than a pulse rate of the first near infrared light emitter;

wherein a third near infrared light emitter is accommodated by the interior rearview mirror head;

wherein the third near infrared light emitter is electrically activated to emit near infrared light when the driver monitoring camera captures image data for an occupant detection function;

wherein the processor of the electronic circuitry accommodated by the interior rearview mirror head is operable to process image data captured by the driver monitoring camera for the occupant detection function;

wherein the third near infrared light emitter is disposed at the vehicular interior rearview mirror assembly at a location between where the first near infrared light emitter is located at the vehicular interior rearview mirror assembly and where the second near infrared light emitter is located at the vehicular interior rearview mirror assembly;

wherein, with the interior rearview mirror head of the vehicular interior rearview mirror assembly installed in the equipped left hand drive vehicle and via the processor processing image data captured by the driver monitoring camera for the driver monitoring function, at least one selected from the group consisting of (i) driver attentiveness is monitored, (ii) driver drowsiness is monitored and (iii) driver gaze direction is monitored; and wherein, via processing by the processor for the occupant detection function of image data captured by the driver monitoring camera, an occupant present at a passenger seat region within an interior cabin of the equipped left hand drive vehicle is detected.

83. The vehicular cabin monitoring system of claim 82, wherein the interior rearview mirror reflective element comprises an interior rearview mirror electrochromic reflective element having a front planar glass substrate and a rear planar glass substrate, and wherein the front planar glass substrate comprises a first planar glass surface separated from a second planar glass surface by a plate thickness dimension of the front planar glass substrate, and wherein the rear planar glass substrate comprises a third planar glass surface separated from a fourth planar glass surface by a plate thickness dimension of the rear planar glass substrate, and wherein the second planar glass surface of the front planar glass substrate has a transparent electrically conductive coating disposed thereat, and wherein the third planar glass surface of the rear planar glass substrate has the transflective mirror reflector disposed thereat, and wherein an electrochromic medium is disposed in a space between the front and rear planar glass substrates and contacts the transparent electrically conductive coating disposed at the second planar glass surface of the front planar glass substrate and the transflective mirror reflector disposed at the third planar glass surface of the rear planar glass substrate.

84. The vehicular cabin monitoring system of claim 83, wherein the transflective mirror reflector comprises alternating thin film layers of $Nb_2O_5$ and $SiO_2$.

85. The vehicular cabin monitoring system of claim 83, wherein, when the driver monitoring camera captures image data for the driver monitoring function, the first and third near infrared light emitters are electrically activated to emit near infrared light.

86. The vehicular cabin monitoring system of claim 85, wherein, when the driver monitoring camera captures image data for the occupant detection function, at least the third near infrared light emitter is electrically activated to emit near infrared light.

87. The vehicular cabin monitoring system of claim 85, wherein, when the driver monitoring camera captures image data for the occupant detection function, the second near infrared light emitter is electrically activated to emit near infrared light and the third near infrared light emitter is electrically activated to emit near infrared light.

88. The vehicular cabin monitoring system of claim 85, wherein, when the driver monitoring camera captures image data for the occupant detection function, the first near infrared light emitter is electrically activated to emit near infrared light and the second near infrared light emitter is electrically activated to emit near infrared light and the third near infrared light emitter is electrically activated to emit near infrared light.

89. The vehicular cabin monitoring system of claim 83, wherein, with at least the first near infrared light emitter electrically activated to emit near infrared light for the driver monitoring function and with the interior rearview mirror head of the vehicular interior rearview mirror assembly installed in the equipped left hand drive vehicle adjusted by the driver of the equipped left hand drive vehicle to set the rearward view of the interior rearview mirror electrochromic reflective element for the driver, near infrared irradiance at the eyes of the driver is at least 2.5 watts per square meter within the 99% eyellipse per SAE J194.

90. The vehicular cabin monitoring system of claim 83, wherein, with at least the third near infrared light emitter electrically activated to emit near infrared light for the occupant detection function and with the interior rearview mirror head of the vehicular interior rearview mirror assembly installed in the equipped left hand drive vehicle adjusted by the driver of the equipped left hand drive vehicle to set the rearward view of the interior rearview mirror electrochromic reflective element for the driver, near infrared irradiance at a passenger-side front seating location is at least 0.15 watts per square meter.

91. The vehicular cabin monitoring system of claim 83, wherein, with at least the third near infrared light emitter electrically activated to emit near infrared light for the occupant detection function and with the interior rearview mirror head of the vehicular interior rearview mirror assembly installed in the equipped left hand drive vehicle adjusted by the driver of the equipped left hand drive vehicle to set the rearward view of the interior rearview mirror electrochromic reflective element for the driver, near infrared irradiance at a rear-passenger seating location is at least 0.1 watts per square meter.

92. The vehicular cabin monitoring system of claim 82, wherein the interior rearview mirror reflective element comprises an interior rearview mirror prismatic reflective element, and wherein the interior rearview mirror prismatic reflective element comprises a glass substrate, and wherein the glass substrate has a wedge-shaped cross-section having a first planar glass surface separated from a second planar glass surface by a plate thickness dimension of the glass substrate, and wherein the plane of the first planar glass surface slopes at an angle relative to the plane of the second planar glass surface, and wherein the first planar glass surface is an uncoated glass surface, and wherein the transflective mirror reflector is disposed at the second planar glass surface of the glass substrate of the interior rearview mirror prismatic reflective element.

93. The vehicular cabin monitoring system of claim 92, wherein the transflective mirror reflector comprises alternating thin film layers of $Nb_2O_5$ and $SiO_2$.

94. The vehicular cabin monitoring system of claim 92, wherein, with at least the first near infrared light emitter electrically activated to emit near infrared light for the driver monitoring function and with the interior rearview mirror head of the vehicular interior rearview mirror assembly installed in the equipped left hand drive vehicle adjusted by the driver of the equipped left hand drive vehicle to set the rearward view of the interior rearview mirror prismatic reflective element for the driver, near infrared irradiance at the eyes of the driver is at least 2.5 watts per square meter within the 99% eyellipse per SAE J194.

95. The vehicular cabin monitoring system of claim 92, wherein, with at least the third near infrared light emitter electrically activated to emit near infrared light for an occupant detection function and with the interior rearview mirror head of the vehicular interior rearview mirror assembly installed in the equipped left hand drive vehicle adjusted by the driver of the equipped left hand drive vehicle to set the rearward view of the interior rearview mirror prismatic reflective element for the driver, near infrared irradiance at a passenger-side front seating location is at least 0.15 watts per square meter.

96. The vehicular cabin monitoring system of claim 92, wherein, with at least the third near infrared light emitter electrically activated to emit near infrared light for an occupant detection function and with the interior rearview mirror head of the vehicular interior rearview mirror assembly installed in the equipped left hand drive vehicle adjusted by the driver of the equipped left hand drive vehicle to set the rearward view of the interior rearview mirror prismatic reflective element for the driver, near infrared irradiance at a rear-passenger seating location is at least 0.1 watts per square meter.

97. The vehicular cabin monitoring system of claim 92, wherein, when the driver monitoring camera captures image data for the driver monitoring function, the first and third near infrared light emitters are electrically activated to emit near infrared light.

98. The vehicular cabin monitoring system of claim 97, wherein, when the driver monitoring camera captures image data for the occupant detection function, at least the third near infrared light emitter is electrically activated to emit near infrared light.

99. The vehicular cabin monitoring system of claim 97, wherein, when the driver monitoring camera captures image data for the occupant detection function, the second near infrared light emitter is electrically activated to emit near infrared light and the third near infrared light emitter is electrically activated to emit near infrared light.

100. The vehicular cabin monitoring system of claim 97, wherein, when the driver monitoring camera captures image data for the occupant detection function, the first near infrared light emitter is electrically activated to emit near infrared light and the second near infrared light emitter is electrically activated to emit near infrared light and the third near infrared light emitter is electrically activated to emit near infrared light.

101. The vehicular cabin monitoring system of claim 82, wherein, with the mounting base attached at the interior portion of the equipped left hand drive vehicle, the first near infrared light emitter that is disposed at the vehicular interior rearview mirror assembly is angled toward the driver-side front seating location of the equipped left hand drive vehicle, and wherein the second near infrared light emitter that is disposed at the vehicular interior rearview mirror assembly is angled toward a passenger-side front seating location of the equipped left hand drive vehicle.

102. The vehicular cabin monitoring system of claim 82, wherein the first near infrared light emitter comprises at least two narrow beam light emitting diodes, and wherein the second near infrared light emitter comprises at least two narrow beam light emitting diodes, and wherein the third near infrared light emitter comprises at least two wide beam light emitting diodes, and wherein each of the narrow beam light emitting diodes emits a beam of near infrared light, when electrically activated to emit near infrared light, that is narrower than the beam of near infrared light emitted by any of the wide beam light emitting diodes when electrically activated to emit near infrared light.

103. The vehicular cabin monitoring system of claim 102, wherein the processor operable to process image data captured by the driver monitoring camera processes image data captured by the driver monitoring camera to monitor driver attentiveness.

104. The vehicular cabin monitoring system of claim 102, wherein the processor operable to process image data captured by the driver monitoring camera processes image data captured by the driver monitoring camera to monitor driver drowsiness.

105. The vehicular cabin monitoring system of claim 102, wherein the processor operable to process image data captured by the driver monitoring camera processes image data captured by the driver monitoring camera to monitor driver gaze direction.

106. The vehicular cabin monitoring system of claim 82, wherein the interior rearview mirror reflective element is attached at a mirror attachment plate, and wherein the driver monitoring camera and the first, second and third near infrared light emitters are disposed behind the mirror attachment plate and are aligned with respective apertures through the mirror attachment plate, and a heat dissipating element is disposed at the mirror attachment plate, and wherein the mirror attachment plate and the heat dissipating element limit electromagnetic interference (i) at the driver monitoring camera, (ii) at the first, second and third near infrared light emitters and (iii) at the electronic circuitry.

107. The vehicular cabin monitoring system of claim 82, wherein the interior rearview mirror reflective element has a front planar side and a rear planar side that is separated from the front planar side by a thickness dimension of the interior rearview mirror reflective element, and wherein the first near infrared light emitter is angled relative to the front planar side of the interior rearview mirror reflective element with a principal beam axis of light emitted by the first near infrared light emitter being at an angle of greater than 10 degrees and less than 30 degrees relative to an axis perpendicular to the front planar side of the interior rearview mirror reflective element.

108. The vehicular cabin monitoring system of claim 107, wherein the second near infrared light emitter is angled relative to the front planar side of the interior rearview mirror reflective element with a principal beam axis of light emitted by the second near infrared light emitter being at an angle of greater than 5 degrees and less than 15 degrees relative to an axis perpendicular to the front planar side of the interior rearview mirror reflective element, and wherein the respective principal beam axes of light emitted by the first and second near infrared light emitters diverge.

109. The vehicular cabin monitoring system of claim 108, wherein the third near infrared light emitter is angled relative to the front planar side of the interior rearview mirror reflective element with a principal beam axis of light emitted by the third near infrared light emitter being perpendicular to the front planar side of the interior rearview mirror reflective element.

110. The vehicular cabin monitoring system of claim 82, wherein the second near infrared light emitter is accommodated by the interior rearview mirror head so that a beam of near infrared light emitted by the second near infrared light emitter, when electrically activated to emit near infrared light, would be directed toward a driver-side front seating location of a right hand drive vehicle were the vehicular interior rearview mirror assembly to be installed in the right hand drive vehicle and were the interior rearview mirror head to be adjusted by a driver of the right hand drive vehicle to set the rearward view of the interior rearview mirror reflective element for the driver.

111. The vehicular cabin monitoring system of claim 82, wherein, with the mounting base attached at the interior portion of the equipped left hand drive vehicle, the first near infrared light emitter is disposed behind the interior rearview mirror reflective element at a left side of the vehicular interior rearview mirror assembly, and wherein the second near infrared light emitter is disposed behind the interior rearview mirror reflective element at a right side of the vehicular interior rearview mirror assembly.

112. The vehicular cabin monitoring system of claim 82, wherein, with the mounting base attached at the interior portion of the equipped left hand drive vehicle, the first near infrared light emitter, the second near infrared light emitter and the third near infrared light emitter are disposed behind the interior rearview mirror reflective element at a left side of the vehicular interior rearview mirror assembly, and wherein the first near infrared light emitter is disposed at the left side of the vehicular interior rearview mirror assembly at a location to the left of the location of the third near infrared light emitter.

113. The vehicular cabin monitoring system of claim 82, wherein, with the mounting base attached at the interior portion of the equipped left hand drive vehicle, the first near infrared light emitter, the second near infrared light emitter and the third near infrared light emitter are disposed behind the interior rearview mirror reflective element at a right side of the vehicular interior rearview mirror assembly, and wherein the first near infrared light emitter is disposed at the right side of the vehicular interior rearview mirror assembly at a location to the left of the location of the third near infrared light emitter.

\* \* \* \* \*

UNITED STATES PATENT AND TRADEMARK OFFICE
CERTIFICATE OF CORRECTION

| | |
|---|---|
| PATENT NO. | : 12,065,081 B2 |
| APPLICATION NO. | : 18/464477 |
| DATED | : August 20, 2024 |
| INVENTOR(S) | : Justin E. Sobecki et al. |

It is certified that error appears in the above-identified patent and that said Letters Patent is hereby corrected as shown below:

In the Specification

Column 25
Line 24, "about degrees" should be --about 20 degrees--

Column 26
Line 3, "Angle" should be --Angle $\delta$--

Column 34
Line 66, "OMS" should be --DMS--

Column 35
Line 41, "DIMS" should be --DMS--

Column 46
Line 22, "indium oxide (10) layers" should be --indium oxide (IO) layers--
Lines 44-45, "5,140,455; 6,178,034;" should be --5,140,455; 5,151,816; 6,178,034;--
Line 46, "5,406,414; 5,076,673;" should be --5,406,414; 5,253,109; 5,076,673;--

Column 47
Line 31, "5,820,097; 7,249,860;" should be --5,820,097; 5,100,095; 7,249,860;--

Column 48
Line 45, "5,550,677; 5,760,962;" should be --5,550,677; 5,670,935; 5,760,962:--
Line 46, "6,097,023; 5,796,094;" should be --6,097,023; 5,877,897; 5,796,094;--

Signed and Sealed this
Seventeenth Day of September, 2024

Katherine Kelly Vidal
*Director of the United States Patent and Trademark Office*